US011877042B2

(12) United States Patent
Lee

(10) Patent No.: US 11,877,042 B2
(45) Date of Patent: Jan. 16, 2024

(54) LENS DRIVING DEVICE, CAMERA MODULE COMPRISING SAME, AND OPTICAL APPARATUS

(71) Applicant: LG INNOTEK CO., LTD., Seoul (KR)

(72) Inventor: Sung Guk Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 958 days.

(21) Appl. No.: 16/641,153

(22) PCT Filed: Aug. 20, 2018

(86) PCT No.: PCT/KR2018/009501
§ 371 (c)(1),
(2) Date: Feb. 21, 2020

(87) PCT Pub. No.: WO2019/039804
PCT Pub. Date: Feb. 28, 2019

(65) Prior Publication Data
US 2020/0200995 A1 Jun. 25, 2020

(30) Foreign Application Priority Data

Aug. 23, 2017 (KR) .................. 10-2017-0106604
Aug. 24, 2017 (KR) .................. 10-2017-0107236
Nov. 8, 2017 (KR) .................. 10-2017-0147999

(51) Int. Cl.
H02K 3/50 (2006.01)
G02B 7/09 (2021.01)
(Continued)

(52) U.S. Cl.
CPC ............... H04N 23/54 (2023.01); G02B 7/09 (2013.01); G03B 3/10 (2013.01); G03B 5/00 (2013.01);
(Continued)

(58) Field of Classification Search
CPC .. H02K 7/00; H02K 7/04; H02K 3/50; H02K 11/21; H02K 11/215; H02K 41/00;
(Continued)

(56) References Cited

U.S. PATENT DOCUMENTS

2012/0147258 A1 6/2012 Park
2014/0072289 A1 3/2014 Lim et al.
(Continued)

FOREIGN PATENT DOCUMENTS

CN 104216199 A 12/2014
CN 204515213 U 7/2015
(Continued)

OTHER PUBLICATIONS

International Search Report (PCT/ISA/210) issued in PCT/KR2018/009501, dated Nov. 26, 2018.

Primary Examiner — Tran N Nguyen
(74) Attorney, Agent, or Firm — Birch, Stewart, Kolasch & Birch, LLP

(57) ABSTRACT

An embodiment of the present invention comprises: a housing; a bobbin disposed within the housing; a first magnet disposed on a first side of the bobbin; a second magnet disposed on a second side of the bobbin; a first coil disposed in the housing so as to correspond to the first magnet; a second coil disposed in the housing so as to correspond to the second magnet; first to third springs coupled to the bobbin; and a circuit board disposed in the housing and having first and second terminals, wherein the first spring connects one end of the first coil with the first terminal of the circuit board, the second spring connects one end of the second coil with the second terminal of the circuit board, and the third spring connects the other end of the first coil with the other end of the second coil.

20 Claims, 33 Drawing Sheets

(51) Int. Cl.
*H04N 23/54* (2023.01)
*H02K 11/215* (2016.01)
*G03B 13/36* (2021.01)
*H02K 7/04* (2006.01)
*H02K 41/035* (2006.01)
*G03B 3/10* (2021.01)
*G03B 5/00* (2021.01)
*H04R 9/02* (2006.01)

(52) U.S. Cl.
CPC ............... *G03B 13/36* (2013.01); *H02K 3/50* (2013.01); *H02K 7/04* (2013.01); *H02K 11/215* (2016.01); *H02K 41/0356* (2013.01); *G03B 2205/0007* (2013.01); *G03B 2205/0069* (2013.01); *H02K 2203/03* (2013.01); *H02K 2203/12* (2013.01); *H04R 9/02* (2013.01); *H04R 9/025* (2013.01)

(58) Field of Classification Search
CPC .. H02K 41/03; H02K 41/035; H02K 41/0356; H02K 33/18; G02B 7/00; G02B 7/02; G02B 7/026; G02B 7/04; G02B 7/08; G02B 7/09; G02B 7/102; G03B 5/00; G03B 5/02; G03B 3/10; G03B 13/36; G03B 30/00; H04N 23/54; H04N 23/55; H04N 23/57; F03G 7/06; F03G 7/065
See application file for complete search history.

(56) References Cited

U.S. PATENT DOCUMENTS

| | | |
|---|---|---|
| 2016/0025995 A1 | 1/2016 | Ariji |
| 2016/0109681 A1 | 4/2016 | Lam |
| 2016/0139426 A1 | 5/2016 | Park |
| 2017/0146773 A1 | 5/2017 | Park |
| 2018/0011284 A1* | 1/2018 | Park ..................... G03B 5/02 |
| 2019/0004279 A1 | 1/2019 | Park et al. |

FOREIGN PATENT DOCUMENTS

| | | | |
|---|---|---|---|
| CN | 104932174 A | 9/2015 | |
| CN | 105607213 * | 6/2016 | ............ G02B 27/64 |
| CN | 106054494 A | 10/2016 | |
| CN | 106647107 A | 5/2017 | |
| JP | 2007-25577 A | 2/2007 | |
| KR | 10-2011-0050161 A | 5/2011 | |
| KR | 10-2012-0066264 A | 6/2012 | |
| KR | 19-2013-0047350 A | 5/2013 | |
| KR | 10-1343197 B1 | 12/2013 | |
| KR | 10-2015-0108107 A | 9/2015 | |
| KR | 10-2015-0120265 A | 11/2015 | |
| KR | 10-2016-0004543 A | 1/2016 | |
| KR | 10-2016-0023386 A | 3/2016 | |
| KR | 10-2016-0059143 A | 5/2016 | |
| KR | 10-2016-0075100 A | 6/2016 | |
| KR | 10-2016-0112126 A | 9/2016 | |
| KR | 10-2016-0120651 A | 11/2016 | |
| KR | 10-2017-0001988 A | 1/2017 | |
| KR | 10-2017-0017273 A | 2/2017 | |
| KR | 10-2017-0029986 A | 3/2017 | |
| KR | 10-2017-0092809 A | 8/2017 | |
| WO | WO 2013/121788 A1 | 8/2013 | |
| WO | WO 2017/078364 A1 | 5/2017 | |

* cited by examiner

LENS DRIVING DEVICE, CAMERA MODULE COMPRISING SAME, AND OPTICAL APPARATUS

CROSS REFERENCE TO RELATED APPLICATIONS

This application is the National Phase of PCT International Application No. PCT/KR2018/009501, filed on Aug. 20, 2018, which claims priority under 35 U.S.C. 119(a) to Patent Application No. 10-2017-0106604, filed in the Republic of Korea on Aug. 23, 2017, Patent Application No. 10-2017-0107236, filed in the Republic of Korea on Aug. 24, 2017 and Patent Application No. 10-2017-0147999, filed in the Republic of Korea on Nov. 8, 2017, all of which are hereby expressly incorporated by reference into the present application.

TECHNICAL FIELD

Embodiments relate to a lens moving apparatus and to a camera module and an optical device each including the same.

BACKGROUND ART

Technology of a voice coil motor (VCM), which is used in existing general camera modules, is difficult to apply to a miniature low-power camera module, and studies related thereto have been actively conducted.

In the case of a camera module configured to be mounted in a small electronic product, such as a smart phone, the camera module may frequently receive shocks when in use, and may undergo fine shaking due to, for example, the shaking of a user's hand. In consideration thereof, technology enabling a device for preventing handshake to be additionally installed to a camera module is being developed.

DISCLOSURE

Technical Problem

Embodiments provide a lens moving apparatus capable of simplifying the structure thereof and preventing disconnection and separation of an AF drive coil, and a camera module and an optical device each including the same.

Furthermore, the embodiments provide a lens moving apparatus capable of achieving simplification of structure, reduction of size and increase of electromagnetic force thereof, and a camera module and an optical device each including the same.

Furthermore, the embodiments provide a lens moving apparatus capable of increasing electromagnetic force and ensuring linearity in displacement by suppressing magnetic-field interference, and a camera module and an optical device each including the same.

Technical Solution

A lens moving apparatus according to an embodiment includes a housing, a bobbin disposed in the housing, a first magnet disposed on a first side surface of the bobbin, a second magnet disposed on a second side surface of the bobbin, a first coil disposed at the housing so as to correspond to the first magnet, a second coil disposed at the housing so as to correspond to the second magnet, first to third springs coupled to the bobbin, and a circuit board disposed at the housing and having first and second terminals, wherein the first spring connects one end of the first coil to a first terminal of the circuit board, the second spring connects one end of the second coil to a second terminal of the circuit board, and the third spring connects a remaining end of the first coil to a remaining end of the second coil.

The lens moving apparatus may further include a base disposed below the bobbin, and the first and third springs may be coupled to the housing and may be disposed between the bobbin and the base.

The housing may include a first opening, positioned between the first coil and the first magnet, and a second opening, positioned between the second coil and the second magnet.

The housing may include a first side surface corresponding to the first side surface of the bobbin and a second side surface corresponding to the second side surface of the bobbin, wherein the first coil may be disposed on the first side surface of the housing, and the second coil may be disposed on the second side surface of the housing.

The housing may further include third and fourth side surfaces disposed between the first side surface of the housing and the second side surface of the housing, and the third and fourth side surfaces of the housing may not overlap the first and second magnets in a direction toward the fourth side surface of the housing from the third side surface of the housing.

The third and fourth side surfaces of the bobbin may not overlap the first and second coils in a direction toward the fourth side surface of the bobbin from the third side surface of the bobbin.

The lens moving apparatus may further include a sensing magnet, disposed on the fourth side surface of the bobbin, and a location sensor, disposed at the circuit board so as to correspond to the sensing magnet, and the circuit board may be disposed on the fourth side surface of the housing.

The lens moving apparatus may further include a balancing magnet disposed on the third side surface of the bobbin.

An upper surface of the base may include a first side corresponding to the first side surface of the bobbin, a second side corresponding to the second side surface of the bobbin, and third and fourth sides disposed between the first and second sides, wherein the first spring may be positioned between the first side and the fourth side, the second spring may be positioned between the second side and the fourth side, and the third spring may be positioned between the first side, the second side and the third side.

The housing may include a first side portion corresponding to the first side surface of the bobbin, a second side portion corresponding to the second side surface of the bobbin, third and fourth side portions disposed between the first side portion of the housing and the second side portion of the housing, a first corner portion positioned between the first side portion and the third side portion, a second corner portion positioned between the second side portion and the third side portion, a third corner portion positioned between the third side portion and the fourth side portion, and a fourth corner portion positioned between the fourth side portion and the first side portion, wherein the first coil may be disposed at the first side portion, the second coil may be disposed at the second side portion, and the circuit board may be disposed at the fourth side portion.

The first spring may connect the first side portion to the fourth side portion, the second spring may connect the second side portion to the fourth side portion, and the third spring may connect the first side portion, the second side portion and the third side portion to one another.

Each of the first to third springs may include an outer frame coupled to the housing, the outer frame of the first spring being disposed at a lower portion of the first side portion, a lower portion of the fourth corner portion and a lower portion of the fourth side portion, the outer frame of the second spring being disposed at a lower portion of the second side portion, a lower portion of the third corner portion and the lower portion of the fourth side portion, and the outer frame of the third spring being disposed at lower portions of the first to third side portions and lower portions of the first and second corner portions.

The first spring may include a first bonding portion, which is positioned at the lower portion of the first side portion and to which one end of the first coil is coupled, and a second bonding portion, which is positioned at the lower portion of the fourth side portion and to which the first terminal of the circuit board is coupled, the second spring may include a third bonding portion, which is positioned at a lower portion of the second side portion and to which one end of the second coil is coupled, and a fourth bonding portion, which is positioned at the lower portion of the fourth side portion and to which one end of the second coil is coupled, and the third spring may include a fifth bonding portion, which is positioned at the lower portion of the first side portion and to which the other end of the first coil is coupled, and a sixth bonding portion, which is positioned at the lower portion of the second side portion and to which the other end of the second coil is coupled.

The housing may include a first protrusion provided on the outer surface of the first corner portion adjacent to one end of the outer surface of the first side portion, a second protrusion provided on the outer surface of the fourth corner portion adjacent to the outer end of the outer surface of the first side portion, a third protrusion provided on the outer surface of the second corner portion adjacent to one end of the outer surface of the second side portion, and a fourth protrusion provided on the outer surface of the third corner portion adjacent to the other end of the outer surface of the second side portion, the first coil may have the form of a ring wound around the first protrusion and the second protrusion, and the second coil may have the form of a ring wound around the third protrusion and the fourth protrusion.

Advantageous Effects

Embodiments are able to simplify a structure and to prevent disconnection and separation of an AF drive coil.

Furthermore, the embodiments are capable of exhibiting reduced size and to increased electromagnetic force.

Furthermore, the embodiments are able to achieve increase of electromagnetic force and linearity in displacement of a bobbin by suppressing magnetic-field interference.

BEST MODE

Figure 1:
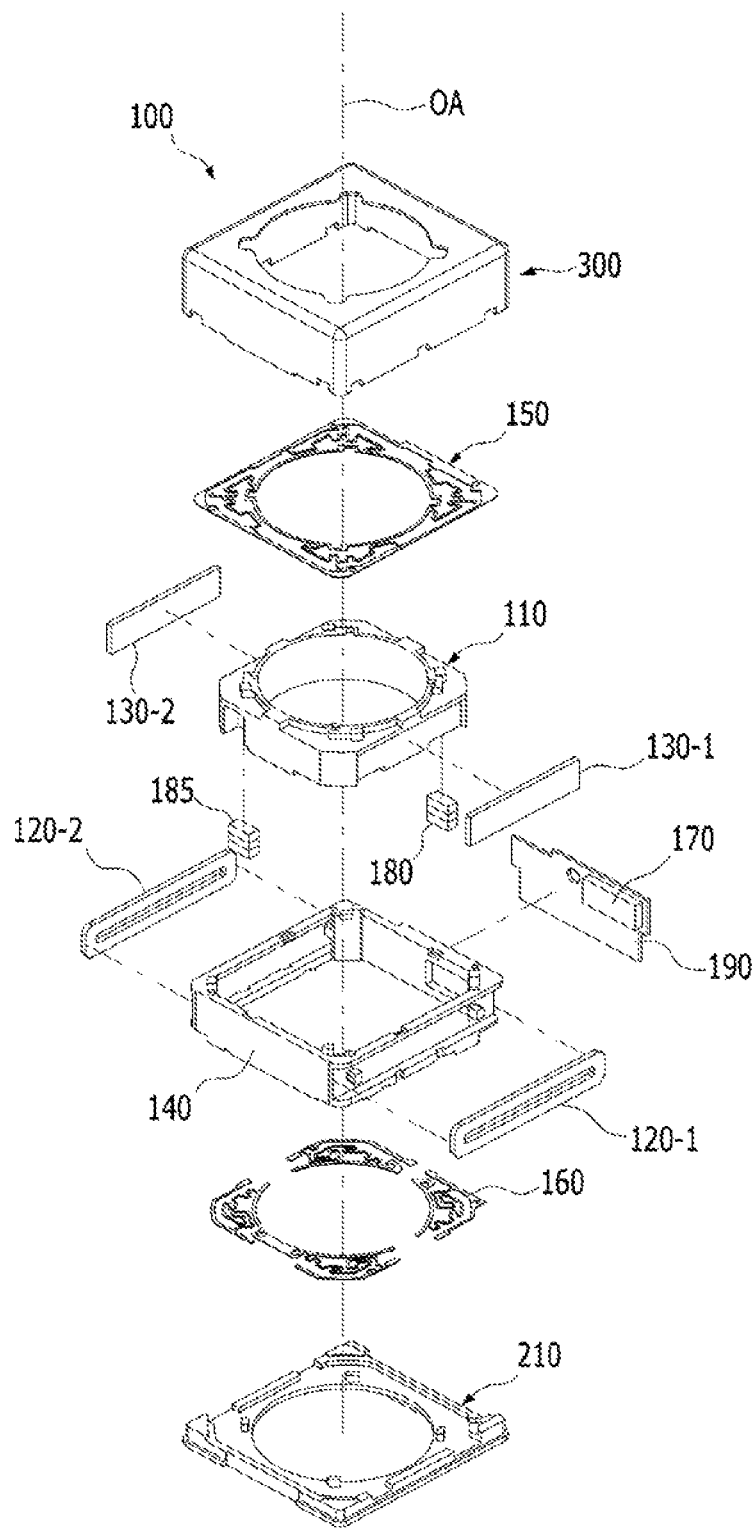
FIG. 1 is an exploded view of a lens moving apparatus according to an embodiment.

Hereinafter, embodiments of the present invention capable of concretely achieving the above objects will be described with reference to the accompanying drawings.

In the following description of the embodiments, it will be understood that, when an element is referred to as being formed "on" or "under" another element, it can be directly "on" or "under" the other element, or can be indirectly disposed, with one or more intervening elements therebetween. In addition, it will also be understood that "on" or "under" the element may mean an upward direction or a downward direction based on the element.

In addition, relative terms such as, for example, "first", "second", "on/upper/above" and "beneath/lower/below", used in the following description may be used to distinguish any one substance or element with another substance or element without requiring or containing any physical or logical relationship or sequence between these substances or elements. The same reference numeral designates the same element throughout all the drawings.

Unless otherwise defined, the terms "comprise," "include" or "have" used in the above description are used to designate the presence of features, steps or combinations thereof described in the specification, and should be understood so as not to exclude the presence or probability of additional inclusion of one or more different features, steps or combinations thereof. Furthermore, the terms "correspond" or the like may include at least one of designations of "face" or "overlap".

For the convenience of description, although the lens moving apparatus is described using a rectangular coordinate system (x, y, z), the lens moving apparatus may be described using some other coordinate systems, and the embodiments are not limited thereto. In the respective drawings, the X-axis and the Y-axis mean directions perpendicular to an optical axis, i.e. the Z-axis, and the optical axis (Z-axis) direction or a direction parallel to the optical axis may be referred to as a "first direction", the X-axis direction may be referred to as a "second direction", and the Y-axis direction may be referred to as a "third direction".

An "auto-focusing" is intended to automatically focus an image of a subject on an image sensor surface. The lens moving apparatus according to an embodiment may move an optical module, which is constituted of at least one lens, in the first direction, thereby performing auto-focusing.

Figure 2:
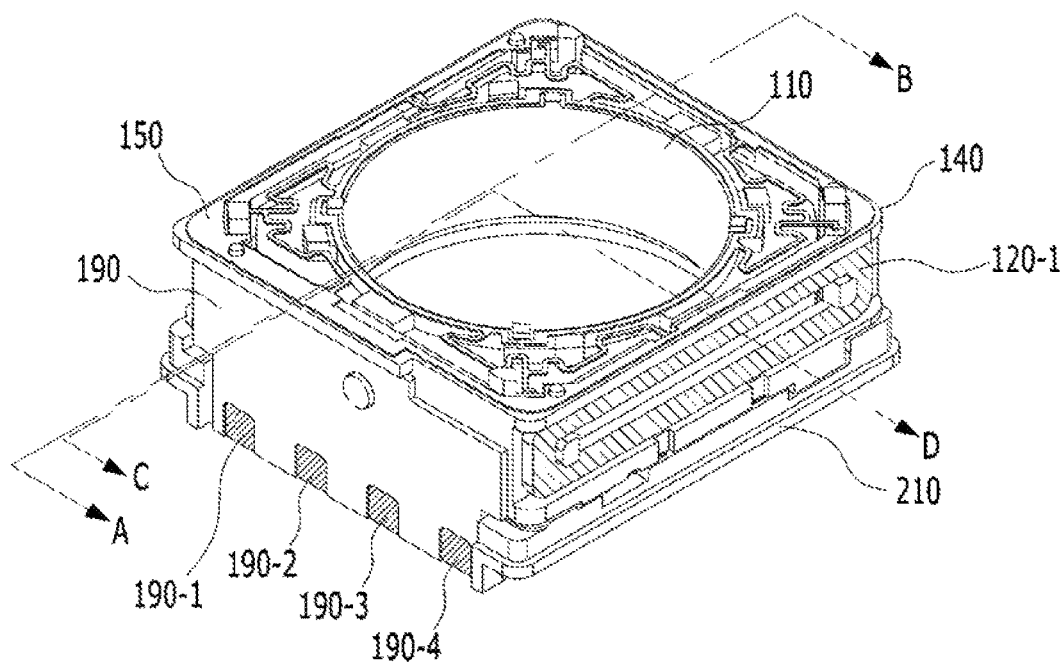
FIG. 2 is a view illustrating the assembled state of the lens moving apparatus, from which a cover member is removed.

FIG. 1 is an exploded view of a lens moving apparatus 100 according to an embodiment. FIG. 2 is a view illustrating the assembled state of the lens moving apparatus 100, from which a cover member 300 is removed.

Referring to FIGS. 1 and 2, the lens moving apparatus 100 includes a bobbin 110, a first coil 120-1, a second coil 120-2, a first magnet 130-1, a second magnet 130-2, an upper elastic member 150 and a lower elastic member 160.

The lens moving apparatus 100 may further include a location sensor 170, a circuit board 190 and a third magnet 180 for AF feedback driving. The lens moving apparatus 100 may further include a cover member 300 and a base 210.

The cover member 300 will first be described.

The cover member 300 accommodates the components 110, 120-1, 120-2, 130-1, 130-2, 140, 150, 160, 170, 180, 185 and 190, in the space defined between the cover member 300 and the base 210.

The cover member 300 may take the form of a box that has an open bottom and includes a top plate and a side plate. The lower end of the side plate of the cover member 300 may be coupled to the top of the base 210. The top plate of the cover member 300 may have a polygonal shape, for example, a square or octagonal shape, and may have an opening formed in the top plate thereof in order to expose a lens (not shown) to outside light.

Although the material of the cover member 300 may be a non-magnetic material such as, for example, SUS or plastic in order to prevent the cover member 300 from being attracted by the magnets 130, the cover member 300 may be formed of a magnetic material so as to function as a yoke.

Next, the bobbin 110 will be described.

The bobbin 110 may be disposed inside the housing 140, and may be moved in the optical-axis direction or the first direction (for example, in the z-axis direction) by the electromagnetic interaction between the first and second coils 120-1 and 120-2 and the first and second magnet 130-1 and 130-2.

Figure 3:
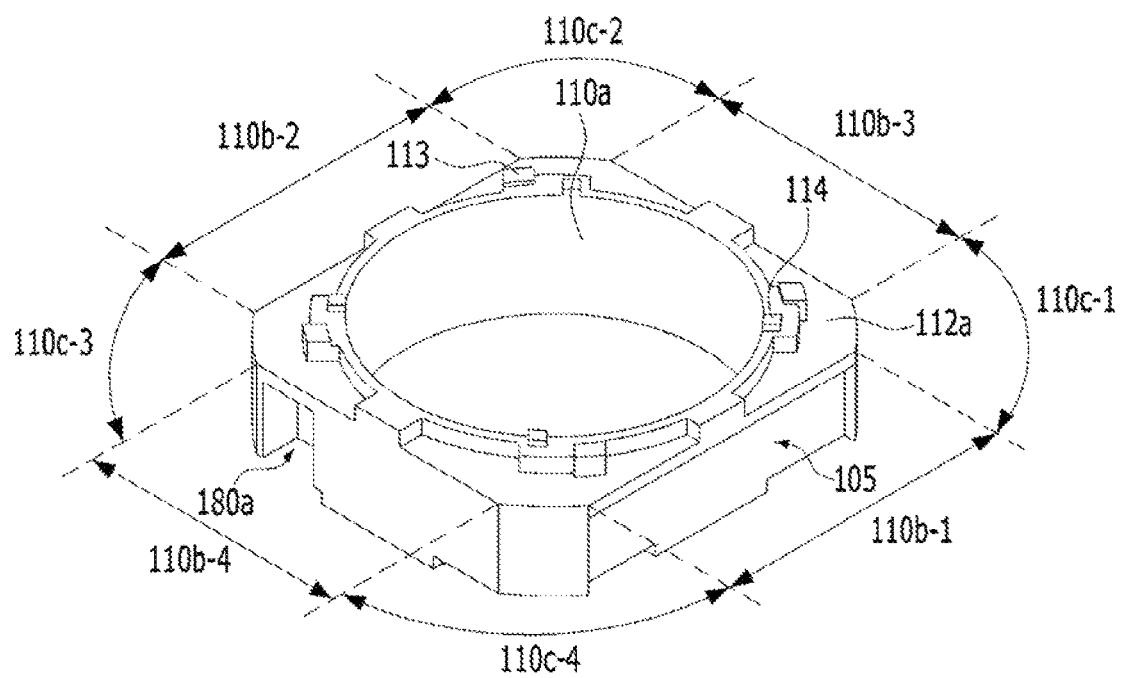
FIG. 3 is a perspective view of a bobbin shown in FIG. 1.
Figure 4:
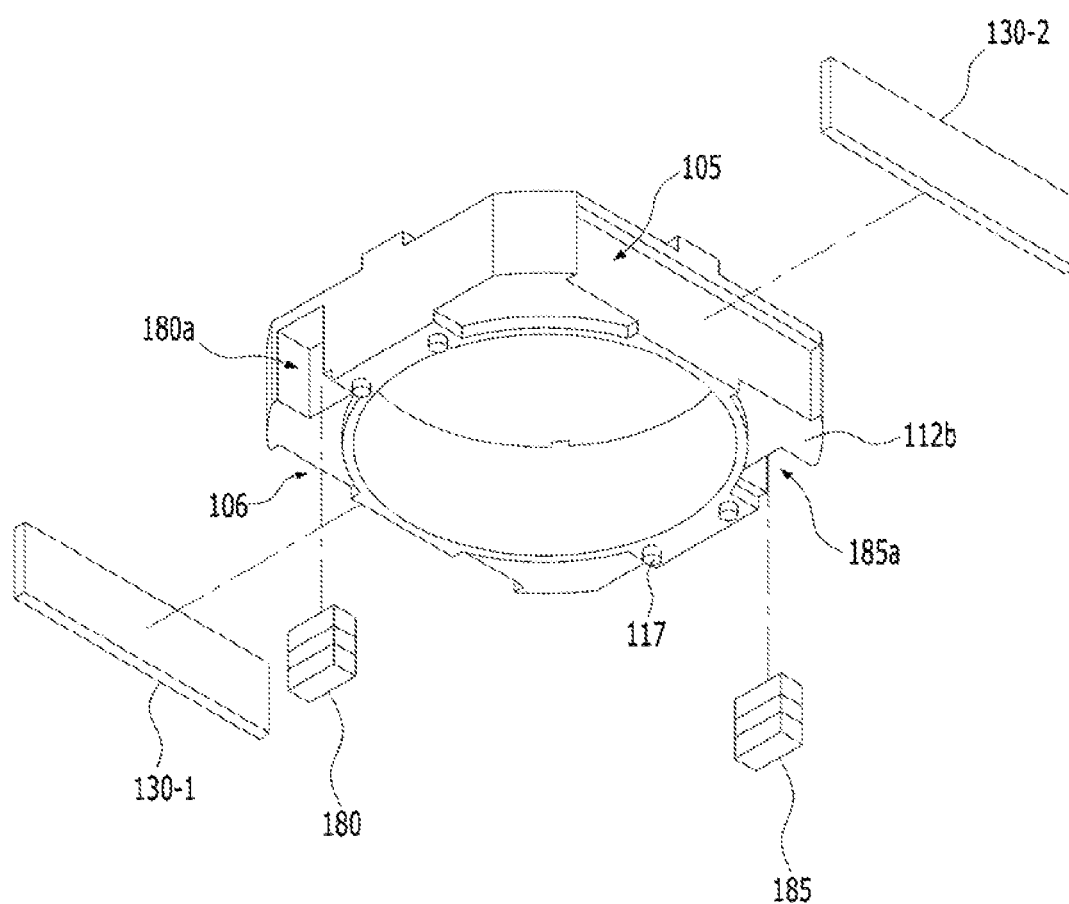
FIG. 4 illustrates the bobbin, first and second magnets, a third magnet and a fourth magnet.

FIG. 3 is a perspective view of the bobbin 110 shown in FIG. 1. FIG. 4 illustrates the bobbin 110, the first and second magnets 130-1 and 130-2, the third magnet 180 and the fourth magnet 185.

Referring to FIGS. 3 and 4, the bobbin 110 may be provided therein with a lens or a lens barrel, and may be disposed in the housing 140. The bobbin 110 may have an opening for mounting the lens or the lens barrel. Although the shape of opening may be a circular shape, an elliptic shape or a polygonal shape, the disclosure is not limited thereto.

The bobbin 110 may include first coupling portions 113, which are disposed on the upper surface thereof and are coupled and are secured to a first inner frame 151 of the upper elastic member 150, and second coupling portions 117, which are disposed on the lower surface thereof and are coupled or secured to a second dinner frame 161 of the lower elastic member 160.

Although the first and second coupling portions 113 and 117 are illustrated in the FIGS. 3 and 4 as having a protrusion shape, the disclosure is not limited thereto. In another embodiment, the coupling portions may have a groove shape or a planar shape.

The bobbin 110 may have first escape recesses 112a, which are formed in regions of the upper surface of the bobbin 110 so as to correspond to or be aligned with first frame connection portions 153 of the upper elastic member 150.

Furthermore, the bobbin 110 may have second escape recesses 112b, which are formed in regions of the lower surface of the bobbin 110 so as to correspond to or be aligned with second frame connection portions 163 of the lower elastic member 160.

By virtue of the first escape recesses 112 and the second escape recesses 112b in the bobbin 110, when the bobbin 110 is moved in the first direction, spatial interference between the first frame connection portions 153 and the second frame connection portions 163 and the bobbin 110 may be eliminated, thereby allowing the first frame connection portions 153 and the second frame connection portions 163 to be elastically deformed with ease.

The bobbin 110 may include a plurality of side surfaces. For example, the side surfaces of the bobbin 110 may be the side surfaces or outer surfaces of the bobbin 110.

For example, the bobbin 110 may include side portions 110b-1 to 110b-4 and corner portions 110c-1 to 110c-4. The first to fourth corner portions 110c-1 to 110c-4 may be disposed between the first to fourth side portions 110b-1 to 110b-4.

The side surfaces of outer surfaces of the first to fourth side portions 110b-1 to 110b-4 of the bobbin 110 may be referred to as "first to fourth side surfaces" or "first to fourth outer surfaces" of the bobbin 110.

For example, the surface area of the side surface or outer surface of each of the first to fourth corner portions 110c-1 to 110c-4 may be smaller than the surface area of the side surface or outer surface of the first to fourth side portions 110b-1 to 110b-4. For example, the first to fourth corner portions 110c-1 to 110c-4 of the bobbin 110 may be referred to as "fifth to eighth side surfaces" of the bobbin 110.

For example, the transverse length of the side surface or outer surface of each of the first to fourth corner portions 110c-1 to 110c-4 may be smaller than the transverse length of the side surface or outer surface of each of the first to fourth side portions 110b-1 to 110b-4.

In order to mount the first and second magnets 130-1 and 130-2, the bobbin 110 may include a first recess 105, which is formed in a side surface or outer surface of one of the two facing side portions (for example, 110b-1 and 110b-2), and a second recess 106, which is formed in a side surface or outer surface of the other of the two facing side portions (for example, 110b-1 and 110b-2).

The first and second recesses 105 and 106 may overlap in a direction toward the second side portion 110b-2 from the first side portion 110b-1 of the bobbin 110. The shapes of the first and second recesses 105 and 106 may coincide with the shapes of the first and second magnets 130-1 and 130-2.

Furthermore, in order to mount the third and fourth magnets 180 and 185, the bobbin 110 may include a third recess 180a, which is formed in a side surface or outer surface of one of two other facing side portions (for example, 110b-2 and 110b-4), and a fourth recess 185a, which is formed in a side surface or outer surface of the other of the two other facing side portions (for example, 110b-3 and 110b-4).

Although the third and fourth recesses 180a and 158a may not overlap each other in a direction toward the side surface or the outer surface of the fourth side portion 110b-4 from the side surface or the outer surface of the third side portion 110b-3 of the bobbin 110, the disclosure is not limited thereto.

In another embodiment, the third and fourth recesses 180a and 158a may overlap each other in a direction toward the side surface or the outer surface of the fourth side portion 110b-4 from the side surface or the outer surface of the third side portion 110b-3 of the bobbin 110. The shapes of the third and fourth recesses 180a and 185a may coincide with the shapes of the third and fourth magnets 180 and 185.

Next, the first and second magnets 130-1 and 130-2 will be described.

The first and second magnets 130-1 and 130-2 may be magnets that are capable of generating electromagnetic force resulting from the interaction between the first and second coils 120-1 and 120-2 and thus of moving the bobbin 110 using the electromagnetic force.

The first magnet 130-1 and the second magnet 130-2 may be disposed on the side surface or the outer surface of the two facing side portions 110b-1 and 110b-2 of the bobbin 110.

For example, the first magnet 130-1 may be disposed on the first side surface or the first outer surface of the bobbin 110, and the second magnet 130-2 may be disposed on the second side surface or the second outer surface of the bobbin 110.

For example, the first side surface or the first outer surface of the bobbin 110 may be the side surface or outer surface of the first side portion 110b-1 of the bobbin 110, and the second side surface or the second outer surface of the bobbin 110 may be the side surface or the outer surface of the second side portion 110b-2 of the bobbin 110.

The third and fourth side surfaces (or the third and fourth outer surfaces) of the bobbin 110 may be disposed between the first and second side surfaces (or the first and second outer surfaces) of the bobbin 110.

For example, the third side surface (or the third outer surface) of the bobbin 110 may be the side surface or outer surface of the third side portion 110b-3 of the bobbin 110, and the fourth side surface (or the fourth outer surface) of the bobbin 110 may be the side surface or outer surface of the fourth side portion 110b-4.

For example, each of the first and second magnets 130-1 may be disposed at a corresponding one of the first recess 105 and the second recess 106 in the bobbin 110.

In another embodiment, the side portions 110b-1 and 110b-2 of the bobbin 110 may not be provided with the recess, and the first and second magnets 130-1 and 130-2 may be disposed on the outer surfaces of the side portions 110b-1 and 110b-2 of the bobbin 110.

Although the shape of each of the first and second magnets 130-1 and 130-2 may have a shape corresponding to the side portions 110b-1 and 110b-2 of the bobbin 110 or the first side surface (or the first outer surface) and the second side surface (or the second outer surface) of the bobbin 110, for example, a rectangular parallelepiped shape, the disclosure is not limited thereto.

Each of the first and second magnets 130-1 and 130-2 may be a bipolar magnetized magnet divided into two parts in a direction perpendicular to the optical axis. Here, the first and second magnets 130-1 and 130-2 may be embodied by a ferrite magnet, alnico magent, rare-earth magnet or the like.

The first and second magnets having a bipolar magnetized structure may include a first magnet portion including an N pole and an S pole, a second magnet portion including an N pole and an S pole, and a nonmagnetic partition.

The first magnet portion and the second magnet portion may be spaced apart from each other, and the nonmagnetic partition may be located between the first magnet portion and the second magnet portion. The nonmagnetic partition may be a portion having substantially no magnetism, may include a section having little polarity, and may be filled with air or may be made of a nonmagnetic material.

In another embodiment, each of the first and second magnets 130-1 and 130-2 may be a monopolar magnetized magnet, which is disposed such that a first surface thereof facing the first and second coils 120-1 and 120-2 has an S pole and a second surface opposite the first surface has an N pole. In a further embodiment, the first surface of each of the first and second magnets 130-1 and 130-2 may have an N pole and the second surface may have an S pole.

Next, the third magnet 180 and the fourth magnet 185 will be described.

The third magnet 180 may be a sensing magnet. The location sensor 180 may detect variation in the intensity of a magnetic field of the third magnet 180 due to movement of the bobbin 110.

The fourth magnet 185 may be a balancing magnet for attaining weight equilibrium with respect to the third magnet 180. The weight equilibrium of the AF operation unit may be attained by means of the fourth magnet 185, thereby ensuring accurate AF operation. In another embodiment, the fourth magnet 185 may be omitted.

The third magnet 180 may be disposed at one of the third and fourth side surfaces (or the third and fourth outer surfaces) of the bobbin 110, and the fourth magnet 185 may be disposed at the other of the third and fourth side surfaces (or the third and fourth outer surfaces) of the bobbin 110.

For example, the third magnet 180 may be disposed on the fourth side surface (or the fourth outer surface) of the bobbin 110, and the fourth magnet 185 may be disposed on the third side surface (or the third outer surface) of the bobbin 110.

The third magnet 180 may be disposed in the third recess 180a in the bobbin 110, and the fourth magnet 185 may be disposed in the fourth recess 185a in the bobbin 110.

Although a portion of one surface of the third magnet 180 mounted in the third recess 180a in the bobbin 110 and/or a portion of one surface of the fourth magnet 185 mounted in the fourth recess 185b may project from the outer surface of the bobbin 110, the disclosure is not limited thereto. In another embodiment, the portion may not project from the outer surface of the bobbin 110.

Each of the third magnet 180 and the fourth magnet 185 may be a monopolar magnetized magnet, which is disposed such that the upper surface thereof has an N pole and the lower surface thereof has an S pole. However, the disclosure is not limited thereto, and the polarities may be disposed in the opposite manner.

For example, the third magnet 180 and the fourth magnet 185 may be disposed such that the boundary plane between the N pole and the S pole is parallel to a direction perpendicular to the optical axis. However, the disclosure is not limited thereto, and the boundary plane between the N pole and the S pole may be parallel to the optical axis in another embodiment.

In another embodiment, each of the third magnet 180 and the fourth magnet 185 may be a bipolar magnetized magnet. The bipolar magnetized magnet may include a first magnet portion including an N pole and an S pole, a second magnet portion including an N pole and an S pole, and a nonmagnetic partition disposed between the first magnet and the second magnet.

By virtue of the electromagnetic force resulting from the interaction between the first and second coils 120-1 and 120-2 and the first and second magnets 130-1 and 130-2, the magnet 180 may be moved together with the bobbin 110 in the optical-axis direction OA. At this time, the location sensor 170 may detect the intensity of the magnetic field of the third magnet 180, which is moved in the optical-axis direction, and may output the output signal corresponding to the detected intensity. For example, a controller 830 of a camera module 200 or a controller 780 of a terminal 200A may detect displacement of the bobbin 110 in the optical-axis direction based on the output signal output from the location sensor 170.

Next, the housing 140 will be described.

The housing 140 accommodates therein the bobbin 110, at which the first and second magnets 130-1 and 130-2 and the third and fourth magnets 180 and 185 are disposed.

Figure 5:
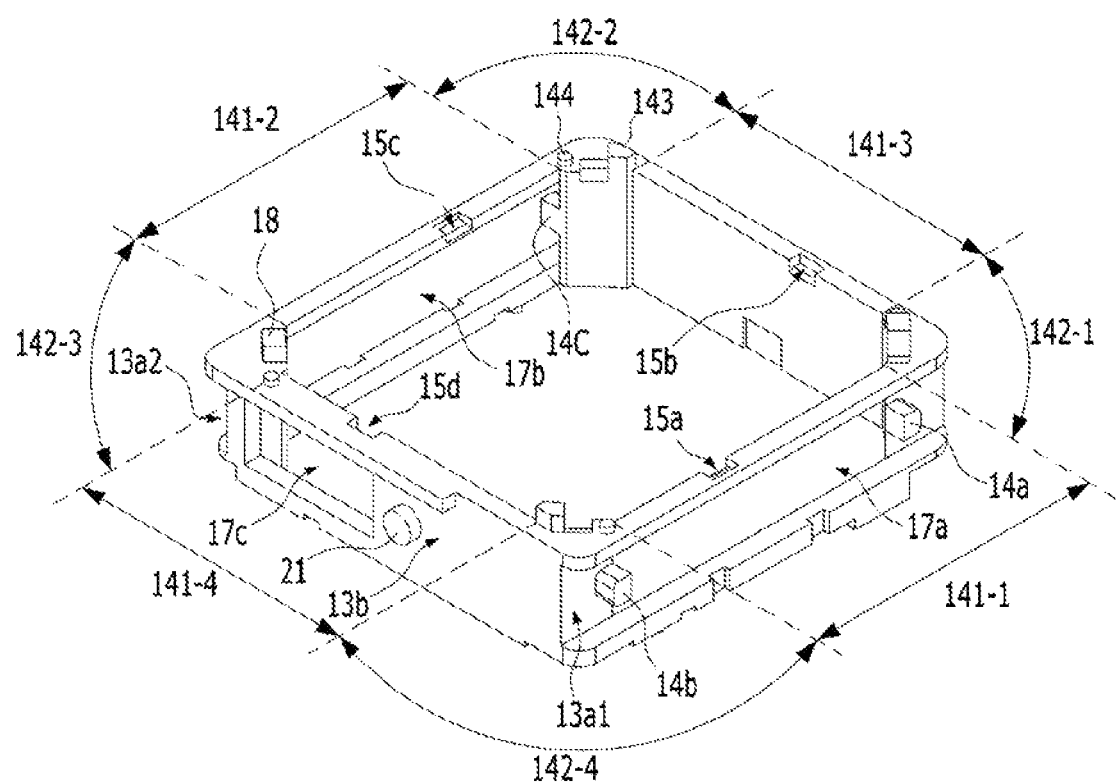
FIG. 5 is a perspective view of a housing shown in FIG. 1.
Figure 6:
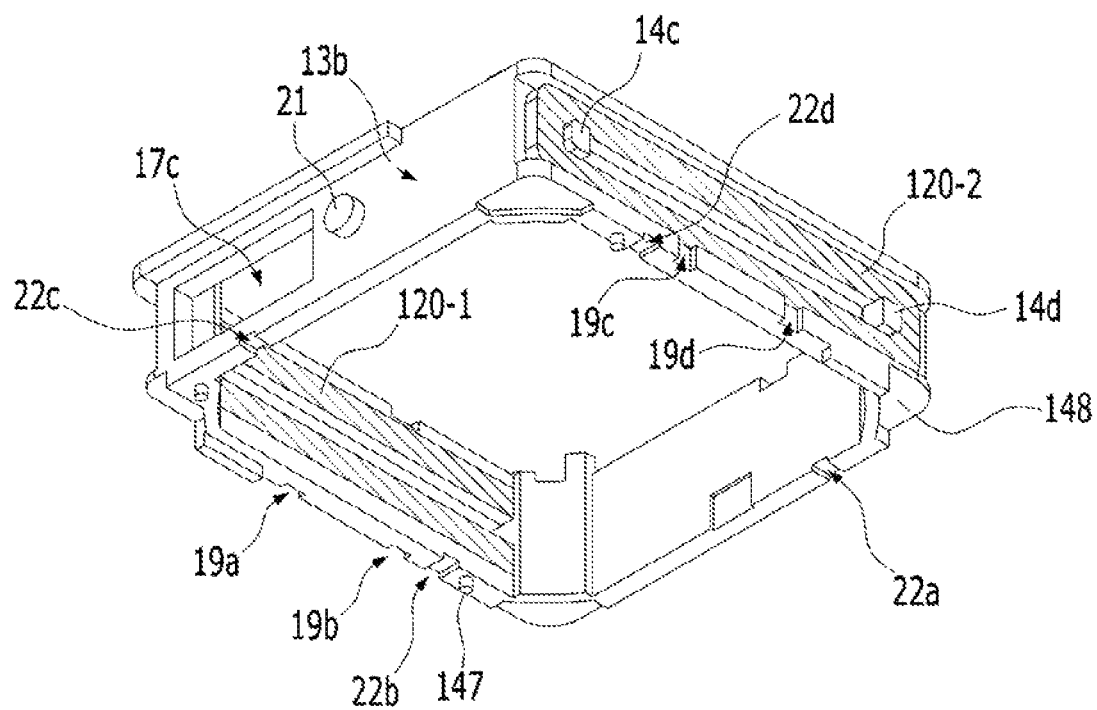
FIG. 6 is a perspective view of the housing, to which first and second coils are coupled.
Figure 7:
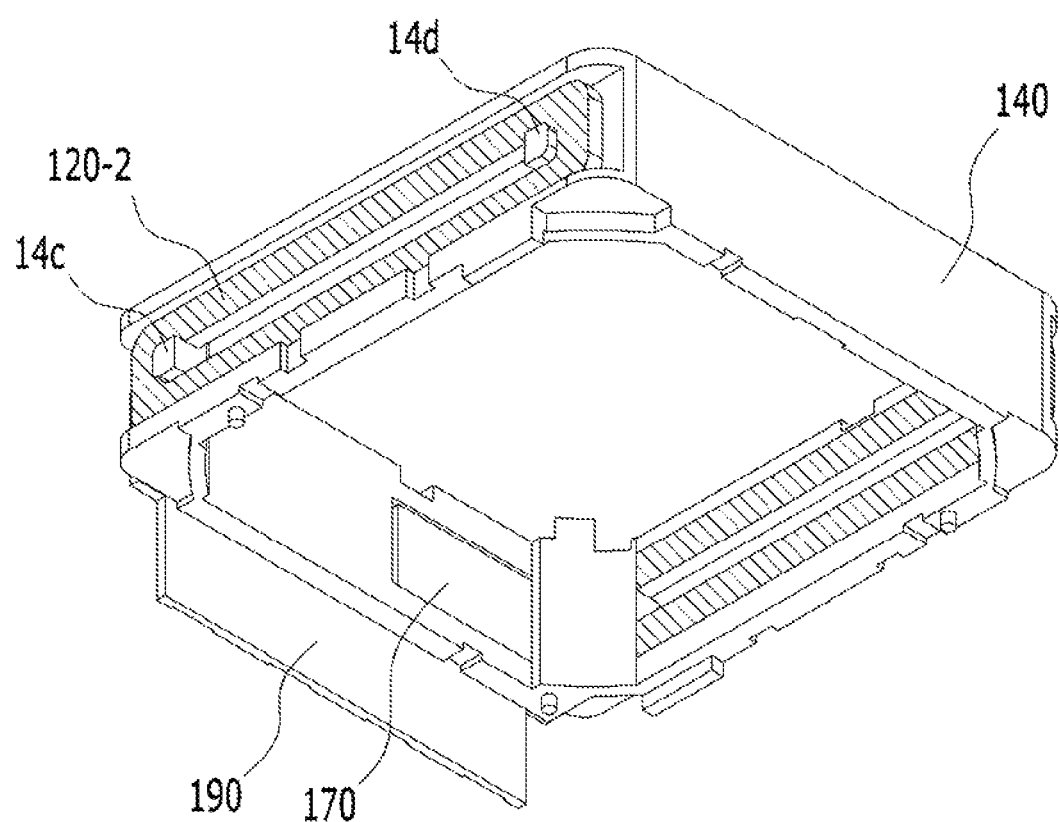
FIG. 7 is a perspective view of the first and second coils, a location sensor and a circuit board.

FIG. 5 is a perspective view of the housing 140 shown in FIG. 1. FIG. 6 is a perspective view of the housing, to which the first coil 120-1 and the second coil 120-2 are coupled. FIG. 7 is a perspective view of the first and second coils 120-1 and 120-2, the location sensor 170 and the circuit board 190, which are disposed at the housing 140.

Referring to FIGS. 5 to 7, the housing 140 supports the first and second coils 120-1 and 120-2 and accommodates the bobbin 110 such that the AF operation unit, for example, the bobbin 110, is movable in the first direction.

The AF operation unit may include the bobbin 110, which is elastically supported by the upper and lower elastic members 150 and 160, and components that are mounted on the bobbin 110 and are moved therewith. For example, the AF operation unit may include the bobbin 110 and the first to fourth magnets 130-1, 130-2, 180 and 185. For example, the AF operation unit may further include a lens (not shown) mounted on the bobbin 110.

The housing 140 may have the form of a column having an opening, and may include a plurality of side portions (for example, 141-1 to 141-4) and a plurality of corner portions (for example, 142-1 and 142-1).

For example, the housing 140 may include the side portions (for example, 141-1 to 141-4) and the corner portions (for example, 142-1 to 142-4), which collectively define an opening having a polygonal shape (for example, a square shape or an octagonal shape) or a circular shape.

For example, the housing 140 may include the first to fourth side portions 141-1 to 141-4, which are spaced apart from one another, the first corner portion 142-1 positioned between the first side portion 141-1 and the third side portion 141-3, the second corner portion 142-2 positioned between the second side portion 141-2 and the third side portion 141-3, the third corner portion 142-3 positioned between the second side portion 141-2 and the fourth side portion 141-4, and the fourth corner portion 142-4 positioned between the fourth side portion 141-4 and the first side portion 141-1.

The third side portion 141-3 and the fourth side portion 141-4 of the housing may be disposed between the first side portion 141-2 and the second side portion 141-2.

The housing 140 may include a first side surface (or a first outer surface) corresponding to a side surface (or a first outer surface) of the bobbin 110, a second side surface (or an outer surface) corresponding to a second side surface (or a second outer surface) of the bobbin 110, a third side surface (or a third outer surface) corresponding to a third side surface (or a third outer surface) of the bobbin 110, and a fourth side surface (or a fourth outer surface) corresponding to a fourth side surface (or a fourth outer surface) of the bobbin 110. The third and fourth side surfaces (or the third and fourth outer surfaces) of the housing 140 may be disposed between the first and second side surfaces (or the first and second outer surfaces) of the housing 140.

For example, each of the first to fourth side surfaces (or the first to fourth outer surfaces) of the housing 140 may be a side surface or an outer surface of a corresponding one of the first to fourth side portions 141-1 to 141-4 of the housing 140.

Each of the first to fourth side portions 141-1 to 141-4 of the housing 140 may be disposed parallel to a corresponding one of the side plates of the cover member 300.

Each of the first to fourth side portions 141-1 to 141-4 of the housing 140 may correspond to one of the first to fourth side portions 110b-1 to 110b-4 of the bobbin 110, and each of the first to fourth corner portions 142-1 to 142-4 of the housing 140 may correspond to one of the first to fourth corner portions 110c-1 to 110c-4 of the bobbin 110.

In order to mount the first and second coils 120-1 and 120-2, the housing 140 may include a first groove 13a1, which is formed in the outer surface of the first side portion 141-1 of the housing 140, and a second groove 13a2, which is formed in the outer surface of the second side portion 141-2 of the housing 140.

For example, the first groove 13a1 may be formed in the outer surface of the first side portion 141-1, the outer surface of the first corner portion 142-1 abutting one end of the outer surface of the first side portion 141-1, and the outer surface of the fourth corner portion 142-4 abutting the other end of the outer surface of the first side portion 141-1.

For example, the second groove 13a2 may be formed in the outer surface of the second side portion 141-3, the outer surface of the second corner portion 142-2 abutting one end of the outer surface of the second side portion 141-3, and the outer surface of the third corner portion 142-3 abutting the other end of the outer surface of the second side portion 141-3.

In order to hold the first and second coils 120-1 and 120-2, the housing 140 may include protrusions 14a to 14d, which are provided on the side surfaces or the outer surfaces of the first to fourth corner portions 142-1 to 142-4.

For example, the first protrusion 14a may be provided on the outer surface of the first corner portion 142-1 abutting one end of the outer surface of the first side portion 141-1 of the housing 140, and the second protrusion 14b may be provided on the outer surface of the fourth corner portion 142-4 abutting the other end of the outer surface of the first side portion 141-1 of the housing 140.

For example, the third protrusion 14c may be provided on the outer surface of the second corner portion 142-2 abutting one end of the outer surface of the second side portion 141-3 of the housing 140, and the fourth protrusion 14b may be provided on the outer surface of the third corner portion 142-3 abutting the other end of the outer surface of the second side portion 141-3 of the housing 140.

The first coil 120-1 may have the form of a ring wound around the first protrusion 14a and the second protrusion 14b, and the second coil 120-2 may have the form of a ring wound around the third protrusion 14c and the fourth protrusion 14d.

For example, the first protrusion 14a and the second protrusion 14b may project from the bottom of the first groove 13a1, and the third protrusion 14c and the fourth protrusion 14d may project from the bottom of the second groove 13a2. Based on the bottom of the first groove 13a1, the height of each of the first protrusion 14a and the second protrusion 14b may be equal to the depth of the first groove 13a1. However, the disclosure is not limited thereto.

Furthermore, based on the bottom of the second groove 13a2, the height of each of the third protrusion 14c and the fourth protrusion 14d may be equal to the depth of the second groove 13a2. However, the disclosure is not limited thereto.

In another embodiment, the height of each of the first and second protrusions may be smaller than the depth of the first groove 13a1, and the height of each of the third and fourth protrusions may be smaller than the depth of the second groove 13a2.

In a further embodiment, the height of each of the first and second protrusions may be larger than the depth of the first groove 13a1, and the height of each of the third and fourth protrusions may be larger than the depth of the second groove 13a2. In this case, the first to fourth protrusions may serve as stoppers.

Since the first to fourth protrusions 14a to 14 are disposed on the outer surfaces of the corner portions 142-1 to 142-4, it is possible to increase the length of the first and second coils 120-1 and 120-2 in a direction parallel to the horizontal direction of the first side portion 141-1 or the second side portion 141-2, thereby increasing the electromagnetic force resulting from the interaction between the first and second coils and the first and second magnets 130-1 and 130-2 disposed at the bobbin 110.

The first to fourth protrusions 14a to 14d may be winding protrusions, which are configured so as to allow the first coil 120-1 and the second coil 120-2 be directly wound therearound. However, the disclosure is not limited thereto, and the protrusions may be mounting protrusions (or coupling protrusions), which are configured so as to allow the first and second coils to be mounted thereon.

In another embodiment, the housing 140 may not have the first groove 13a1 or the second groove 13a2.

The first side portion 141-1 of the housing 140 may have formed therein a first opening 17a, and the second side portion 141-2 of the housing 140 may have formed therein a second opening 17b.

The first opening 17a in the housing 140 may be positioned between the first and second protrusions 14a and 14b, and the second opening 17b in the housing 140 may be positioned between the third and fourth protrusions 14c and 14d.

A first surface of the first coil 120-1 mounted on the housing 140 may be exposed through the first opening 17a in the housing 140, and a first surface of the second coil 120-2 mounted on the housing 140 may be exposed through the second opening 17b in the housing 140. Here, the first surface of each of the first coil 120-1 and the second coil 120 may be the surface that faces the first magnet 130-1 or the second magnet 130-2 mounted on the outer surface of the bobbin 110.

The first opening 17a may be positioned between the first coil 120-1 and the first magnet 130-1, and the second opening 17b may be positioned between the second coil 120-2 and the second magnet 130-2.

Since the first surfaces of the first and second coils 120-1 and 120-2 are respectively exposed through the first opening 17a and the second opening 17b in the housing 140, it is possible to increase the electromagnetic force resulting from the interaction between the first and second coils 120-1 and 120-2 and the first and second magnets 130-1 and 130-2. Furthermore, although the housing 140 is apt to be deformed or broken due to impact because the thickness of the first and third side portions is decreased due to the first groove 13a1 and the second groove 13a2, it is possible to prevent such deformation or breakage by providing the first opening 17a and the second opening 17b.

In another embodiment, the housing may not have the first opening 17a or the second opening 17b. In a further embodiment, the housing 140 may have grooves in place of the first opening 17a and the second opening 17b.

In order to prevent the housing 140 from directly colliding with the inner surface of the top plate of the cover member 300, the housing 140 may include a stopper 143 provided on the upper portion, the upper surface or the upper end thereof.

Although the stopper 143 may be disposed on, for example, the upper surface of at least one of the first to fourth corner portions 142-1 to 142-4 of the housing 140, the disclosure is not limited thereto.

The housing may include at least one protrusion 144 provided on the upper portion, the upper surface or the upper end thereof so as to be coupled to a hole in the first outer frame 152 of the upper elastic member 150. Although the at least one protrusion 144 may be disposed on, for example, the upper surface of at least one of the first to fourth corner portions 142-1 to 142-4, the disclosure is not limited thereto.

Furthermore, the housing 140 may include at least one protrusion 147 provided on the lower portion, the lower surface or the end thereof for coupling and securing to a hole 162a in the second outer frame 162 of the lower elastic member 160.

In order to prevent the lower surface or the bottom of the housing 140 from colliding with the base 210, to be described later, the housing 140 may include at least one stopper (not shown) projecting from the lower portion, the lower surface or the lower end thereof.

The lower portion or the lower surface of at least one of the first to fourth corner portions 142-1 to 142-4 of the housing 140 may have formed therein a guide groove 148 corresponding to a projection 216 of the base 210.

For example, by virtue of an adhesive member, the guide groove 148 in the housing 140 may be coupled to the projection 216 of the base 210, and the housing 140 may be coupled to the base 210.

In order to avoid spatial interference between the first frame connection portions 153 of the upper elastic member 150 and a corresponding connection portion thereof, to which the first outer frame 151 is connected, the upper portion, the upper surface or the upper end of at least one of the first to fourth side portions 141-1 to 141-4 may have formed therein upper escape grooves 15a to 15d.

Furthermore, in order to avoid spatial interference between the second frame connection portions 163 of the lower elastic member 160 and a corresponding connection portion thereof, to which the second outer frame 161 is connected, the lower portion, the lower surface or the lower end of at least one of the first to fourth side portions 141-1 to 141-4 may have formed therein lower escape grooves 22a to 22d.

In order to apply or inject a damping member into extensions 153a of the first frame connection portions 153 of the upper elastic member 150, the housing 140 may include damping injection grooves 18, which are formed in the upper portion, the upper surface or the upper end of at least one of the first to fourth corner portions 142-1 to 142-4.

In order to mount the circuit board 190, the housing 140 may include at least one mounting recess 13b formed in the outer surface of the fourth side portion 141-4.

For example, the mounting recess 13b may be formed in the outer surface of the fourth side portion 141-4 of the housing 140, the outer surface of the third corner portion 142-3 abutting one end of the fourth side portion 141-4, and the outer surface of the fourth corner portion 142-3 abutting the other end of the fourth side portion 141-4.

For coupling the circuit board 190 to the housing 140, the housing 140 may include a projection 21 projecting from the outer surface of the fourth side portion 141-4. The projection 21 may be disposed in the mounting recess 13b in the housing 140, and may be coupled to a through hole formed in the circuit board 190.

For mounting the location sensor 170 to the housing 140, the housing 140 may include a mounting portion 17c formed in the fourth side portion 141-4.

For example, the mounting portion 17c may be disposed in the mounting recess 13b in the housing. Although the mounting portion 17c is illustrated in FIG. 5 as having a hole shape formed through the fourth side portion 141-4 in the housing 140, the disclosure is not limited thereto. In another embodiment, the mounting portion for mounting the location sensor 170 may have a recess shape. Although the mounting portion 17c may have a shape corresponding to or coinciding with the location sensor 190, the disclosure is not limited thereto.

The housing 140 may include first and second guide grooves 19a and 19b, which are formed in the lower portion, the lower surface or the lower end of the first side portion 141-1 and are spaced apart from each other, and third and fourth guide grooves 19c and 19d, which are formed in the lower portion, the lower surface or the lower end of the second side portion 141-2 and are spaced apart from each other.

The first and second guide grooves 19a and 19b, which are channels through which the starting line (or one end) and the ending line 120-1a (or the other end) of the first coil 120-1 pass, may serve to guide the starting line (or one end) and the ending line 120-1a (or the other end) of the first coil 120-1 to a first bonding portion 61a of the first lower spring 160-1 and a third bonding portion 63a of the third lower spring 160-3.

The third and fourth guide grooves 19c and 19d, which are channels, through which the starting line (or one end) and the ending line 120-2a (or the other end) of the second coil 120-2 pass, may serve to guide the starting line (or one end) and the ending line 120-2a (or the other end) of the second coil 120-2 to a second bonding portion 62a of the second lower spring 160-2 and a fourth bonding portion 63b of the third lower spring 160-3.

A portion of the first coil 120-1 may be positioned in the first guide groove 19a, and another portion of the first coil 120-1 may be positioned in the second guide groove 19b. Furthermore, a portion of the second coil 120-2 may be positioned in the third guide groove 19c, and another portion of the second coil 120-2 may be positioned in the fourth guide groove 19d.

Next, the first coil 120-1 and the second coil 120-2 will be described.

The first coil 120-1 may be disposed at the first side portion 141-1 of the housing 140 so as to correspond to the first magnet 130-1, and the second coil 120-2 may be disposed at the second side portion 141-2 of the housing 140 so as to correspond to the second magnet 130-2.

For example, the first coil 120 may be disposed on the first side surface or the first outer surface of the housing 140, and the second coil 120-2 may be disposed on the second side surface or the second outer surface of the housing 140.

The third and fourth side surfaces (or the third and fourth outer surfaces) of the housing 140 may not overlap the first and second magnets 130-1 and 130-2 in a direction toward the fourth side surface (or the fourth outer surface) of the housing 140 from the third side surface (or the third outer surface) of the housing 140.

The third and fourth side surfaces (or the third and fourth outer surfaces) of the bobbin 110 may not overlap the first and second coils 120-1 and 120-2 in a direction toward the fourth side surface (or the outer surface) of the bobbin 110 from the third side surface (or the third outer surface) of the bobbin 100.

The first coil 120-1 and the second coil 120-2 may be drive coils for moving the bobbin 110 by electromagnetic interaction with the first and second magnets 130-1 and 130-2.

In order to generate electromagnetic force resulting from interaction with the first and second magnets 130-1 and 130-2, a drive signal (for example, drive current or voltage) may be applied to the first and second coils 120-1.

For example, the drive signal applied to the first and second coils 120-1 and 120-2 may be a DC signal.

In another embodiment, for example, the drive signal applied to the first and second coils 120-1 and 120-2 may include an AC signal and a DC signal.

By virtue of electromagnetic force resulting from interaction between the first and second coils 120-1 and 120-2 and the first and second magnets 130-1 and 130-2, the AF operation unit may be driven in a single direction or in two directions. Here, driving in a single direction refers to a driving in which the AF operation unit is moved in a single direction, for example, in an upward direction for example, in the Z-axis direction) relative to the initial position of the AF operation unit, and driving in two directions refers to driving in which the AF operation unit is moved in two directions (for example, in upward and downward directions) relative to the initial position of the AF operation unit.

For example, the initial position of the bobbin 110 may be the initial position of the AF operation unit (for example, the bobbin) in the state in which power is not applied to the first and second coils 120-1 and 120-2, and may be the position of the AF operation unit when the upper elastic member 150 and the lower elastic member 160 are elastically deformed only by the weight of the AF operation unit.

Furthermore, the initial position of the bobbin 110 may be the position of the AF operation unit when gravity is applied toward the base 210 from the bobbin 110 or toward the bobbin 110 from the base 210.

By controlling the intensity and/or the direction of electromagnetic force resulting from interaction between the first and second coils 120-1 and 120-2 and the first and second magnets 130-1 and 130-2 by control of the intensity and/or the polarity (for example, a direction in which current flows) of a drive signal applied to the first and second coils 120-1 and 120-2, it is possible to control movement of the AF operation unit and thus to perform an AF function.

The first coil 120-1 may be disposed at the first side portion 141-1 of the housing 140 so as to have a closed loop shape, and the second coil 120-2 may be disposed at the second side portion 141-2 of the housing 140 so as to have a closed loop shape.

For example, the first coil 120-1 may have the form of a ring, which is wound clockwise or counterclockwise about an axis perpendicular to the outer surface of the first side portion 141-1 of the housing 140.

The second coil 120-1 may have the form of a ring, which is wound clockwise or counterclockwise about an axis perpendicular to the outer surface of the second side portion 141-2 of the housing 140.

For example, the first coil 120-1 may be directly wound around the first and second protrusions 14a and 14b of the first side portion 141-1 of the housing 140, and the second coil 120-2 may be directly wound around the third and fourth protrusions 14c and 14d of the second side portion 141-3 of the housing 140.

In another embodiment, each of the first coil 120-1 and the second coil 120-2 may be embodied as a coil ring. Here, the first coil 120-1 of the coil ring may be secured to the first side portion 141-1 of the housing 140 by means of an adhesive member, and the second coil 120-2 of the coil ring may be secured to the second side portion 141-2 of the housing 140 by means of an adhesive member.

One end of the first coil 120-1 may be connected to one end of the second coil 120-2. For example, the first coil 120-1 and the second coil 120-2 may be conductively connected to each other in series.

One end of the first coil 120-1 may be conductively connected to the circuit board 190 via the first lower spring 160-1, one end of the second coil 120-2 may be conductively connected to the circuit board 190 via the second lower spring 160-2, and the other end of the first coil 120-1 may be connected to the other end of the second coil 120-2 via the third lower spring 160-3.

At the initial position of the bobbin 110, at least a portion of the first coil 120-1 disposed at the first side portion 141-1 of the housing 140 may overlap the first magnet 130-1 disposed at the bobbin 110 in a direction toward the second side portion 141-2 from the first side portion 141-1 of the housing 140.

At the initial position of the bobbin 110, at least a portion of the second coil 120-2 disposed at the second side portion 141-2 of the housing 140 may overlap the second magnet 130-2 disposed at the bobbin 110 in a direction toward the first side portion 141-1 from the second side portion 141-2 of the housing 140.

Next, the location sensor 170 and the circuit board 190 will be described.

The circuit board 190 and the location sensor 170 may be disposed on the third side surface or the fourth side surface of the housing 140, at which the first and second coils 120-1 and 120-2 are not disposed.

For example, the circuit board 190 and the location sensor 170 may be disposed at the fourth side surface (or the fourth outer surface) of the housing 140 or the fourth side portion 141-4 of the housing 140. In another embodiment, the circuit board 190 may also be disposed at the third side surface (or the third outer surface) of the housing 140 or the third side portion (141-3).

For example, the circuit board 190 may be disposed in the mounting recess 13b formed in the fourth side portion 141-1 of the housing 140, and may have a through hole for coupling to the projection 21. A first surface of the circuit board 190 may be in contact with the mounting recess 13b in the housing 140.

The circuit board 190 may include a plurality of terminals 190-1 to 190-4, which are to be conductively connected to external components. Although the plurality of terminals 190-1 to 190-4 may be arranged at the lower end of the second surface of the circuit board 190, the disclosure is not limited thereto. Here, the second surface of the circuit board 190 may be a surface opposite the first surface of the circuit board 190.

Although the circuit board 190 shown in FIG. 2 includes four terminals 190-1 to 190-4, the disclosure is not limited thereto. In another embodiment, the circuit board 190 may include four or more terminals.

The circuit board 190 may include a circuit pattern or a wire for conductively connecting the location sensor 190 to the terminals 190-1 to 190-4.

Figure 11:
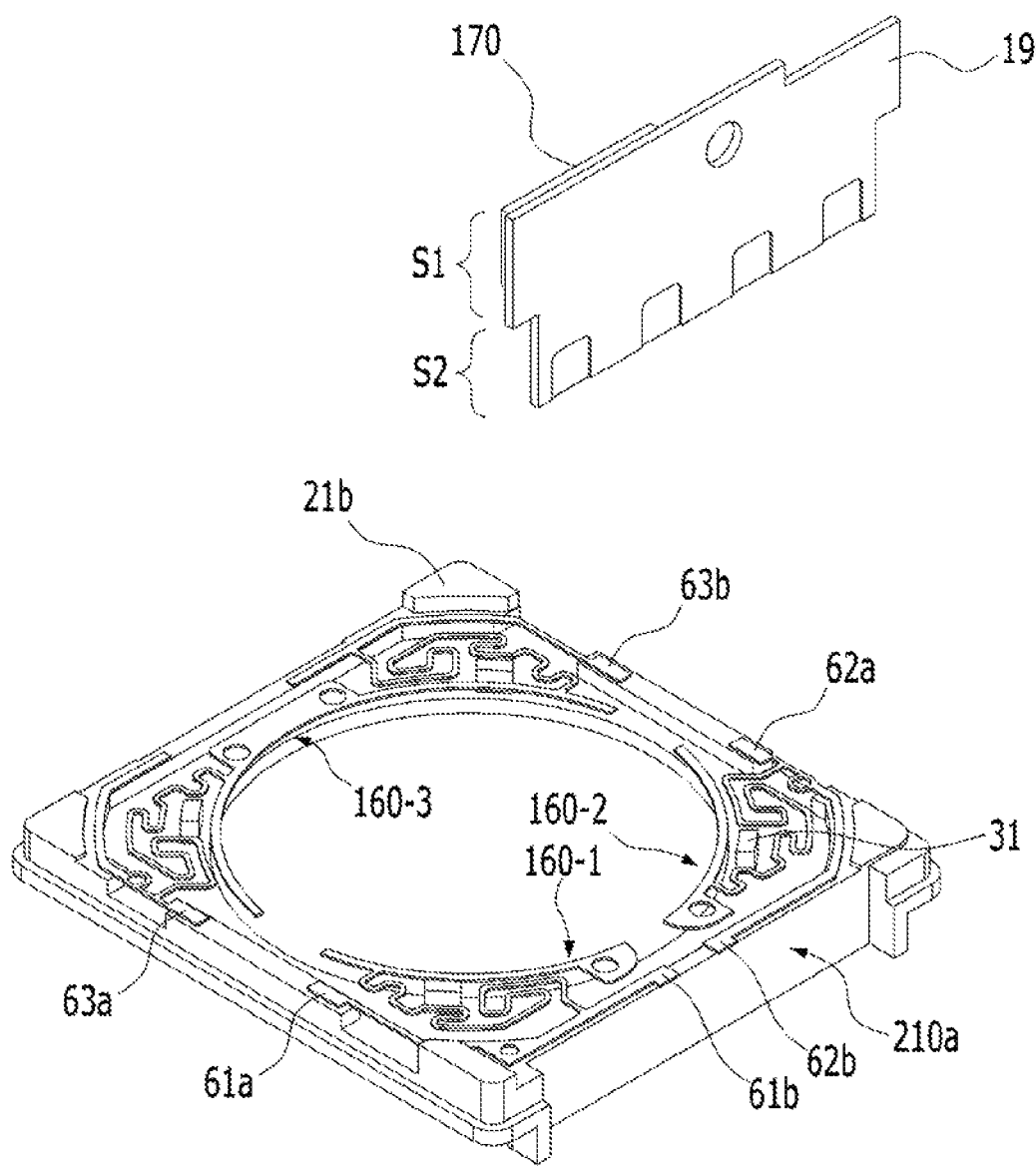
FIG. 11 illustrates the lower elastic member, the base and the circuit board.

The location sensor 170 may be mounted or disposed on a first surface of the circuit board 190, for example, a first surface of the upper portion (S1, see FIG. 11).

The location sensor 170 may be disposed at the mounting portion 17c formed in the fourth side portion 141-4 of the housing 140.

At the initial position of the bobbin 110, the location sensor 170 disposed at the housing 140 may overlap the third magnet 180 in a direction toward the third side surface or the side portion 141-3 of the housing 140 from the fourth side surface or the fourth side portion 141-4 of the housing 140. However, the disclosure is not limited thereto.

In another embodiment, at the initial position of the bobbin 110, the location sensor 170 and the third magnet 180 may not overlap each other in a direction toward the third side surface or the third side portion of the housing 140 from the fourth side surface or the fourth side portion 141-4 of the housing 140.

At the initial position of the bobbin 110, the location sensor 170 disposed at the housing 140 may not overlap the first coil 120-1 or the second coil 120-2 in the direction of the third side surface or the third side portion 141-3 of the housing 140 from the fourth side surface or the fourth side portion 141-4 of the housing 140.

At the initial position of the bobbin 110, the sensor 170 disposed at the housing 140 may not overlap the first magnet 130-1 or the second magnet 130-2 in a direction toward the third side surface or the third side portion 141-3 of the housing 140 from the fourth side surface or the fourth side portion 141-4 of the housing 140.

The location sensor 170 may detect the intensity of the magnetic field of the third magnet 180 mounted on the bobbin 110, and may output the output signal (for example, the output voltage) corresponding to the detected intensity.

The location sensor 170 may be embodied as a driver including a hall sensor.

Figure 14:
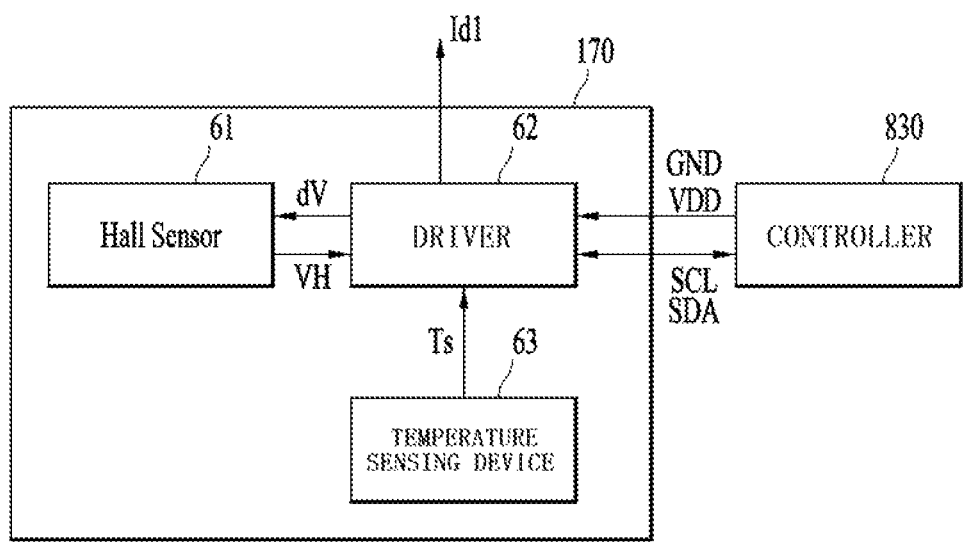
FIG. 14 illustrates an embodiment of the location sensor shown in FIG. 1.

FIG. 14 illustrates an embodiment of the location sensor 170 shown in FIG. 1.

Referring to FIG. 14, the first position sensor 170 may include a hall sensor 61 and a driver 62.

For example, the hall sensor 61 may be made of a silicon-based material. The output VH of the hall sensor 61 may increase as the ambient temperature increases. For example, the ambient temperature may be the temperature of the lens moving apparatus, for example, the temperature of the circuit board 190, the temperature of the hall sensor 61 or the temperature of the driver 62.

In another embodiment, the hall sensor 61 may be made of GsAs, and the output VH of the hall sensor 61 may have a gradient of −0.06%/° C. according to an ambient temperature.

The first location sensor 170 may further include a temperature-sensing element 63 capable of detecting an ambient temperature. The temperature-sensing element 63 may output a temperature-sensing signal Ts according to the detected ambient temperature in the vicinity of the first location sensor 170 to the driver 62.

For example, the hall sensor 61 of the first location sensor 190 may generate the output VH according to the detected intensity of the magnetic force of the third magnet 180.

The driver 62 may output a drive signal dV for driving the hall sensor 61 and a drive signal Id1 for driving the first coil 120.

For example, the driver 62 may receive a clock signal SCL, a data signal SDA and power signals VDD and GND via data communication using a protocol such as I2C communication.

The driver 62 may create the drive signal dV for driving the hall sensor 61 and the drive signal Id1 for driving the first coil 120 using the clock signal SCL and the power signals VDD and GND.

The first location sensor 170 may include first to fourth terminals for sending and receiving the clock signal SCL, the data signal SDA and the power signals VDD and GND, and fifth and sixth terminals for providing a driving signal to the first coil 120.

The circuit board 190 may be conductively connected to the first to sixth terminals (not shown) of the first location sensor 170, and may include a first terminal or a first connection terminal 5*a*, which is conductively connected to the fifth terminal of the first location sensor 170, and a second terminal or a second connection terminal 6*a*, which is conductively connected to the sixth terminal of the first location sensor 1870.

The driver 62 may receive the output VH from the hall sensor 61, and may send the clock signal SCL and the data signal SDA, pertaining to the output VH of the hall sensor 61 via data communication using a protocol such as I2C communication, to the controllers 830 and 780.

Furthermore, the driver 62 may receive the temperature-sensing signal Ts detected by the temperature-sensing element 63, and may send the temperature-sensing signal Ts to the controllers 830 and 780 via data communication using a protocol such as I2C communication.

The controllers 830 and 780 may perform temperature compensation for the output VH from the hall sensor 61 based on variation in the ambient temperature detected by the temperature-sensing element 63 of the first location sensor 170.

For example, when the drive signal dV or a bias signal of the hall sensor 61 is 1 [mA], the output VH of the hall sensor 61 of the first location sensor 170 may be −20 [mV]~+20 [mV].

In the case of temperature compensation for the output VH of the hall sensor 61, having a negative gradient with respect to variation in ambient temperature, the output VH of the hall sensor 61 of the first location sensor 170 may be 0 [mV]~+30 [mV].

When the output of the hall sensor 61 of the first location sensor 170 is plotted on the x-y coordinate system, the reason why the output range of the hall sensor 61 of the first location sensor 170 is represented on the first quadrant (for example, 0 [mV]—+30 [mV]) is as follows.

Because the output of the hall sensor 61 on the first quadrant of the x-y coordinate system and the output of the hall sensor 61 on the third quadrant of the x-y coordinate system move in opposite directions depending on variation in ambient temperature, the accuracy and reliability of the hall sensor may be decreased when both the first and third quadrant are used as an AF operation control zone. Accordingly, in order to accurately compensate for variation in ambient temperature, a specific range in the first quadrant may be considered to be the output range of the hall sensor 61 of the first location sensor 170.

The first location sensor 170 may include the first to third terminals for the clock signal SCL and the two power signals VDD and GND, the fourth terminal for the data SDA, and the fifth and sixth terminals for providing drive signals to the first and second coils 120-1 and 120-2.

Each of the first to fourth terminals of the location sensor 170 may be conductively connected to a corresponding one of the terminals 1901 to 1904 of the circuit board 190.

Each of the fifth and sixth terminals of the location sensor 190 may be conductively connected to a corresponding one of the first and second connection terminals 5*a* and 5*a* of the circuit board 190.

Each of the first and second connection terminals 5*a* and 6*a* of the circuit board 190 may be coupled to a corresponding one of the first and second lower springs 160-1 and 160-2, and may be conductively connected thereto. In other words, the location sensor 190 may provide drive signals to the first and second coils 120-1 and 120-2 via the first and second connection terminals 5*a* and 6*a*.

In another embodiment, the location sensor 190 may be embodied by only a single location detection sensor such as a hall sensor or the like. In this case, the circuit board 190 may include four terminals for driving the location sensor 190, which is embodied by only a location detection sensor, and two terminals for providing drive signals for driving the first and second coils 120-1 and 120-2.

Next, the upper elastic member 150 and the lower elastic member 160 will be described.

Figure 8:
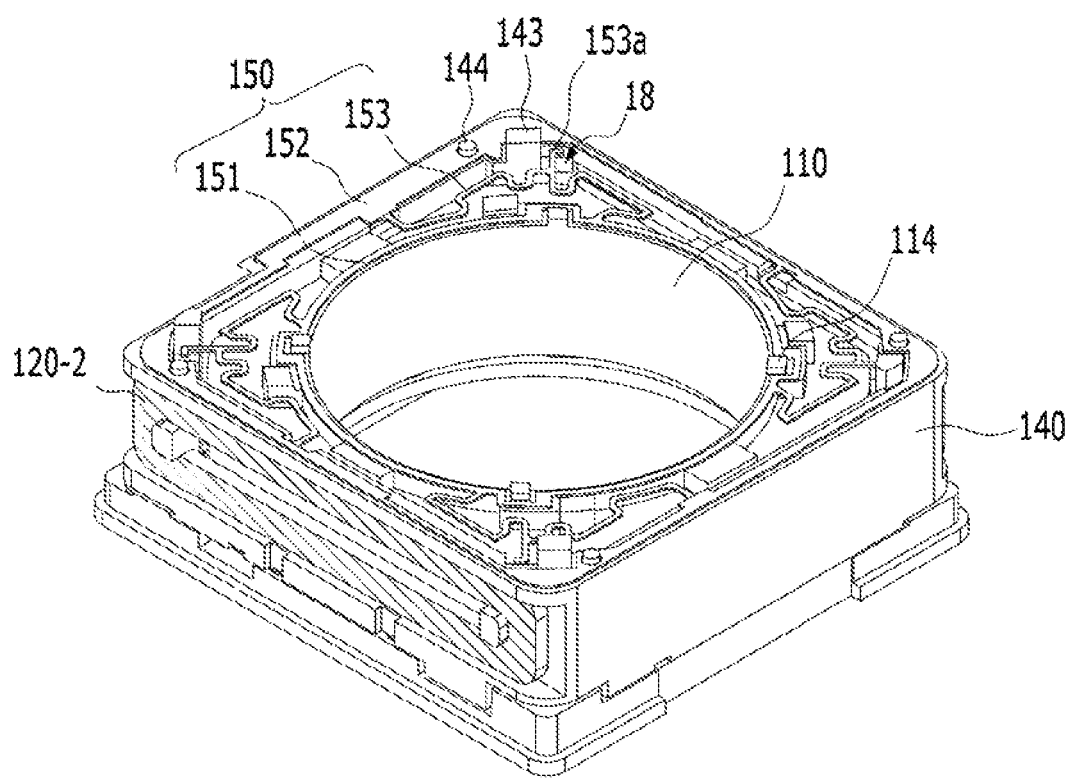
FIG. 8 illustrates an upper elastic member coupled to the housing.
Figure 9:
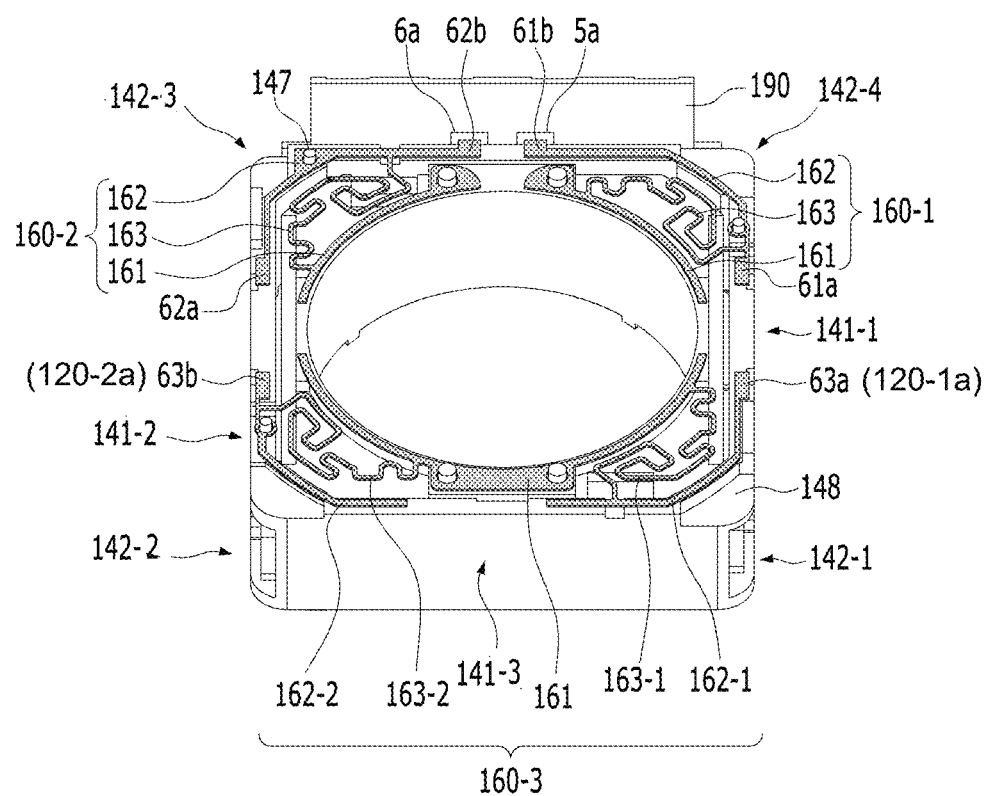
FIG. 9 is a bottom view of a lower elastic member and the circuit board, which are coupled to the housing.
Figure 10:
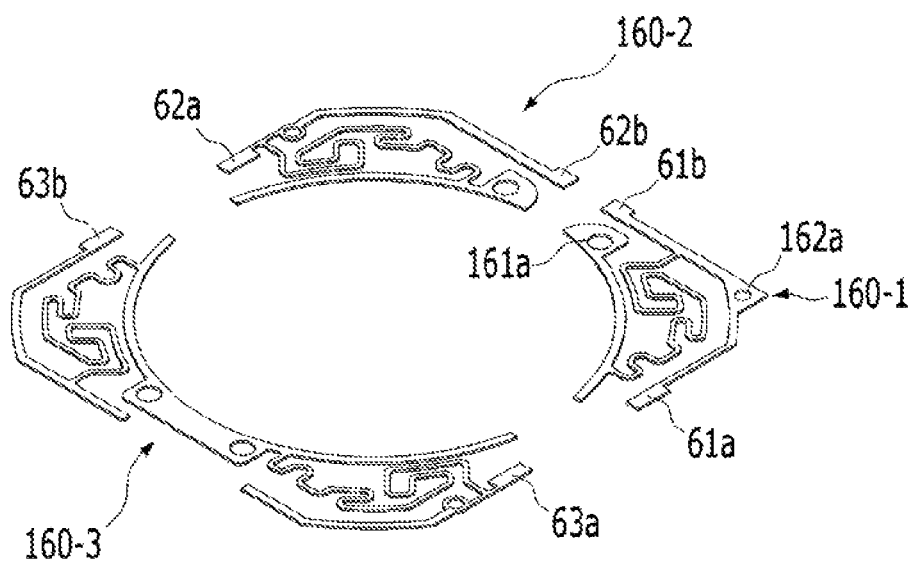
FIG. 10 illustrates the lower elastic member and a base.
Figure 10:
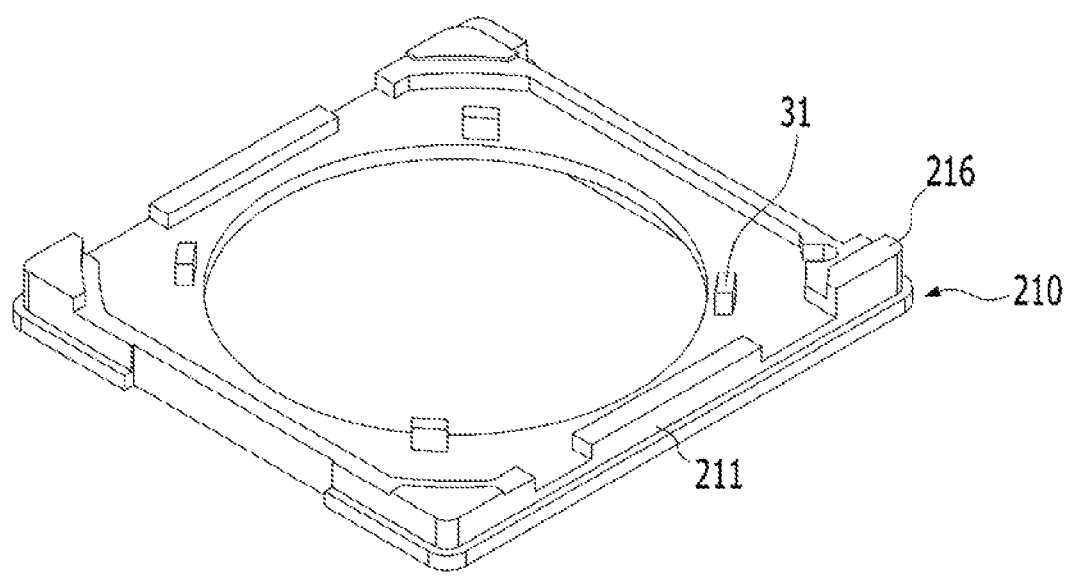
Figure 12:
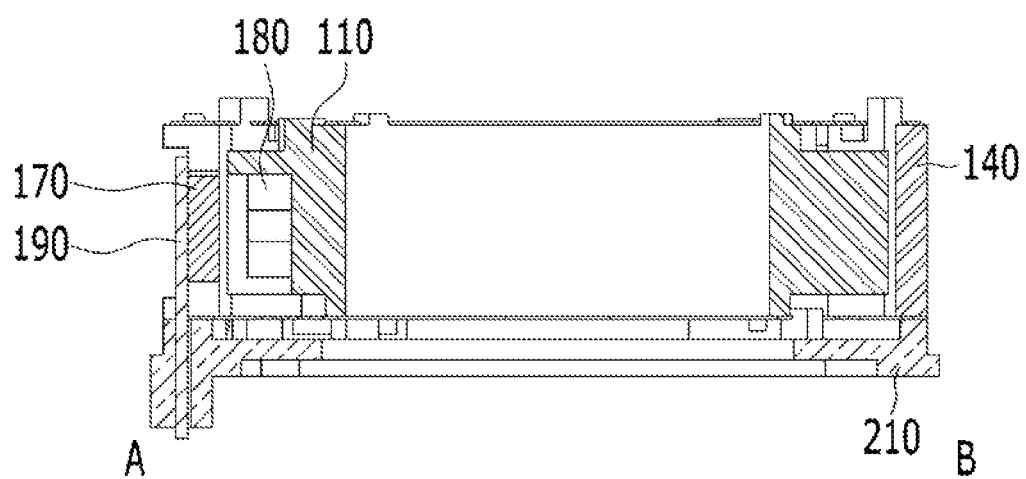
FIG. 12 is a cross-sectional view of the lens moving apparatus shown in FIG. 2, which is taken along line A-B.
Figure 13:
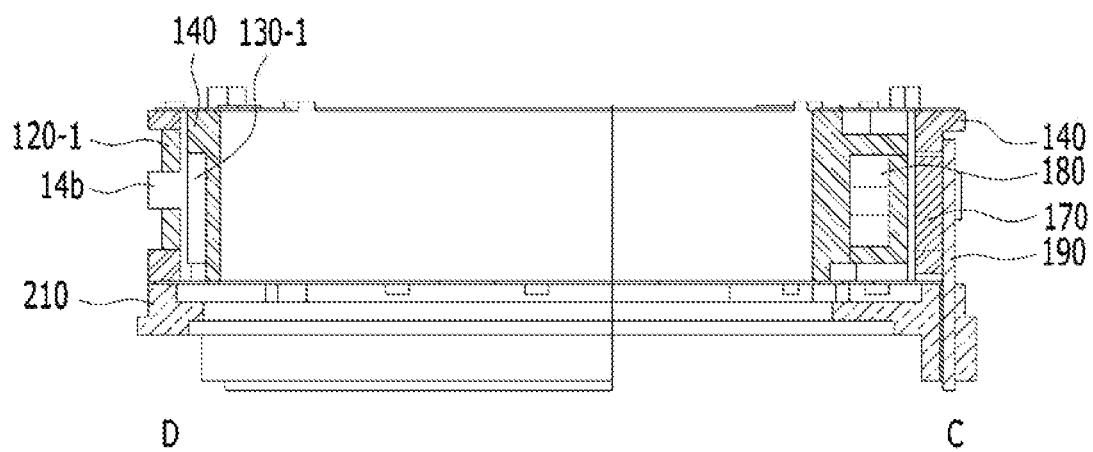
FIG. 13 is a cross-sectional view of the lens moving apparatus shown in FIG. 2, which is taken along line C-D.

FIG. 8 illustrates the upper elastic member 150 coupled to the housing 140. FIG. 9 is a bottom view of the lower elastic member 160 and the circuit board 190, which are coupled to the housing 140. FIG. 10 illustrates the lower elastic member 160 and the base 210. FIG. 11 illustrates the lower elastic member 160, the base 210 and the circuit board 190. FIG. 12 a cross-sectional view of the lens moving apparatus 100 shown in FIG. 2, which is taken along line A-B. FIG. 13 is a cross-sectional view of the lens moving apparatus 100 shown in FIG. 2, which is taken along line C-D.

Referring to FIGS. 8 and 9, each of the upper elastic member 150 and the lower elastic member 160 is coupled both to the bobbin 110 and to the housing 140 so as to support the bobbin 110.

For example, the upper elastic member 150 may be coupled both to the upper portion, the upper surface or the upper end of the bobbin 110 and to the upper portion, the upper surface or the upper end of the housing 140, and the lower elastic member 160 may be coupled both to the lower portion, the lower surface or the lower end of the bobbin 110 and to the lower portion, the lower surface or the lower end of the housing 140.

At least one of the upper and lower elastic members 150 and 160 may be divided or separated into two or more.

For example, the lower elastic member 160 may include a first lower spring 160-1, a second lower spring 160-2 and a third lower spring 160-3. Here, the term "lower spring" may be used interchangeably with "lower elastic unit".

Although each of the upper elastic member 150 and the lower elastic member 160 may be embodied as a leaf spring, the disclosure is not limited thereto. Each of the upper and lower elastic members 150 and 160 may be embodied as a coil spring, a suspension wire or the like.

The upper elastic member 150 may include a first inner frame 151 coupled to the upper portion, the upper surface or the upper end of the bobbin 110, a first outer frame 152 coupled to the upper portion, the upper surface or the upper end of the housing 140, and a first frame connection portion 153 connecting the first inner frame 151 to the first outer frame 152.

The first inner frame 151 of the upper elastic member 150 may have formed therein a hole, which is coupled to the first coupling portion 113 of the bobbin 110, and the first outer frame 152 may have formed therein a hole, which is coupled to the protrusion 144 of the housing 140.

For example, the upper elastic member 150 may include four first frame connection portions 153. The four first frame connection portions may be positioned so as to correspond to the first to fourth corner portions 142-1 to 142-4 of the housing 140.

The first to third lower springs may be coupled to the bobbin 110. The first to third lower springs 160-1 to 160-3 may be coupled both to the bobbin 110 and to the housing 140.

The first to third lower springs 160-1 to 160-3 may be disposed between the bobbin 110 and the base 210.

At least one of the first to third lower springs 160-1 to 160-3 may include the second inner frame 161 coupled to the lower portion, the lower surface or the lower end of the bobbin 110, the second outer frame 162 coupled to the lower portion, the lower surface or the lower end of the housing 140, and the second frame connection portion 163 connecting the second inner frame 161 to the second outer frame 162. The term "inner frame" may be used interchangeably with the term "inner portion", and the term "outer frame" may be used interchangeably with the term "outer portion".

The second inner frame 161 of at least one of the first to third lower springs 160-1 to 160-3 may have formed therein a hole 161*a* for coupling the second coupling portion 117 of the bobbin 110 using solder or a conductive adhesive member.

The second outer frame 162 of at least one of the first to third lower springs 160-1 to 160-3 may have formed therein a hole 162 for coupling the protrusion 147 of the housing 140.

For example, the second outer frame 162 of the first lower spring 160-1 may be disposed on the lower portion or the lower surface of the first side portion 141-1 of the housing 140, the lower portion or the lower surface of the fourth corner portion 142-4, and the lower portion or the lower surface of the fourth side portion 141-4.

The second outer frame 162 of the first lower spring 160-1 may include the first bonding portion 61, to which one end of the first coil 120-1 is coupled, and the second bonding portion 61*b*, to which the first connection terminal (or the first terminal) 5*a* of the circuit board 190.

For example, the first bonding portion 61*a* may be provided at one end of the second outer frame 162 of the first lower spring 160-1, and the second bonding portion 61*b* may be provided at the other end of the second outer frame 162 of the first lower spring 160-1.

For example, the first bonding portion 61*a* may be positioned adjacent to the portion at which the second frame connection portion is connected to the second outer frame, and may be positioned on the lower surface or the lower portion of the first side portion 141-1 of the housing 140.

The second bonding portion 61*b* may be positioned at the lower surface of the fourth side portion 141-4 or below the lower portion of the fourth side portion 141-4. For example, the second bonding portion 61*b* may project toward the circuit board 190 from the outer surface of the second outer frame positioned at the fourth side portion 141-4 so as to be easily coupled to the first connection terminal 5*a* of the circuit board 190.

For example, the second outer frame 162 of the second lower spring 160-2 may be disposed on the lower portion or the lower surface of the second side portion 141-2 of the housing 140, the lower portion or the lower surface of the third corner portion 142-3, and the lower portion or the lower surface of the fourth side portion 141-4 of the housing 140.

The second outer frame 162 of the second lower spring 160-2 may include the third bonding portion 62*a*, to which one end of the second coil 120-2 is coupled, and the fourth bonding portion 62*b*, which is coupled to the second connection terminal 6*a* of the circuit board 190.

For example, the third bonding portion 62*a* may be provided at one end of the second outer frame 162 of the second lower spring 160-2, and the fourth bonding portion 62*b* may be provided at the other end of the second outer frame 162 of the second lower spring 160-2.

The third bonding portion 62*a* may be positioned at the lower surface or the lower portion of the second side portion 141-2 of the housing 140. The fourth bonding portion 62*b* may be positioned at the lower surface or the lower portion of the fourth side portion 141-4 of the housing 140.

For example, the fourth bonding portion 62*b* may project toward the circuit board 190 from the outer surface of the second outer frame 162 positioned at the fourth side portion 141-4 of the housing 140 so as to be easily coupled to the second connection terminal 6a of the circuit board 190.

Each of the second bonding portion 61b and the fourth bonding portion 62b may project in a direction toward the outer surface from the inner surface of the fourth side portion 141-4 of the housing 140.

The second bonding portion 61b and the fourth bonding portion 62b may be spaced apart from each other, and may be symmetrical with respect to the first central line. However, the disclosure is not limited thereto. The first central line may be a straight line, which extends through the center of the opening in the housing 140 and is parallel to a direction toward the fourth side portion 141-4 from the third side portion 141-3.

The second outer frame 162 of the third lower spring 160-3 may include the fifth bonding portion 63a, to which the outer end of the first coil 120-1 is coupled, and the sixth bonding portion 63b, to which the outer end of the second coil 120-2 is coupled.

The third lower spring 160-3 may include two second outer frames 162-1 and 162-2, the second inner frame 161 and two second frame connection portions 163-1 and 163-2.

The second outer frames 162-1 and 162-2 of the third lower spring 160-3 may be disposed on the lower portions or the lower surfaces of the first to third side portions 141-1 to 141-3 of the housing 140, and the lower portions or the lower surfaces of the first and second corner portions 142-1 and 142-2 of the housing 140.

The second outer frame 162-1 of the third lower spring 160-3 may be disposed on the lower portion or the lower surface of the first side portion 141-1 of the housing 140 and the lower portion or the lower surface of the second side portion 141-2, and the second outer frame 162-2 may be disposed on the lower portion or the lower surface of the second side portion 141-2 of the housing 140, the lower portion or the lower surface of the second corner portion 142-2 and the lower portion or the lower surface of the third side portion 141-3.

For example, the fifth bonding portion 63a may be provided at one end of the second outer frame 162-1 of the third lower spring 160-3, and the sixth bonding portion 63b may be provided at one end of the second outer frame 162-2 of the third lower spring 160-3.

For example, the fifth bonding portion 63a may be positioned at the lower portion or the lower surface of the first side portion 141-1 of the housing 140, and the sixth bonding portion 63b may be positioned at the lower portion or the lower surface of the second side portion 141-2 of the housing 140.

In FIG. 9, the second outer frames 161-2 and 162-2 of the third lower spring 160-3 may be spaced apart from each other. However, the disclosure is not limited thereto, and the second outer frames may be connected to each other in another embodiment.

By means of solder or a conductive adhesive member, one end of the first coil 120-1 may be coupled to the first bonding portion 61a of the first lower spring 160-1, and the other end of the first coil 120-1 may be coupled to the fifth bonding portion 63a of the third lower spring 160-3.

By means of solder or a conductive adhesive member, one end of the second coil 120-2 may be coupled to the third bonding portion 62a of the second lower spring 160-2, and the other end of the second coil 120-2 may be coupled to the sixth bonding portion 63b of the third lower spring 160-3.

For example, in order to facilitate soldering to two ends of the first coil 120-1, one of the first bonding portion 61a and the fifth bonding portion 63a (for example, 61a) may project in a direction toward the inner surface from the outer surface of the first side portion 141-1 of the housing 140, and the other of the first bonding portion 61a and the fifth bonding portion 63a (for example, 63a) may project in a direction toward the outer surface from the inner surface of the first side portion 141-1 of the housing 140.

For example, in order to facilitate soldering to two ends of the second coil 120-2, one of the third bonding portion 62a and the sixth bonding portion 63b (for example, 63b) may project in a direction toward the inner surface from the outer surface of the second side portion 141-2 of the housing 140, and the other of the third bonding portion 62a and the sixth bonding portion 63b (for example, 62a) may project in a direction toward the outer surface from the inner surface of the second side portion 141-2 of the housing 140.

The first bonding portion 61 and the fifth bonding portion 63a may project in opposite directions, and the third bonding portion 62a and the sixth bonding portion 63b may project in opposite directions; however, the disclosure is not limited thereto. In another embodiment, the first bonding portion 61a and the fifth bonding portion 63a may project in the same direction, and the third bonding portion 62a and the sixth bonding portion 63b may project in the same direction.

The first coil 120-1 and the second coil 120-2 may be connected to each other in series via the third lower spring 160-3, and one drive signal may be provided to the first coil 120-1 and the second coil 120-2 from the circuit board 190 via the second bonding portion 61b and the fourth bonding portion 62b.

Each of the first frame connection portion 153 and the second frame connection portions 163, 163-1 and 163-2 of the upper elastic member 150 and the lower elastic member 160 may be bent or curved (or may be formed into a curved line) at least once so as to define a predetermined pattern. The upward and/or downward movement of the bobbin 110 in the first direction may be flexibly (or elastically) supported through changes in position and fine deformation of the first and second frame connection portions 153, 163, 163-1 and 163-2.

The upper elastic member 150 may include the extension 153a, which extends toward the corner portions of the housing 140 from one side surface of the first frame connection portion 153.

For example, the extension 153a of the upper elastic member 150 may extend to a damping injection groove 18 formed in the corner portion of the housing 140 from one side surface of the first frame connection portion 153, and one end of the extension 153a may be bent.

For example, the one end of the extension 153a may be bent in a direction perpendicular to a direction toward the corner portion of the housing 140 from the one side surface of the first frame connection portion 153. The reason why the one end of the extension 153a is bent is to increase damping force by increasing the contact area with the damper.

In order to absorb and dampen vibrations of the bobbin 110, a damper may be provided in the damping injection groove 18 so as to cover the extension 153a.

In order to absorb and dampen vibrations of the bobbin 110, the lens moving apparatus 100 may further include a damper (not shown) disposed between the upper elastic member 150 and the housing 140.

For example, the damper (not shown) may be disposed in the space between the first frame connection portion 153 of the upper elastic member 150 and the housing 140.

For example, the lens moving apparatus 100 may further include a damper (not shown) disposed between the second frame connection portions 163, 163-1 and 163-2 of each of the first to third lower springs 160-1 to 160-3.

For example, a damper (not shown) may also be disposed between the inner surface of the housing 140 and the outer surface of the bobbin 110.

Next, the base 210 will be described.

Referring to FIGS. 10 and 11, the base 210 may have an opening corresponding to the opening in the bobbin 110 and/or the opening in the housing 140, and may have a shape corresponding to or coinciding with that of the cover member 300, for example, a square shape.

The base 210 may include a step 211 at the lower end of the side surface thereof, to which an adhesive is applied when the cover member 300 is secured to the base 210 via adhesion. Here, the step 211 may guide the cover member 300, which is coupled to the upper side of the base, and may face the lower end of the side plate of the cover member 300. An adhesive member or a sealing member may be disposed or applied between the lower end of the side plate of the base 210 and the step 211 of the base 210.

The base 210 may be disposed below the bobbin 110 and the housing 140.

For example, the base 210 may be disposed below the lower elastic member.

The projection 216 may be provided at a corner of the upper surface of the base 210. Although the projection 216 may have the form of a polygonal column, which projects perpendicularly from the upper surface of the base 210, the disclosure is not limited thereto.

The projection 216 may be fitted into the guide groove 148 in the housing 140, and may be fastened or coupled to the guide groove 148 using an adhesive member (not shown) such as epoxy or silicone.

The base 210 may include a side surface corresponding to the first side surface of the bobbin 110, a second side surface corresponding to the second side surface of the bobbin 110, and a third side surface and a fourth side surface disposed between the first side surface of the base 210 and the second side surface of the base 210. For example, the third and fourth side surfaces of the base 210 may correspond to the third and fourth side surfaces of the bobbin 110.

The first to third springs 160-1 to 160-3 may be disposed on the upper surface of the base 210. For example, the first spring 160-1 may be disposed on the upper surface of the base 210 positioned between the first side surface of the base 210 and the fourth side surface of the base.

For example, the second spring 160-2 may be positioned on the upper surface between the second side surface of the base 210 and the fourth side surface of the base.

For example, the third spring 160-3 may be disposed on the upper surface of the base 210 positioned between the first side surface of the base 210 and the second side surface of the base 210.

For example, the upper surface of the base 210 may include a first side corresponding to the first side surface of the bobbin 110, a second side corresponding to the second side surface of the bobbin 110, and third and fourth sides positioned between the first side and the second side. The first spring 160-1 may be positioned between the first side and the fourth side of the upper surface of the base 210, the second spring 160-2 may be positioned between the second side and the fourth side of the upper surface of the base 210, and the third spring 160-3 may be positioned between the first side, the second side and the third side.

The base 210 may include stoppers 23 projecting from the upper surface thereof.

Although the stoppers 23 may be disposed so as to correspond to the projections 216, the disclosure is not limited thereto. The stoppers 23 may be disposed at positions corresponding to the second frame connection portion 163 of the lower springs 160-1 to 160-3.

In order to avoid spatial interference between the bobbin 110 and the lower elastic member 160, the stoppers 23 of the base 210 may be positioned higher than the second frame connection portions 163 of the lower springs 160-1 to 160-3 coupled to the base 210. The stoppers 23 of the base 210 are able to prevent the lower surface or the lower end of the bobbin 210 from directly colliding with the upper surface of the base 210 when an external impact occurs.

The base 210 may include a mounting recess 210a formed in the side surface corresponding to the circuit board 190, in which the lower end of the circuit board 190 is mounted.

For example, the mounting recess 210a may be formed in one side surface of the base corresponding to the fourth side portion 141-4 of the housing 140.

Referring to FIGS. 9 and 11, the circuit board 190 may include the upper portion S1 and the lower portion S2. The horizontal length of the lower portion S2 may be smaller than the horizontal length of the upper portion S1.

The upper portion S1 of the circuit board 190 may be disposed in the mounting recess 13b in the housing 140. The lower portion S2 of the circuit board 190 may project downwards from the lower portion or the lower surface of the housing 140, and may be disposed in the mounting recess 210a in the base 210.

The terminals 190-1 to 190-2 may be disposed on the second surface of the lower portion S1 of the circuit board 190, and the first surface of the upper portion S1 of the circuit board 190 may be provided thereon with the first and second connection terminals 5a and 6a, to which the second bonding portion 61a and the fourth bonding portion 62b are bonded.

All of the first and second magnets 130-1 and 130-2, that is, the drive magnets, and the third magnet 180, that is, a sensing magnet, are mounted on the bobbin 110, and the first and second coils 120-1 and 120-2, corresponding to the first and second magnets 130-1 and 130-2, may be disposed at the housing 140. As a result, the embodiment is able to simplify the structure of the lens moving apparatus and reduce the size thereof.

The first and second coils 120-1 and 120-2 may be bonded to the first bonding portion 61a, the third bonding portion 62a, the fifth bonding portion 63a and the sixth bonding portion using solder, and the first coil 120-1 and the second coil 120-2 may be connected to each other via the third lower spring 160-3. Consequently, the embodiment is able to prevent disconnection of the first and second coils 120-1 and 120-2 and separation of the first and second coils 120-1 and 120-2 from the housing 140.

Figure 15:
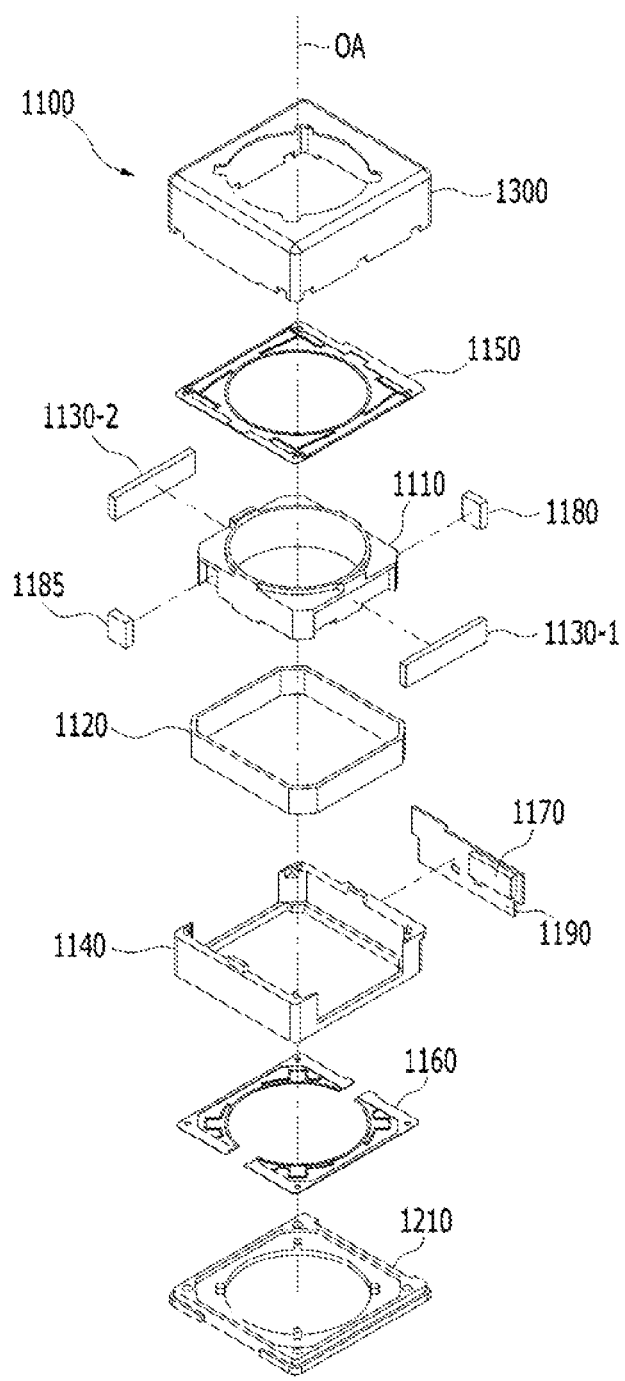
FIG. 15 is an exploded view of a lens moving apparatus according to another embodiment.
Figure 16:
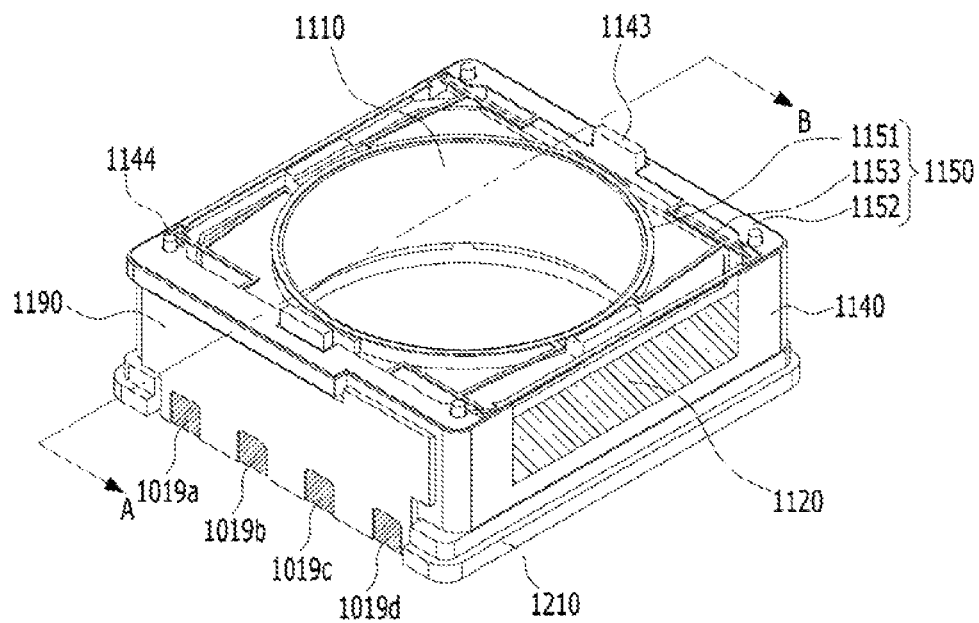
FIG. 16 is an assembled perspective view of the lens moving apparatus shown in FIG. 15, from which a cover member is removed.

FIG. 15 is an exploded view of a lens moving apparatus 1100 according to another embodiment. FIG. 16 is an assembled perspective view of the lens moving apparatus 1100 shown in FIG. 15, from which a cover member 1300 is removed.

Referring to FIGS. 15 and 16, the lens moving apparatus 1100 includes a bobbin 1110, a coil 1120, a first magnet 1130-1, a second magnet 1130-2, a housing 140, an upper elastic member 1150 and a lower elastic member 1160.

The lens moving apparatus 1100 may further include a location sensor 1170, a circuit board 1190 and a third magnet 1180 for AF feedback operation. The lens moving apparatus 1100 may further include a cover member 1300 and a base 1210.

The cover member 1300 will first be described.

The cover member 1300 and the base 1210 may define therebetween a space for accommodating the other components 1110, 1120, 1130-1, 1130-2, 1140, 1150, 1160, 1170, 1180, 1185 and 1190 therein.

The cover member 1300 may have the form of a box, which is open at the bottom and include the top plate and side plates. The lower ends of the side plates of the cover member 1300 may be coupled to the upper portion of the base 1210. The top plate of the cover member 1300 may have a polygonal shape, for example, a square shape or an octagonal shape, and may have an opening, through which the lens (not shown) is exposed to external light.

Although the cover member 1300 may be made of a nonmagnetic material such as SUS or plastic in order to prevent the cover member 1300 from being attracted to the magnet 130, the cover member 1300 may be made of a magnetic material so as to serve as a yoke.

Next, the bobbin 1110 will be described.

The bobbin 1110 may be disposed inside the housing 1140, and may be moved in the optical-axis direction or in the first direction (for example, in the z-axis direction) by electromagnetic interaction between the coil 1120 and the first and second magnets 1130-1 and 1130-2.

Figure 17:
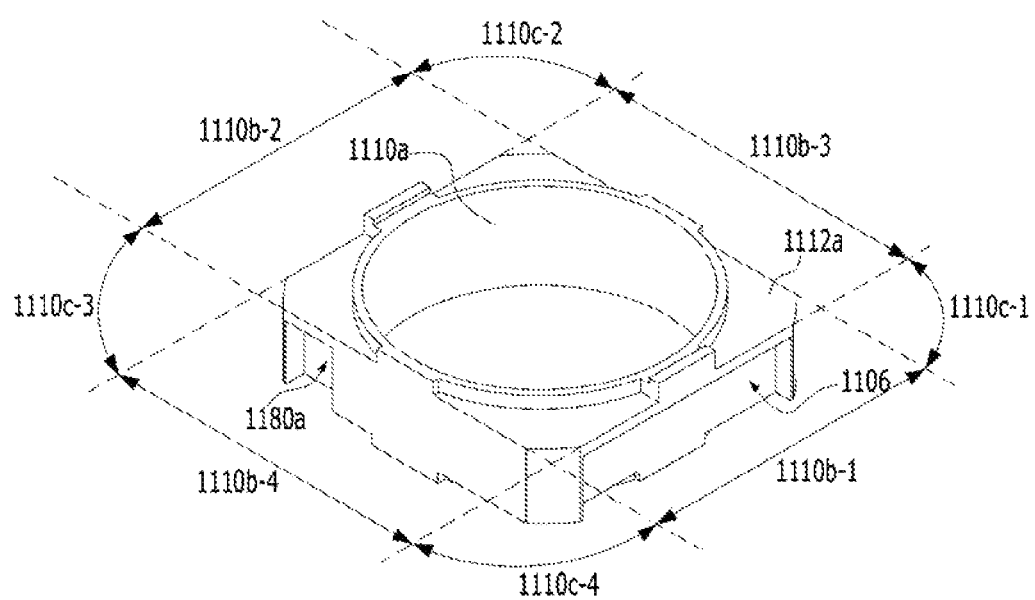
FIG. 17 is a perspective view of the bobbin shown in FIG. 15.
Figure 18:
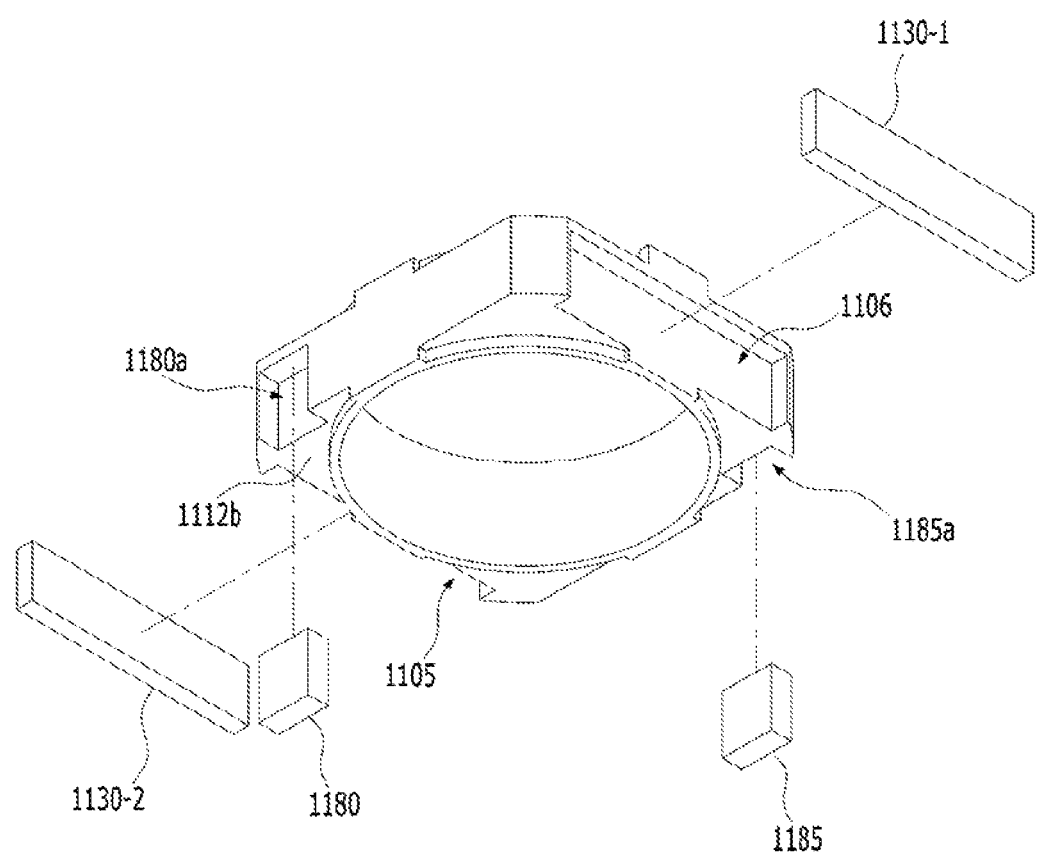
FIG. 18 illustrates a bobbin, first and second magnets, a third magnet and a fourth magnet.

FIG. 17 is a perspective view of the bobbin 1110 shown in FIG. 15. FIG. 18 illustrates the bobbin 1110, the first and second magnets 1130-1 and 1130-2, the third magnet 1180, and the fourth magnet 1185, which are shown in FIG. 15.

Referring to FIGS. 17 and 18, the bobbin 1110 may be provided with a lens or a lens barrel mounted therein, and may be disposed in the housing 1140. The bobbin 1110 may have an opening for mounting of the lens or the lens barrel. Although the opening may have a circular shape, an elliptical shape or a polygonal shape, the disclosure is not limited thereto.

The bobbin 1110 may include a first coupling portion (not shown), which is disposed on the upper surface thereof and is coupled and secured to a first inner frame 1151 of the upper elastic member 1150, and a second coupling portion (not shown), which is disposed on the lower surface thereof and is coupled and secured to a second inner frame 1161 of the lower elastic member 1160.

Although each of the first and second coupling portions of the bobbin 1110 may have a protrusion, a groove or a planar shape, the disclosure is not limited thereto.

The bobbin 1110 may include a first escape recess 1112a formed in the region of the upper surface that corresponds to or is aligned with a first frame connection portion 1153 of the upper elastic member 1150.

Furthermore, the bobbin 1110 may include a second escape recess 1112b formed in a region of the lower surface that corresponds to or is aligned with a second frame connection portion 1163 of the lower elastic member 1160.

By virtue of the first escape recess 1112a and the second escape recess 1112b of the bobbin 1110, it is possible to eliminate spatial interference between the first frame connection portion 1152 and the second frame connection portion 1163 and the bobbin 1110 when the bobbin 1110 is moved in the first direction. Consequently, the first frame connection portion 1153 and the second frame connection portion 1163 may be elastically deformed with ease.

The bobbin 1110 may have first to fourth side surfaces 1110b-1 to 1110b-4 and fifth to eighth side surfaces 1110c-1 to 1110c-4. The first to eighth side surfaces 1110b-1 to 1110b-4 of the bobbin 1110 may define the outer surface of the bobbin 1110.

The first to fourth side surfaces 1110b-1 to 1110b-4 may be used interchangeably with first to fourth side portions of the bobbin 1110, and the fifth to eighth side surfaces of the bobbin 1110 may be used interchangeably with the first to fourth corner portions of the bobbin 1110.

Each of the fifth to eighth side surfaces 1110c-1 to 1110c-4 of the bobbin 110 may connect two adjacent ones of the first to fourth side surfaces 1110b-1 to 1110b-4.

For example, the surface area of each of the fifth to eighth side surfaces 1110c-1 to 1110c-4 may be smaller than the surface area of each of the first to fourth side surfaces 1110b-1 to 1110b-4.

For example, the horizontal length of each of the fifth to eighth side surfaces 1110c-1 to 1110c-4 may be smaller than the horizontal length of each of the first to fourth side surfaces 1110b-1 to 1110b-4.

For mounting of the first and second magnets 1130-1 and 1130-2, the bobbin 1110 may have a first recess 1105 formed in one of two facing side surfaces (for example, 1110b-1 and 1110b-2) and a second recess 1106 formed in the other of two facing side surfaces (for example, 1110b-1 and 1110b-2).

The first and second recesses 1105 and 1106 may overlap in a direction toward the second side surface 1110b-2 from the first side surface 1110b-1 of the bobbin 1110, and the shape of the first and second recesses 1105 and 1106 may coincide with the shape of the first and second magnets 1130-1 and 1130-2.

For mounting the third and fourth magnets 1180 and 1185, the bobbin 1110 may include a third recess 1180a formed in one of the other two facing sides surfaces (for example, 1110b-3 and 1110b-4) and a fourth recess 1185a formed in the other of the other two facing side surfaces (for example, 1110b-3 and 1110b-4).

Although the third and fourth recesses 1180a and 1185a may not overlap each other in a direction toward the fourth side surface 1110b-4 from the third side surface 1110b-3 of the bobbin 1110, the disclosure is not limited thereto. In another embodiment, the third and fourth recesses 1180a and 1185a may overlap each other in a direction toward the fourth side surface 1110b-4 from the third side surface 1110b-3 of the bobbin 1110.

The shape of each of the third and fourth recesses 1180a and 1185a may coincide with the shape of a corresponding one of the third and fourth magnets 180 and 1185.

Next, the first and second magnets 1130-1 and 1130-2 will be described.

The first and second magnets 1130-1 and 1130-2 may be drive magnets capable of generating electromagnetic force resulting from interaction with the coil 1120 and of moving the bobbin 1110 using the electromagnetic force.

The first magnet 1130-1 and the second magnet 1130-2 may be disposed on two facing side surfaces of the bobbin 1110 (for example, 1110b-1 and 1110b-2).

For example, the first magnet 1130-1 may be disposed on the first side surface 1110b-1 of the bobbin 1110, and the second magnet 1130-2 may be disposed on the second side surface 1110b-2 of the bobbin 1110.

For example, each of the first and second magnets 1130-1 and 1130-2 may be disposed in a corresponding one of the first recess 1105 and the second recess 1106 in the bobbin 1110.

In another embodiment, the recess may not be formed in the first or second side surfaces 1110b-1 and 1110b-2 in the bobbin 1110, and the first and second magnets 1130-1 and 1130-2 may be disposed on the first and second side surfaces 1110b-1 and 1110b-2 in the bobbin 1110.

Although each of the first and second magnets 1130-1 and 1130-2 may have a shape corresponding to the first and second side surfaces 1110b-1 and 1110b-2 of the bobbin 1110, for example, a rectangular parallelepiped shape, the disclosure is not limited thereto.

Each of the first and second magnets 1130-1 and 1130-2 may be a bipolar magnetized magnet divided into two parts in a direction perpendicular to the optical axis. Here, each of the first and second magnets 1130-1 and 1130-2 may be embodied by a ferrite magnet, alnico magnet, rare-earth magnet or the like.

The first and second magnets, having a bipolar magnetized structure, may include a first magnet portion including an N pole and an S pole, a second magnet portion including an N pole and an S pole, and a nonmagnetic partition.

The first magnet portion and the second magnet portion may be spaced apart from each other, and the nonmagnetic partition may be located between the first magnet portion and the second magnet portion. The nonmagnetic partition may be a portion having substantially no magnetism, may include a section having little polarity, and may be filled with air or may be made of a nonmagnetic material.

In another embodiment, each of the first and second magnets 1130-1 and 1130-2 may be a monopolar magnetized magnet, which is disposed such that a first surface thereof facing the coil 1120 has an S pole and a second surface opposite the first surface has an N pole; however, the disclosure is not limited thereto. In a further embodiment, the first surface of each of the first and second magnets 130-1 and 130-2 may have an N pole, and the second surface may have an S pole.

Next, the third magnet 1180 and the fourth magnet 1185 will be described.

The third magnet 1180 may be a sensing magnet. The location sensor 180 may detect variation in the intensity of the magnetic field of the third magnet 1180 due to movement of the bobbin 1110.

The fourth magnet 1185 may be a balancing magnet for attaining weight equilibrium with respect to the third magnet 1180. The weight equilibrium of the AF operation unit may be attained by means of the fourth magnet 1185, thereby ensuring accurate AF operation. In another embodiment, the fourth magnet 1185 may be omitted.

The third magnet 1180 may be disposed on the fourth side surface 1110b-4 of the bobbin 1110.

The fourth magnet 1185 may be disposed on the third side surface 1110b-3 of the bobbin 1110.

The third magnet 1180 may be disposed in the third recess in the bobbin 1110, and the fourth magnet 1185 may be disposed in the fourth recess 1185a in the bobbin 1110.

A portion of one surface of the third magnet 1180 mounted in the third recess 1180a of the bobbin 1110 and/or a portion of one surface of the fourth magnet 1185 may be exposed through the side surface of the bobbin 1110. However, the disclosure is not limited thereto, and the portion may not be exposed through the side surface of the bobbin 1110 in another embodiment.

Although each of the third and fourth magnets 1180 and 1185 may be a monopolar magnetized magnet, which is disposed such that an upper surface has an N pole and a lower surface has an S pole, the disclosure is not limited thereto, and the polarities may be disposed in the opposite manner.

For example, each of the third magnet 1180 and the fourth magnet 1185 may be disposed such that the boundary plane between the N pole and the S pole is parallel to a direction perpendicular to the optical axis. However, the disclosure is not limited thereto, and the boundary plane between the N pole and the S pole may be parallel to the optical axis in another embodiment.

In another embodiment, each of the third magnet 1180 and the fourth magnet 1185 may be a bipolar magnetized magnet. The bipolar magnetized magnet may include a first magnet portion including an N pole and an S pole, a second magnet portion including an N pole and an S pole, and a nonmagnetic partition disposed between the first magnet and the second magnet.

By virtue of the electromagnetic force resulting from the interaction between the coil 1120 and the first and second magnets 1130-1 and 1130-2, the third magnet 1180 may be moved together with the bobbin 1110 in the optical-axis direction OA. The location sensor 1170 may detect the intensity of the magnetic field of the third magnet 1180, which is moved in the optical-axis direction, and may output the output signal corresponding to the detected intensity.

For example, the controller 830 of the camera module 200 or the controller 780 of the terminal 200A may detect displacement of the bobbin 1110 in the optical-axis direction based on an output signal output from the location sensor 1170.

Next, the housing 1140 will be described.

The housing 1140 accommodates therein the bobbin 1110, at which the first and second magnets 1130-1 and 1130-2 and the third and fourth magnets 1180 and 1185 are disposed.

Figure 19A:
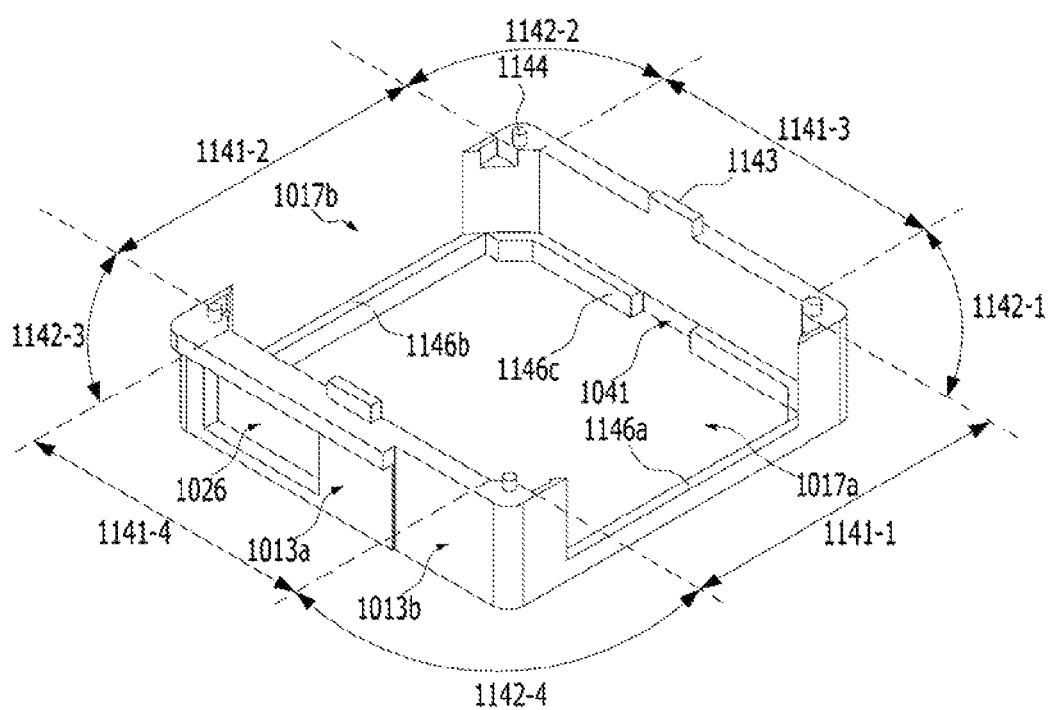
FIG. 19A is a perspective view of a housing shown in FIG. 15.
Figure 19B:
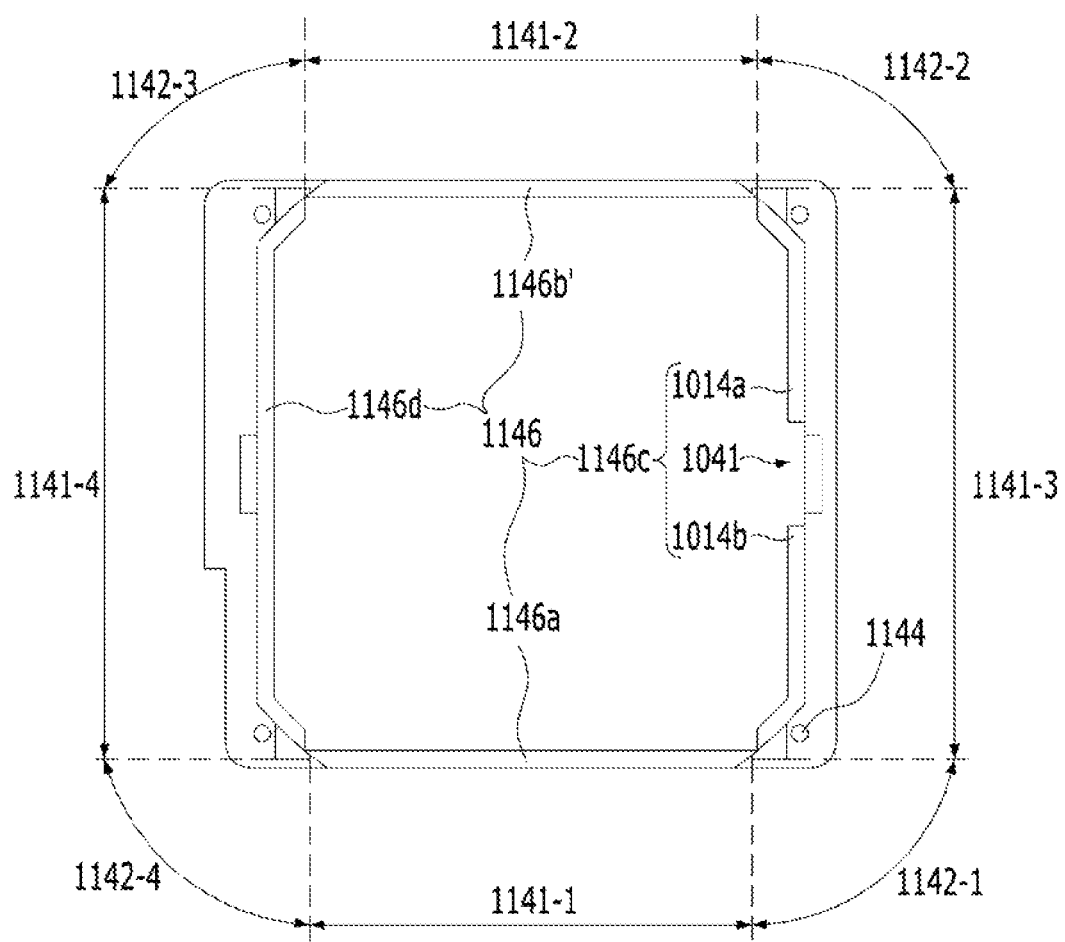
FIG. 19B is a plan view of the housing shown in FIG. 15.
Figure 20:
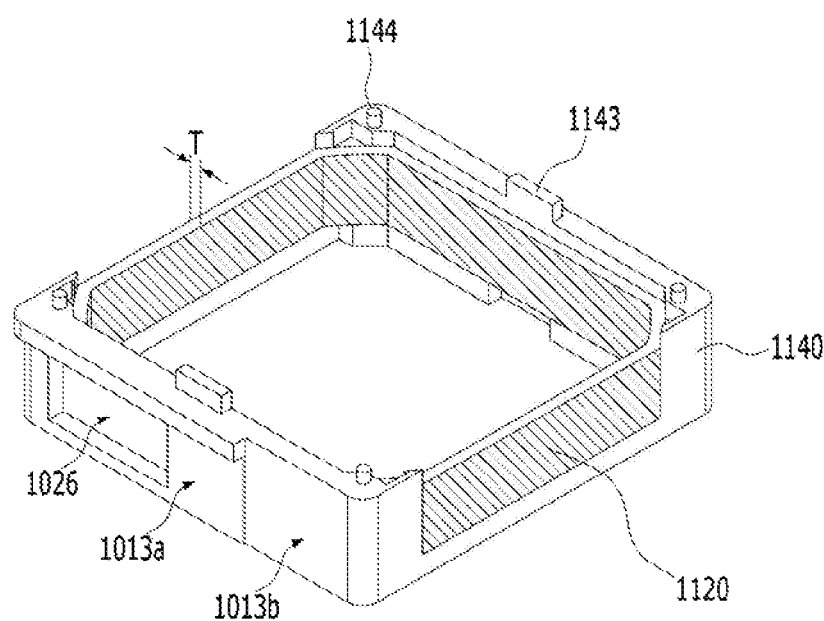
FIG. 20 is a perspective view of the housing with a coil coupled thereto.
Figure 21:
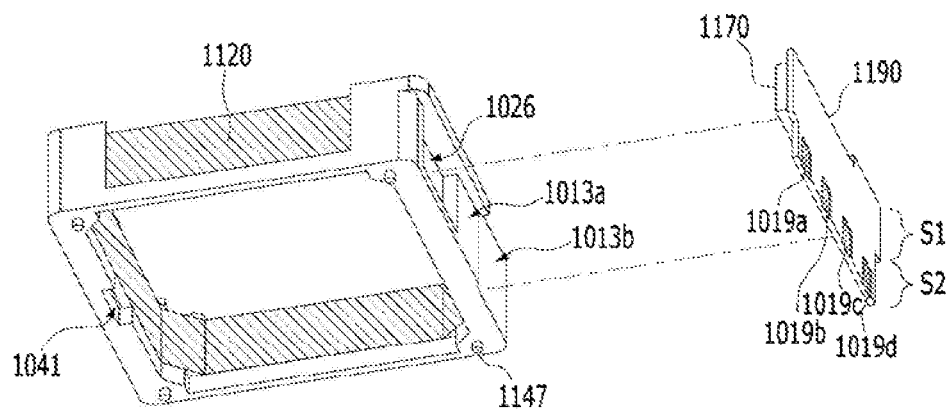
FIG. 21 is a perspective view of a coil, a location sensor and a circuit board, which are disposed at the housing.
Figure 24:
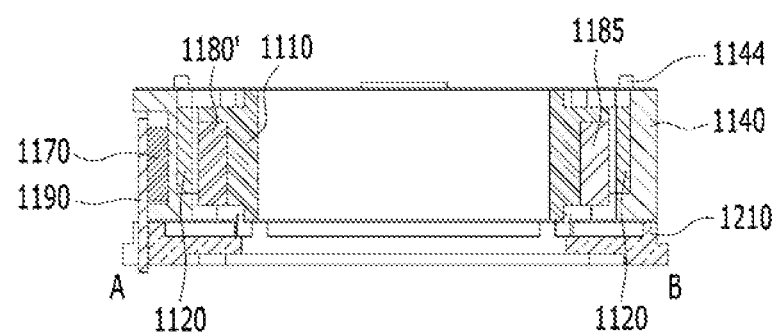
FIG. 24 is a cross-sectional view of the lens moving apparatus shown in FIG. 24, which is taken along line A-B.

FIG. 19A is a perspective view of the housing 1140 shown in FIG. 15. FIG. 19B is a plan view of the housing 1140 shown in FIG. 15. FIG. 20 is a perspective view of the housing 1140, to which the coil 1120 is coupled. FIG. 21 is a perspective view of the coil 1120, the location sensor 1170 and the circuit board 1190, which are disposed at the housing 1140. FIG. 24 is a cross-sectional view of the lens moving apparatus 1100 shown in FIG. 16, which is taken along line A-B.

Referring to FIGS. 19A to 21 and 24, the housing 1140 may support the coil 1120, and may accommodate therein the bobbin 1110 such that the AF operation unit, for example, the bobbin 1110 is moved in the first direction.

The AF operation unit may include the bobbin 1110, which is elastically supported by the upper elastic member 1150 and the lower elastic member 1160, and the components that are mounted on the bobbin 1110 and are moved therewith. For example, the AF operation unit may include the bobbin 1110 and the first to fourth magnets 1130-1, 1130-2, 1180 and 1185. For example, the AF operation unit may further include a lens (not shown) mounted on the bobbin 1110.

The housing 1140 may have the form of a column having an opening (for example, a cavity), and may include a plurality of side portions (for example, 1141-1 to 1141-4) and a plurality of corner portions (for example, 1142-1 to 1142-4), which together define the opening.

For example, the housing 1140 may include the side portions (for example, 1141-1 to 1141-4) and the corner portions (for example, 1142-1 to 1142-4), which together define an opening having a polygonal shape (for example, a square shape or an octagonal shape) or a circular shape.

For example, the housing 1140 may include the first to fourth side portions 1141-1 to 1141-4, which are spaced apart from one another, the first corner portion 1142-1 positioned between the first side portion 1141-1 and the third side portion 1141-3, the second corner portion 1142-2 positioned between the second side portion 1141-2 and the third side portion 1141-3, the third corner portion 1142-3 positioned between the second side portion 1141-2 and the fourth side portion 1141-4, and the fourth side portion 1142-4 positioned between the fourth side portion 1141-4 and the first side portion 1141-1.

For example, the outer surfaces of the first to fourth side portions 1141-1 to 1141-4 of the housing 1140 may be represented as the first to fourth outer surfaces of the housing 1140.

Each of the first to fourth side portions 1141-1 to 1141-4 of the housing 1140 may be disposed parallel to a corresponding one of the side plates of the cover member 1300.

Each of the first to fourth side portions 1141-1 to 1141-4 of the housing 1140 may correspond to one of the first to fourth side surfaces 1110b-1 to 1110b-4 of the bobbin 1110, and each of the first to fourth corner portions 1142-1 to 1142-4 of the housing 1140 may correspond to one of the fifth to eighth side surfaces 1110c-1 to 1110c-4 of the bobbin 1110.

Referring to FIG. 5B, for mounting or support of the coil 1120, the housing 1140 may include a support 1146 disposed at at least one of the first to fourth side portions 1141-1 to 1141-4 and the first to fourth corner portions 1142-1 to 1142-4.

The first side portion 1141-1 of the housing 1140 may be provided therein with a first opening 1017a, through which a portion of the coil 1120 is exposed, and a second opening 1017b, through which another portion of the coil 1120 is exposed.

For example, the first opening 1017a in the housing 1140 may be open at the upper surface of the first side portion 1141-1, and the second opening 1017b in the housing 1140 may be open at the upper surface of the second side portion 1141-2.

In another embodiment, the first opening in the housing 1140 may be hole, which is formed through the first side portion 1141-1 or through the outer surface and the inner surface of the first side portion 1141-1, and the second opening in the housing 1140 may be a hole, which is formed through the second side portion 1141-2 or through the inner surface and the outer surface of the second side portion 1141-2.

The support 1146 may include a first support 1146a, which is disposed between the first corner portion 1142-1 and the fourth corner portion 1142-4 and is positioned below the first opening 1017a, and a second support 1146b, which is disposed between the second corner portion 1142-2 and the third corner portion 1142-3 and is positioned below the second opening 1017b.

The support 1146 may further include a third support 1146c projecting from the inner surface of the third side portion 1141-3 of the housing 1140 and a fourth support 146d projecting from the inner surface of the fourth side portion 1141-4 of the housing 1140.

For example, the first to fourth supports 1146a, 1146b, 1146c and 146d may be in contact with the lower end or the lower surface of the coil 1120, and may support the lower end or the lower surface of the coil 1120.

The length that each of the third and fourth supports 1146c and 1146d projects from the inner surface of each of the third and fourth side portions 1141-3 and 1142-4 may be equal to or larger than the thickness T (see FIG. 6) of the coil 1120 or the length of the coil 1120 in a direction perpendicular to the optical axis OA; however, the disclosure is not limited thereto. In another embodiment, the length that each of the third and fourth supports 1146c and 146d projects may be smaller than the thickness T of the coil 1120.

The third support 1146c may include a groove 1041, and a portion of the coil 1120 may be disposed in the groove 1041 so as to be connected to the first and second lower springs 1160-1 and 1160-2.

One end and the other end of the coil 1120 may be guided to first and second bonding portions 1071a and 1071b by means of the groove 1041, and may be easily coupled to the first bonding portions 1071a and 1071b through soldering or the like.

For example, the third support 1146c may include a first portion 1014a and a second portion 1014b, which are spaced apart from each other, and a space, for example, the groove 1041, may be formed between the first portion 1014 a and the second portion 1014b.

One end of the third support 1146c may extend to the second corner portion 1142-2 and may be connected to the second corner portion 1142-2, and the other end of the third support 1146c may extend to the first corner portion 1142-1 and may be connected to the first corner portion 1142-1. For example, the first portion 1014a may be connected to the second corner portion 1142-2, and the second portion 1014b may be connected to the first corner portion 1142-1.

For example, one end of the third support 1146c may be connected to the inner surface of the second corner portion 1142-2, and the other end of the third support 1146c may be connected to the inner surface of the first corner portion 1142-1.

One end of the fourth support 146d may extend to the third corner portion 1142-3 and may be connected to the third corner portion 1142-3, and the other end of the fourth support 146d may extend to the fourth corner portion 1142-4 and may be connected to the fourth corner portion 1142-4.

For example, one end of the fourth support 146d may be connected to the inner surface of the third corner portion 1142-3, and the other end of the fourth support 146d may be connected to the inner surface of the fourth corner portion 1142-4.

The upper surface of each of the first and second supports 1146a and 1146b may be positioned lower than the upper surfaces of the first corner portion 1142-1 and the fourth corner portion 1142-4.

The third support 1146c may be positioned at the lower portion or the lower end of the inner surface of the third side portion 1141-3 of the housing 1140, and the fourth support 146d may be positioned at the lower portion or the lower end of the inner surface of the fourth side portion 1141-4 of the housing 1140.

A first surface of a portion of the coil 1120 mounted on the housing 1140 may be exposed through the first opening 1017a in the housing 1140, and a first surface of another portion of the coil 1120 mounted on the housing 1140 may be exposed through the second opening 1017b in the housing 1140.

The first surface of the coil 1120 may be the surface opposite the surface that faces the first magnet 1130-1 or the second magnet 1130-2 mounted on the first and second side surfaces 1110b-1 and 1110b-2 of the bobbin 1110.

For example, the first portion of the coil 1120, which corresponds to or is positioned in the first opening 1017a, may be positioned between the first corner portion 1142-1 and the second corner portion 1142-4 of the housing 1140, and the second portion of the coil 1120, which corresponds to or is positioned in the second opening 1017b, may be positioned between the second corner portion 1142-2 and the third corner portion 1142-3 of the housing 1140.

For example, the remaining portion of the coil, excluding the first portion and the second portion, may be positioned inside the inner surfaces of the third and fourth side portions 1141-3 and 1141-4 and the first to fourth corner portions 1142-1 to 1142-4.

By virtue of an adhesive member, the first surface of the coil 1120 may be coupled, attached or secured to the inner surfaces of the first to fourth side portions 1141-1 to 1141-4 and the inner surfaces of the first to fourth corner portions 1142-1 to 1142-4.

A portion of the coil 1120 may be positioned between the first opening 1017a and the first magnet 1130-1, and another portion of the coil 1120 may be positioned between the second opening 1017b and the second magnet 1130-2. Here, the portion of the coil 1120 may be a portion that corresponds to or faces the first magnet 1130-1, and the another portion of the coil 1120 may be a portion that corresponds to or faces the second magnet 1130-2.

Since the coil 1120 is disposed inside the first to fourth side portions 1141-1 to 1141-4 and the first to fourth corner portions 1142-1 to 1142-4 of the housing 1140, it is possible to reduce the minimum distance between the first and second magnets 130-1 and 130-2 and the coil 1120, and it is thus possible to increase the electromagnetic force through the interaction.

In another embodiment, the housing 1140 may not include the first opening 1017a or the second opening 1017b, and each of the first and second side portions of the housing 1140 may be provided with a support having the same shape as the third support or the fourth support.

In another embodiment, the housing 1140 may include, for example, a third support projecting from the inner surface of the first side portion and a fourth support projecting from the inner surface of the second side portion.

In order to prevent the housing 1140 from directly colliding with the inner surface of the top plate of the cover member 1300, the housing 1140 may include a stopper 1142 provided at the upper portion, the upper surface or the upper end thereof.

For example, the stopper 1143 may be disposed on the upper surface of at least one of the first to fourth side portions 1141-1 to 1141-4 of the housing 1140. However, the disclosure is not limited thereto, and the stopper may be disposed at the corner portions 1142-1 to 1142-4 of the housing 1140 in another embodiment.

The housing may include at least one protrusion 144, which is provided at the upper portion, the upper surface or the upper end of the housing 1140 so as to be coupled to the hole in the first outer frame 1152 of the upper elastic member 1150. For example, the at least one protrusion 144 may be disposed on the upper surface of at least one of the first to fourth corner portions 1142-1 to 1142-4. However, the disclosure is not limited thereto, and the protrusion may be disposed on the upper surface of at least one of the side portions 1141-1 to 1141-4 of the housing 1140.

The housing 1140 may include at least one protrusion 1147, which is provided at the lower portion, the lower surface or the lower end of the housing 1140 so as to be coupled or secured to the hole in the second outer frame 1162 of the lower elastic member 1160.

In order to prevent the lower surface or the bottom of the housing 1140 from colliding with the base 1210, which will be described later, the housing 1140 may include at least one stopper (not shown) projecting from the lower portion, the lower surface or the lower end thereof.

In order to mount the circuit board 1190 on the housing 1140, the housing 1140 may include one or more mounting recesses 1013a and 1013b formed in the outer surface of the fourth side portion 1141-4. Although the mounting recesses 1013a and 1013b may have a two-stepped structure composed of two recesses, the disclosure is not limited thereto. In another embodiment, the mounting recesses may be composed of a single recess.

For example, the mounting recesses 1013a and 1013b may be formed in the outer surface of the fourth side portion 1141-4, the outer surface of the third corner portion 1142-3 adjacent to one end of the fourth side portion 1141-4 and the outer surface of the fourth corner portion 1142-3 adjacent to the other end of the fourth side portion 1141-4 of the housing 1140.

In order to mount the location sensor 1170 on the housing 1140, the housing 1140 may include a mounting portion 1026 formed in the fourth side portion 1141-4.

For example, the mounting portion 1026 may be formed in the mounting recess 1013a in the housing 1140. Although the mounting portion 1026 may be configured to have a hole formed through the first side portion 1141-1 of the housing 1140 in FIG. 19A, the disclosure is not limited thereto. In another embodiment, the mounting portion may be configured to have the form of a recess in which the location sensor 1170 is mounted.

Although the mounting portion 1026 may have a shape corresponding to or coinciding with that of the location sensor 1170, the disclosure is not limited thereto.

Next, the coil 1120 will be described.

The coil 1120 may be disposed between the inner surface of the housing 1140 and the outer surface of the bobbin 1110. The coil 1120 may be disposed in the housing 1140 so as to surround the bobbin 1110.

The coil 1120 may be disposed inside the first to fourth side portions 1141-1 to 1141-4 and the first to fourth corner portions 1142-1 to 1142-4 of the housing 1140 so as to surround the outer surface of the bobbin 1110.

For example, the coil 140 may be disposed on the support 1146 of the housing 1140.

The lower portion, the lower end or the lower surface of the coil 140 may be in contact with the upper surface of the support 1146.

A first portion of the coil 1120, which corresponds to the first side portion 1141-1 of the housing 1140, may correspond to the first magnet 1130-1, and may overlap the first magnet 1141-1 in a direction toward the second side portion 1141-2 from the first side portion 1141-1 of the housing 140. For example, the first portion of the coil 1120 may be the portion that is exposed through the first opening 1017a.

A second portion, which corresponds to the second side portion 1142-2 of the housing 1140, may correspond to the second magnet 1130-2, and may overlap the second magnet 1130-2 in a direction toward the first side portion 1141-1 from the second side portion 1141-2. For example, the second portion of the coil 1120 may be the portion that is exposed through the second opening 1017b.

The third and fourth side portions 1142-2 and 1142-4 of the housing 1140 may not overlap the first and second magnets 130-1 and 130-4 in a direction toward the fourth side portion 1142-4 from the third side portion 1142-3.

The coil 1120 may overlap the first and second magnets 130-1 and 130-2 in a direction toward the second side portion 1141-2 from the first side portion 1141-1 of the housing 1140.

Although the coil 1120 may overlap the third magnet 1180, the fourth magnet 1185 and the location sensor 1170 in a direction toward the fourth side portion 1141-4 from the third side portion 1141-3 of the housing 1140, the disclosure is not limited thereto. In another embodiment, the coil 1120 may overlap at least one of the third magnet 1180, the fourth magnet 1185 and the location sensor 1170 in a direction toward the fourth side portion 1141-4 from the third side portion 1141-3 of the housing 1140.

The third and fourth outer surfaces of the housing 1140 may not overlap the first and second magnets 130-1 and 130-2 in a direction toward the fourth outer surface of the housing 1140 from the third outer surface of the housing 1140.

The coil 1120 may be a drive coil for moving the bobbin 1110 using the electromagnetic interaction with the first and second magnets 1130-1 and 1130-2.

In order to create electromagnetic force resulting from the interaction with the first and second magnets 1130-1 and 1130-2, a drive signal (for example, drive current or voltage) may be applied to the coil 1120.

For example, the drive signal applied to the coil 1120 may be a DC signal.

In another embodiment, the drive signal applied to the coil 1120 may include an AC signal and a DC signal.

By virtue of electromagnetic force resulting from interaction between the coils 1120 and the first and second magnets 1130-1 and 1130-2, the AF operation unit may be driven in a single direction or in two directions. Here, driving in a single direction refers to driving in which the AF operation unit is moved in a single direction, for example, in an upward direction (for example, in the +Z-axis direction) relative to the initial position of the AF operation unit, and driving in two directions refers to driving in which the AF operation unit is moved in two directions (for example, in upward and downward directions) relative to the initial position of the AF operation unit.

For example, the initial position of the bobbin 1110 may be the initial position of the AF operation unit (for example, the bobbin) in the state in which power is not applied to the coil 1120, and may be the position of the AF operation unit when the upper elastic member 1150 and the lower elastic member 1160 are elastically deformed only by the weight of the AF operation unit.

Furthermore, the initial position of the bobbin 1110 may be the position of the AF operation unit when gravity is applied in a direction toward the base 1210 from the bobbin 1110 or in a direction toward the bobbin 1110 from the base 1210.

By controlling the intensity and/or the direction of the electromagnetic force resulting from interaction between the coil 1120 and the first and second magnets 1130-1 and 1130-2 by controlling the intensity and/or polarity (for example, a direction in which current flows) of a drive signal applied to the coil 1120, it is possible to control movement of the AF operation unit and thus to perform an AF function.

The coil 1120 may be disposed inside the housing 1140 so as to be spaced apart from the outer surface of the bobbin 1110 and to have a closed loop shape, for example, a ring shape, surrounding the outer surface of the bobbin 1110. For example, the coil 1120 may have the form of a ring, which is wound clockwise or counterclockwise about the optical axis. However, the disclosure is not limited thereto.

The coil 1120 may have the form of a coil ring or a coil block, and the coil 1120 of the coil ring may be secured to the inner surfaces of the side portions 1141-1 to 1141-4 and the corner portions 1142-1 to 1142-4 of the housing 1140 using an adhesive member.

One end of the coil 1120 may be conductively connected to the circuit board 1190 via the first lower spring 1160-1, and may be conductively connected to the circuit board 1190 via the second lower spring 1160-2.

Next, the location sensor 1170 and the circuit board 1190 will be described.

The circuit board 1190 and the location sensor 1170 are disposed at the fourth side portion 1141-4 of the housing 1140.

The circuit board 1190 may be disposed on the outer surface of the fourth side portion 1141-1 (or the outer surface of the second side portion 1141-2) of the housing 1140. For example, the circuit board 1190 may be disposed on the fourth outer surface (or the second outer surface) of the housing 1140.

For example, the circuit board 1190 may be disposed in the mounting recesses 1013a and 1013b formed in the fourth side portion 1141-1 of the housing 1140. The first surface of the circuit board 1190 may be in contact with the one or more mounting recesses 1013a and 1013b in the housing 1140.

The circuit board 1190 may include a plurality of terminals 1019a to 1019d, which are intended to be conductively connected to external components.

For example, the plurality of terminals 1019a to 1019d may be arranged on the second surface of the lower end of the lower portion S2 of the circuit board 1190 in a line; however, the disclosure is not limited thereto. Here, the second surface of the circuit board 1190 may be the surface opposite the first surface of the circuit board 1190.

Although the circuit board 1190 includes four terminals in the embodiment shown in FIG. 16, the disclosure is not limited thereto. In another embodiment, the number of terminals may be five or more.

The circuit board 1190 may include a circuit pattern or wires for conductively connecting the location sensor 1170 to the terminals 1019a to 1019d.

The location sensor 1170 may be mounted or disposed on the first surface of the circuit board 1190, for example, the first surface of the upper portion S1 (see FIG. 21) of the circuit board 1190.

The location sensor 1170 may be disposed in the mounting portion 1026 formed in the fourth side portion 1141-4 of the housing 1140.

At the initial position of the bobbin 1110, the location sensor 1170 disposed at the housing 1140 may overlap the third magnet 1180 in a direction toward the third side portion 1141-3 from the fourth side portion 1141-4 of the housing 1140; however, the disclosure is not limited thereto.

In another embodiment, at the initial position of the bobbin 1110, the location sensor 1170 may not overlap the third magnet 1180 in a direction toward the third side portion 1141-3 from the fourth side portion 1141-4 of the housing 1140.

At the initial position of the bobbin 1110, the location sensor 1170 disposed at the housing 1140 may overlap the coil 1120 in a direction toward the third side portion 1141-3 from the fourth side portion 1141-4 of the housing 1140.

At the initial position of the bobbin 1110, the location sensor 1170 disposed at the housing 1140 may not overlap the first magnet 1130-1 and the second magnet 1130-2 in a direction toward the third side portion 1141-3 from the fourth side portion 1141-4 of the housing 1140.

The location sensor 1170 may detect the intensity of a magnetic field of the third magnet 1180 mounted on the bobbin 1110 when the bobbin 1110 is moved, and may output an output signal (for example, output voltage) corresponding to the detected intensity.

The location sensor 1170 may be embodied as a drive including a hall sensor. For example, the location sensor 1170 may be the driver IC shown in FIG. 14.

The location sensor 1170 may include first and fourth terminals, for sending and receiving a clock signal SCL, a data signal SDA, and power signals VDD and GND, and fifth and sixth terminals for providing a drive signal to the coil 1120.

Furthermore, the circuit board 1190 may include first and second pads (or terminals) 1009a and 1009b (see FIG. 22), which are conductively connected to the fifth and sixth terminals of the first sensor 1170, and third to sixth pads (not shown), which are conductively connected to the first to fourth terminals of the first location sensor 1170.

The location sensor 1170 may include first to third terminals for the clock signal SCL and two power signals VDD and GND, and fifth and sixth terminals for providing a drive signal to the coil 1120.

Each of the first to fourth terminals of the location sensor 1170 may be conductively connected to a corresponding one of the third to sixth pads of the circuit board 1190, and each of the third to sixth pads of the circuit board 1190 may be conductively connected to a corresponding one of the terminals 1019a to 1019d of the circuit board.

Each of the fifth and sixth terminals of the location sensor 1170 may be conductively connected to a corresponding one of the first and second pads 1009a and 1009b of the circuit board 1190, and the first and second pads 1009a and 1009b of the circuit board 1190 may be coupled to the bonding portion 1062a and 1062b of a corresponding one of the first and second lower springs 1160-1 and 1160-2 and may be conductively connected thereto. In other words, the location sensor 170 may provide a drive signal to the coil 1120 via the first and second pads 1009a and 1009b.

In another embodiment, the location sensor 1170 may be embodied by only a single location detection sensor such as a hall sensor or the like. In this case, the circuit board 1190 may include first to fourth terminals for driving the location sensor, which is embodied by only a location detection sensor, and two terminals for providing drive signals for driving the coil 120. The location sensor, which is embodied by a single location detection sensor, may be conductively connected to the first to fourth terminals of the circuit board 1190. A drive signal may be provided to the coil 1120 from the circuit board 1190 via the fifth and sixth terminals of the circuit board 1190 and the first and second springs connected thereto.

Next, the upper elastic member 1150 and the lower elastic member 1160 will be described.

Figure 22:
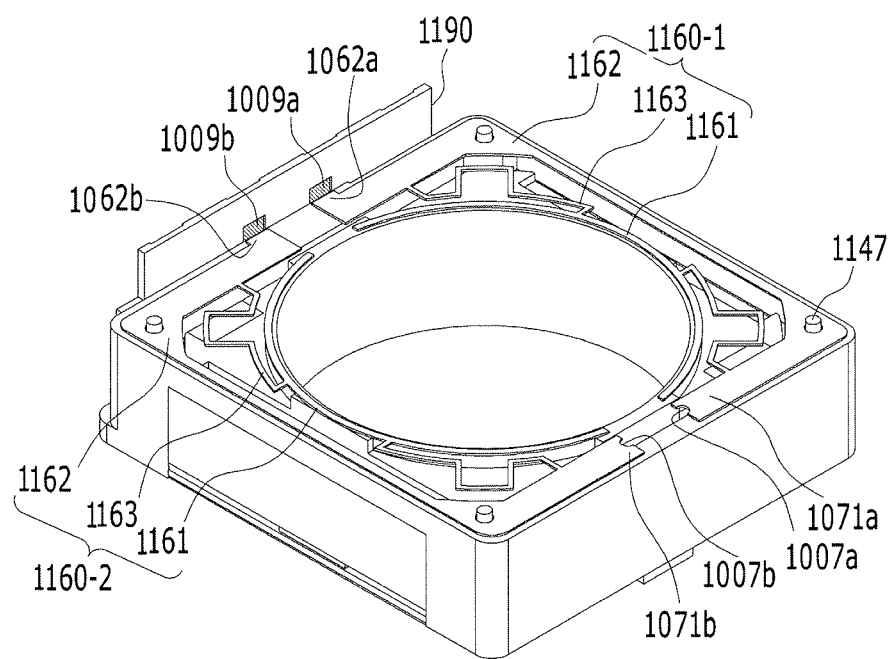
FIG. 22 is a bottom view of a lower elastic member and a circuit board, which are coupled to the housing.
Figure 23:
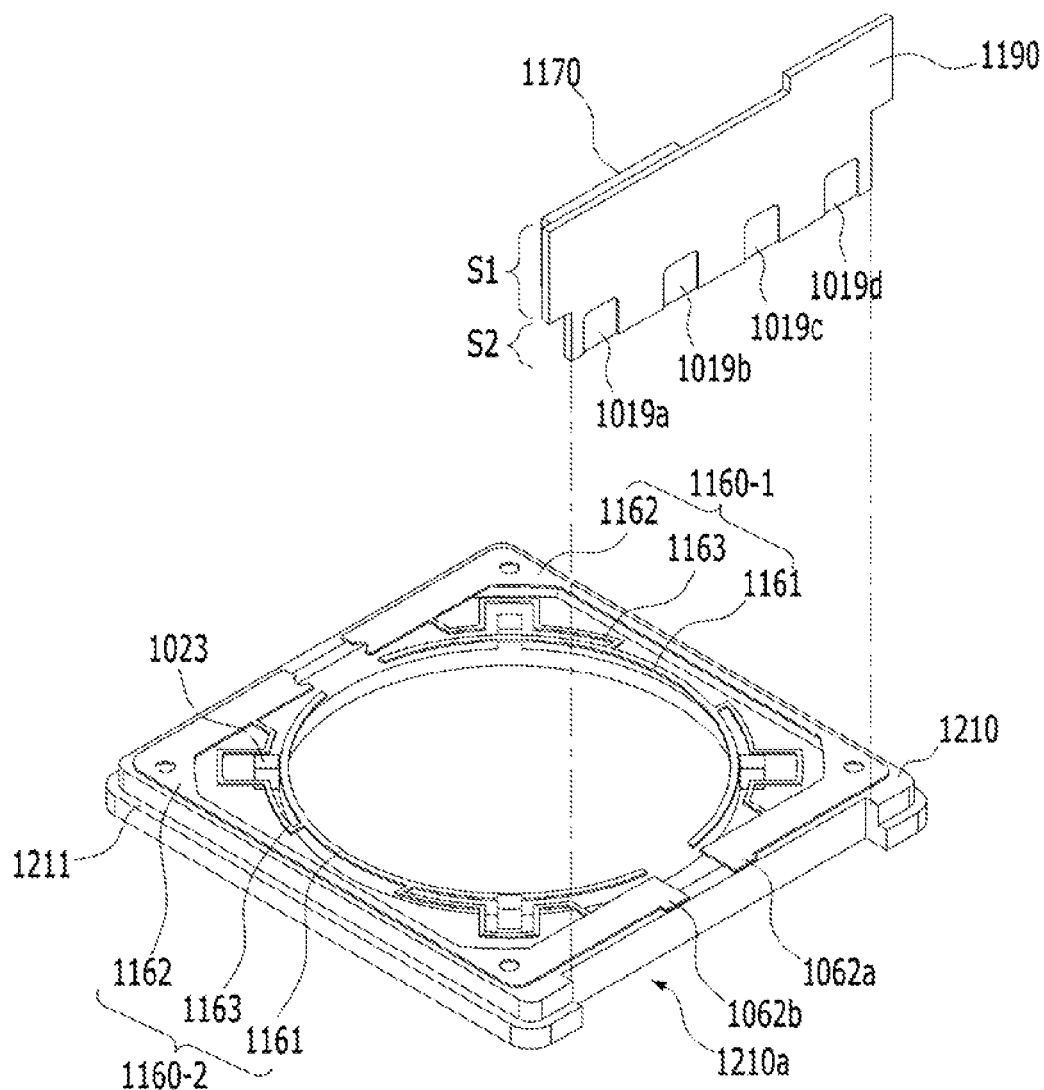
FIG. 23 illustrates the lower elastic member, a base and the circuit board.

FIG. 22 is a bottom view of the lower elastic member 1160 and the circuit board 1190, which are coupled to the housing 1140. FIG. 23 illustrates the lower elastic member 1160, the base 1210 and the circuit board 1190.

Referring to FIGS. 16, 22 and 23, the upper elastic member 1150 and the lower elastic member 1160 may be coupled both to the bobbin 1110 and to the housing 1140 so as to support the bobbin 1110.

For example, the upper elastic member 1150 may be coupled to the upper portion, the upper surface or the upper end of the bobbin 1110 and the upper portion, the upper surface or the upper end of the housing 1140, and the lower elastic member 1160 may be coupled to the lower portion, the lower surface or the lower end of the bobbin 1110 and the lower portion, the lower surface or the lower end of the housing 1140.

At least one of the upper elastic member 1150 and the lower elastic member 1160 may be divided or separated into two or more members.

For example, the lower elastic member 1160 may include a first lower spring 1160-1 and a second lower spring 1160-2, which are spaced apart from each other.

Although each of the upper elastic member 1150 and the lower elastic member 1160 may be embodied as a leaf spring, the disclosure is not limited thereto, and each member may also be embodied as a coil spring, a suspension wire or the like.

The upper elastic member 1150 may include a first inner frame 1151 coupled to the upper portion, the upper surface or the upper end of the bobbin 1110, a first outer frame 1152 coupled to the upper portion, the upper surface or the upper end of the housing 1140, and a first frame connector 1153 connecting the first inner frame 1151 to the first outer frame 1152.

For example, the upper elastic member 1150 may include four first frame connection portions 153, and the four first frame connection portions may be positioned so as to correspond to the first to fourth corner portions 1142-1 to 1142-4 of the housing 1140.

The first and second springs 1160-1 and 1160-2 may be coupled to the bobbin 1110.

The first and second lower springs 1160-1 and 1160-2 may be coupled both to the bobbin 1110 and to the housing 1140.

The first and second lower springs 1160-1 and 1160-2 may be disposed between the bobbin 1110 and the base 1210.

At least one of the first and second lower springs 1160-1 and 1160-2 may include the second inner frame 1161 coupled to the lower portion, the lower surface or the lower end of the bobbin 1110, a second outer frame 1162 coupled to the lower portion, the lower surface or the lower end of the housing 1140, and a second frame connection portion 1163 connecting the second inner frame 1161 to the second outer frame 1162.

For example, the second outer frame 1162 of the first lower spring 1160-1 may be disposed on the lower portions or the lower surfaces of the first side portion 1141-1, the third side portion 1141-3 and the fourth side portion 1141-4, and the lower portions or the lower surfaces of the first and fourth corner portions 1152-1 and 1142-4.

The second outer frame 1162 of the first lower spring 1160-1 may be provided with a first bonding portion 1071a, to which the first end of the coil 1120 is coupled, and a second bonding portion 1062a, to which the first pad 1009a of the circuit board 1190 is coupled.

For example, the first bonding portion 1071a of the first lower spring 1160-1 may be provided at one end of the second outer frame 1162 of the first lower spring 1160-1, and the second bonding portion 1062a of the first lower spring 1160-1 may be provided at the other end of the second outer frame 1162 of the first lower spring 1160-1.

The second outer frame 1162 of the second lower spring 1160-2 may be disposed on the lower portions or the lower surfaces of the second to fourth side portions 1141-1 to 1141-4 of the housing 1140 and the lower portions or the lower surfaces of the second corner portion 1142-2 and the third corner portion 1142-3.

The second outer frame 1162 of the second lower spring 1160-2 may be provided with the third bonding portion 1071b, to which the second end of the coil 1120 is coupled, and the fourth bonding portion 1062b, to which a second pad 0b of the circuit board 1190 is coupled.

For example, the third bonding portion 1071b of the second lower spring 1160-2 may be provided at one end of the second outer frame 1162 of the second lower spring 1160-2, and the fourth bonding portion 1062b of the second lower spring 1160-2 may be provided at the other end of the second outer frame 1162 of the second lower spring 1160-2.

For example, the first bonding portion 1071a of the first lower spring 1160-1 and the third bonding portion 1071b of the second lower spring 1160-2 may be positioned at the lower surface or the lower portion of the third side portion 1141-3 of the housing 1140 so as to be spaced apart from each other and to be symmetrical with respect to the first central line; however, the disclosure is not limited thereto. Here, the first central line may be a straight line, which extends through the center of the opening in the housing 1140 so as to be parallel to a direction toward the fourth side portion 1142-4 from the third side portion 1142-3 of the housing 140.

The first bonding portion 1071a of the first lower spring 1160-1 may have formed therein a groove 7a for guiding the first end of the coil 1120, and the third bonding portion 1071b of the second lower spring 1160-2 may have formed therein a groove 1007b for guiding the second end of the coil 1120.

For example, the second bonding portion 1062a of the first lower spring 1160-1 may be configured to project toward the circuit board 1190 from the outer surface of the second outer frame 1162 positioned at the fourth side portion 1141-4 in order to be easily coupled to the first pad 1009a of the circuit board 1190.

For example, the fourth bonding portion 1062b of the second lower spring 1160-2 may be configured to project toward the circuit board 1190 from the outer surface of the second outer frame 1162 positioned at the fourth side portion 1141-4 in order to be easily coupled to the second pad 1009b of the circuit board 1190.

In other words, each of the second bonding portion 1062a of the first lower spring 1160-1 and the fourth bonding portion 1062b of the second lower spring 1160-2 may project from the outer surface of the second outer frame 1162 in a direction toward the outer surface from the inner surface of the fourth side portion 1141-4 of the housing 1140.

The second bonding portion 1062a and the fourth bonding portion 1062b may be disposed at the lower portion or the lower surface of the fourth side portion 1141-4 of the housing 1140 so as to be spaced apart from each other and may be symmetrical with respect to the central line; however, the disclosure is not limited thereto.

By means of solder or a conductive adhesive member, the first end of the coil 1120 may be coupled to the first bonding portion 1071a of the first lower spring 1160-1, and may be conductively connected to the first lower spring 1160-1.

By means of solder or a conductive adhesive member, the second end of the coil 1120 may be coupled to the third bonding portion 1071b of the second lower spring 1160-2 and may be conductively connected to the second lower spring 1160-2.

Each of the first frame connection portion 1153 and the second frame connection portion 1163 of the upper elastic member 1150 and the lower elastic member 1160 may be bent or curved (or formed into a curved line) so as to define a predetermined pattern. The upward and/or downward movement of the bobbin 1110 in the first direction may be flexibly (or elastically) supported through changes of position and fine deformation of the first and second frame connection portions 1153 and 1163.

In order to absorb and dampen vibrations of the bobbin 1110, the lens moving apparatus 1100 may further include a damper (not shown) disposed between the upper elastic member 1150 and the housing 1140.

For example, the damper (not shown) may be disposed in the space between the first frame connection portion 1153 of the upper elastic member 1150 and the housing 1140.

For example, the lens moving apparatus 1100 may further include a damper (not shown) disposed between the second frame connection portion 1163 of each of the first and second lower springs 1160-1 and 1160-2 and the housing 1140.

For example, a damper (not shown) may be further disposed between the inner surface of the housing 1140 and the outer surface of the bobbin 1110.

Next, the base 1210 will be described.

Referring to FIG. 23, the base 1210 may include an opening corresponding to the opening in the bobbin 1110 and/or the opening in the housing 1140, and may be configured to have a shape corresponding to the cover member 1300, for example, a square shape.

The base 1210 may include a step 1211 formed in the lower end of the side surface, to which an adhesive is applied when the cover member 1300 is adhesively secured. Here, the step 1211 may guide the cover member 1300 coupled thereon, and may face the lower end of the side plate of the cover member 1300. An adhesive member or a sealing member may be disposed or applied between the lower end of the side plate of the base 1210 and the step 1211 in the base 1210.

The base 1210 may be disposed below the bobbin 1110 and the housing 1140.

For example, the base 1210 may be disposed below the lower elastic member 1160.

At least one of the corners of the upper surface of the base 1210 may be provided with a projection (not shown), and at least one of the first to fourth corners of the housing 1140 may be provided in the lower portion or the lower surface thereof with a guide groove (not shown) corresponding to the projection of the base 1210. For example, by means of an adhesive member, the guide groove in the housing 1140 and the projection of the base 1210 may be coupled to each other, and the housing 1140 may be coupled to the base 1210.

The base 1210 may include stoppers 1023 projecting from the upper surface thereof.

Although the stoppers 1023 may be disposed so as to correspond to the corners of the upper surface of the base 1210, the disclosure is not limited thereto. Furthermore, the stoppers 1023 may be disposed at locations corresponding to the second frame connection portions 1163 of the lower springs 160-1 and 160-2.

In order to avoid spatial interference between the bobbin 1110 and the lower elastic member 1160, the stoppers 1923 of the base 1210 may be positioned higher than the second frame connection portions 1163 of the lower springs 1160-1 and 1160-2 coupled to the base 1210. The stoppers 1023 of the base 1210 may prevent the lower surface or the lower end of the bobbin 210 from directly colliding with the upper surface of the base 1210 when an exterior impact occurs.

The base 1210 may include a mounting recess 1210a, which is formed in the side surface thereof that corresponds to the circuit board 1190 and to which the lower end of the circuit board 1190 is mounted.

For example, the mounting recess 1210a may be formed in the side surface of the base that corresponds to the fourth side portion 1141-4 of the housing 1140.

Referring to FIG. 23, the circuit board 1190 may include the upper portion S1 and the lower portion S2. The horizontal length of the lower portion S2 may be smaller than the horizontal length of the upper portion S1.

The upper portion S1 of the circuit board 1190 may be disposed in the mounting recess 13a and 13b in the housing 1140. The lower portion S2 of the circuit board 1190 may be disposed so as to project downwards from the lower portion or the lower surface of the housing 1140, and may be disposed in the mounting recess 210a in the base 1210.

The terminals 1019a to 1019d may be disposed on the lower portion S2 of the circuit board 1190. The first surface of the upper portion S1 of the circuit board 1190 may be provided with the first and second pads 1009a and 1009b, to which the second bonding portion 1062a of the first lower spring 1160-1 and the fourth bonding portion 1062b of the second lower spring 1160-2 are bonded.

By mounting all of the first and second magnets 1130-1 and 1130-2, which are drive magnets, and the third magnet 1180, which is a sensing magnet, to the bobbin 1110 and disposing the coil 1120 to the housing 1140, the embodiment is able to simplify the structure of the lens moving apparatus and to reduce the size of the lens moving apparatus.

Because the coil 1120 is positioned inside the side portions and the corner portions of the housing 1140, it is possible to reduce the distance between the first and second magnets 130-1 and 130-2 and the coil 1120 and thus to increase the electromagnetic force resulting from the interaction.

Although the embodiment shown in FIG. 15 has the form of a ring, which is rotated clockwise or counterclockwise about the optical axis OA, the disclosure is not limited thereto. A coil according to another embodiment of FIG. 15 may include a first coil unit, which faces the first magnet 1130-1, and a second coil unit, which faces the second magnet 1130-2. Here, the description regarding the first and second coils 120-1 and 120-2 shown in FIG. 1 may be applied to this embodiment, and the lower elastic member 1160 shown in FIGS. 22 and 23 may include first to third lower elastic units conductively connected to the first and second coil units. Furthermore, the description regarding the first to third lower springs 1160-1 to 1160-3 shown in FIGS. 10 and 11 may be applied to the first to third lower elastic units.

Figure 25:
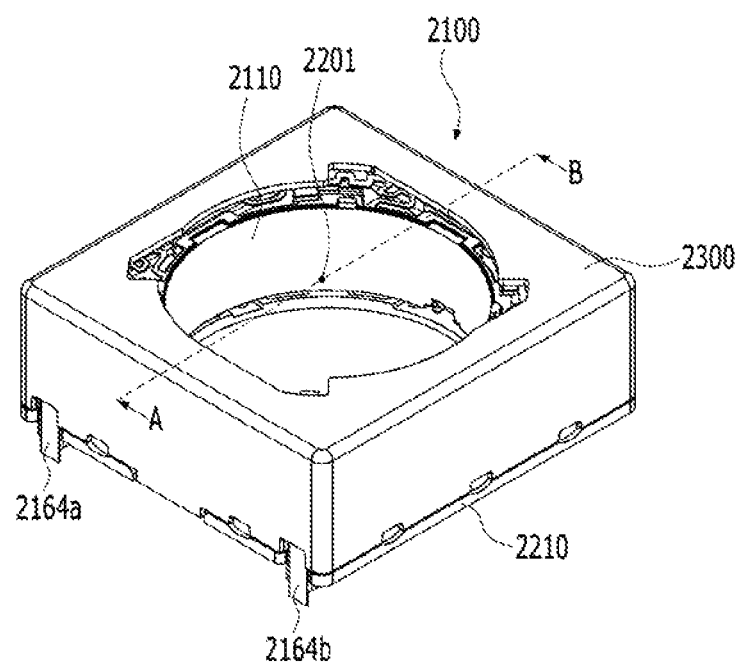
FIG. 25 is a perspective view of a lens moving apparatus according to a further embodiment.
Figure 26:
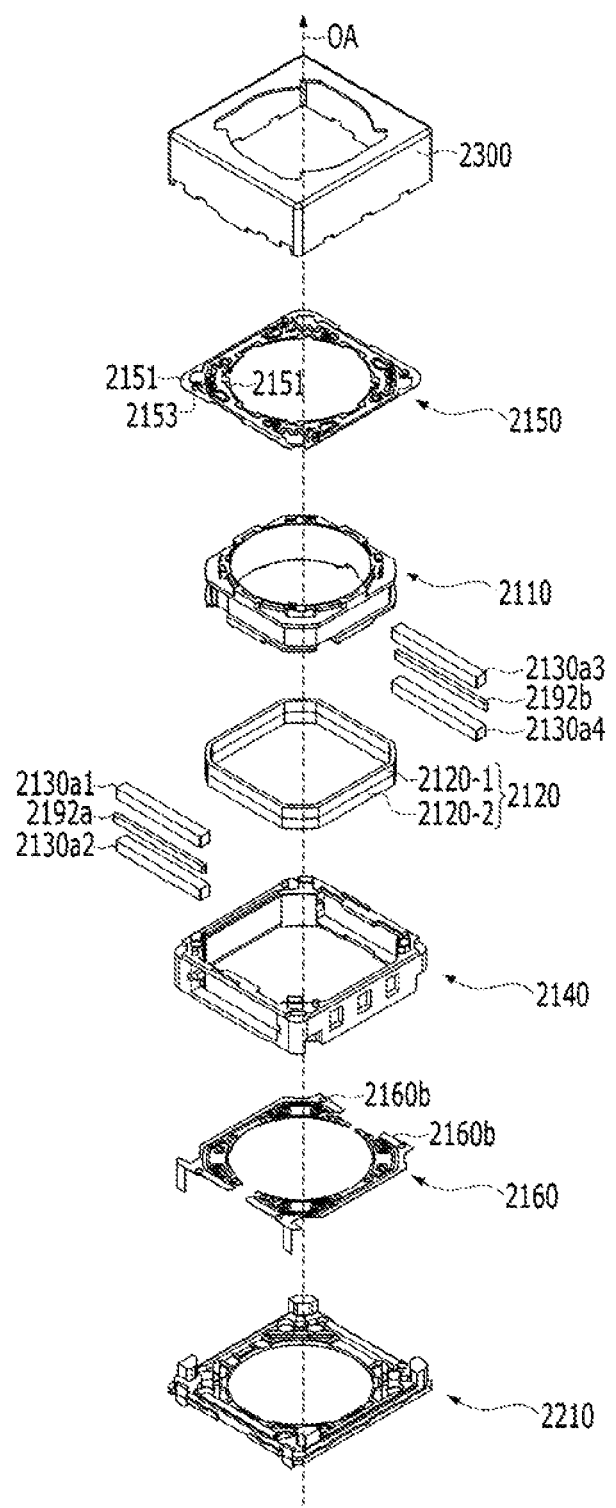
FIG. 26 is an exploded view of the lens moving apparatus shown in FIG. 25.
Figure 27:
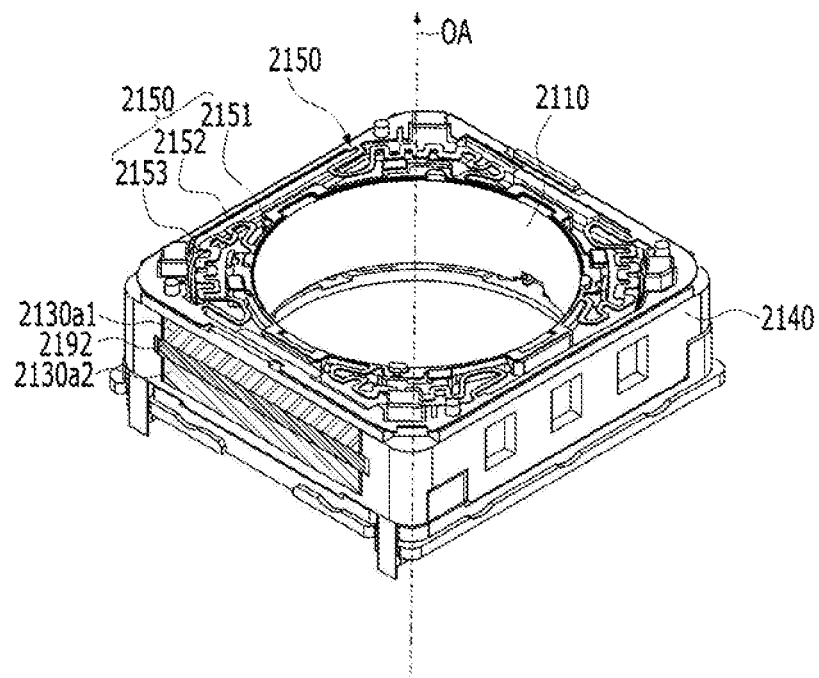
FIG. 27 is a perspective view of the lens moving apparatus shown in FIG. 25, from which a cover member is removed.

FIG. 25 is a perspective view of a lens moving apparatus 2100 according to a further embodiment. FIG. 26 is an exploded view of the lens moving apparatus 2100 shown in FIG. 25. FIG. 27 is a perspective view of the lens moving apparatus shown in FIG. 25, from which a cover member 2300 is removed.

Referring to FIGS. 25 to 27, the lens moving apparatus 2100 may include a bobbin 2110, a coil 2120, first to fourth magnets 2130a to 2130d, a housing 2140, an upper elastic member 2150, a lower elastic member 2160, a first yoke 2192a and a second yoke 2192b.

The lens moving apparatus 2100 may further include a cover member 2300 and a base 2210.

The cover member 2300 will first be described.

The cover member 2300 accommodates the components 2110, 2120, 2130, 2140, 2150, 2160, 2192a and 2192b in the space defined between the cover member 2300 and the base 2210.

The cover member 2300 may be configured to have a box shape, which is open at the bottom and includes a top plate and side plates. The lower ends of the side plates of the cover member 2300 may be coupled to the upper portion of the base 2210. The top plate of the cover member 2300 may have a polygonal shape, for example, a square shape, an octagonal shape or the like.

The cover member 2300 may have an opening formed in the top plate so as to expose a lens (not shown) coupled to the bobbin 2110 to an external light.

For example, the cover member 2300 may be made of a nonmagnetic material. For example, the cover member 2300 may be made of nonmagnetic metal, for example, nonmagnetic material such as SUS, aluminum (Al), copper (Cu), tin (Sn), platinum or the like.

By virtue of employment of the cover member 2300 made of a nonmagnetic material, the embodiment is able to prevent the first to fourth magnets 2130a1 to 2130a4 from being attracted to the cover member 2300.

Furthermore, by virtue of employment of the cover member 2300 made of a nonmagnetic material, the embodiment is able to reduce magnetic-field interference with another adjacent lens moving apparatus, for example, a lens moving apparatus for performing AF operation or OIS operation.

For example, when the distance between an AF actuator and an OIS actuator of a dual camera module is small, it is possible to prevent malfunction of AF operation or OIS operation by reducing magnetic-field interference using the cover member 2300 made of nonmagnetic material.

In another embodiment, the cover member 2300 may be made of magnetic material. For example, in an embodiment in which only one AF lens moving apparatus is used, rather than a dual camera, it is possible to increase electromagnetic force using the magnetic cover member.

Next, the bobbin 2110 will be described.

The bobbin 2110 may be positioned in the housing 2140, and may be moved in the first direction (for example, in the z-axis direction) by electromagnetic interaction between the coil 2120 and the magnets 130.

Figure 28:
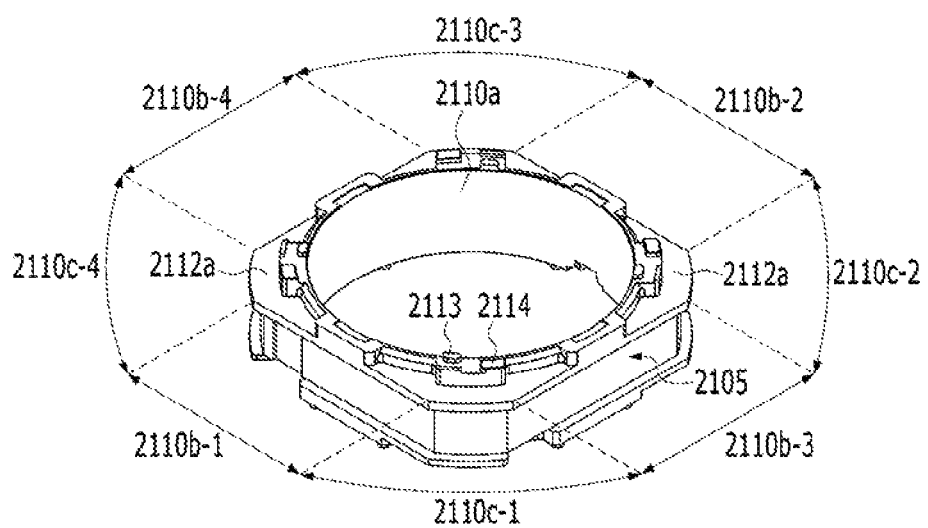
FIG. 28 is a perspective view of the bobbin shown in FIG. 26.
Figure 29:
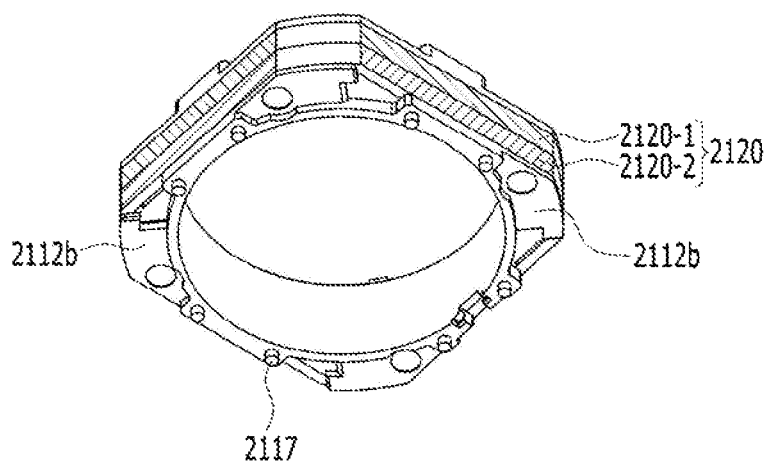
FIG. 29 is an assembled perspective view of the bobbin and a coil.

FIG. 28 is a perspective view of the bobbin 2110 shown in FIG. 26. FIG. 29 is an assembled perspective view of the bobbin 2110 and the coil 2120.

Referring to FIGS. 28 and 29, although a lens (not shown) may be directly coupled to the inner surface 2110a of the bobbin 2110, the disclosure is not limited thereto.

For example, the bobbin 2110 may include a lens barrel (not shown), in which at least one lens is mounted, and the lens barrel may be coupled to the interior of the bobbin 2110 in various ways.

The bobbin 2110 may have an opening, in which a lens or a lens barrel is mounted. The shape of the opening in the bobbin 2110 may coincide with the shape of the lens or the lens barrel. Although the shape of the opening may be circular, elliptical or polygonal, the disclosure is not limited thereto.

The bobbin 2110 may include at least one first upper protrusion 2113, which is coupled and secured to the inner frame 2151 of the upper elastic member 2150, and at least one first lower protrusion 2117, which is coupled and secured to the inner frame 2161 of the lower elastic member 2160. For example, although each of the first and second upper protrusions 2113 and 2117 may have the form of a protrusion, the disclosure is not limited thereto. In another embodiment, the protrusion may have a groove shape or a planar shape.

The bobbin 2110 may include an upper escape recess 2112a formed in a region of the upper surface thereof that corresponds to or is aligned with a first frame connection portion 2153 of the upper elastic member 2150.

Furthermore, the bobbin 2110 may include a lower escape recess 2112b formed in a region of the lower surface that corresponds to or is aligned with a second frame connection portion 2163 of the lower elastic member 2160.

When the bobbin 2110 is moved in the first direction through the upper escape recess 2112a and the lower escape recess 2112b, it is possible to spatial interference between the first frame connection portion 2153 and the second frame connection portion 2163 and the bobbin 2110. As a result, the first frame connection portion 2153 and the second frame connection portion 2163 may be elastically deformed with ease.

The outer surface of the bobbin 2110 may be provided therein with at least one groove 2105, and the coil 2120 may be disposed or mounted in the groove 2105 in the bobbin 2110. Although the groove 2105 may have, for example, a ring shape, as illustrated in FIG. 4, the disclosure is not limited thereto. In another embodiment, the bobbin 2110 may not include the groove, in which the coil is mounted.

The outer surface of the bobbin 2110 may include side surfaces 2110b-1 to 2110b-4, which correspond to the side portions 2141-1 to 2141-4 of the housing 2140, and side surfaces 2110c-1 to 2110c-4, which correspond to the corner portions 2142-1 to 2142-4 of the housing 2140.

As illustrated in FIG. 25, the center 201 of the housing 2140 (for example, the center of the opening in the housing 2140) may coincide with or be aligned with the optical axis of a lens.

Furthermore, the center of the cover member 2300 (for example, the center of the opening in the cover member 2300) may coincide with or be aligned with the optical axis OA of a lens.

Furthermore, the center of the bobbin 2110 (or the center of the opening in the bobbin 2110) may coincide with or may be aligned with the optical axis OA of a lens, and may coincide with or be aligned with the center of the housing 2140.

Next, the coil 2120 will be described.

The coil 2120 may be disposed on the outer surface of the bobbin 2110 so as to perform electromagnetic interaction with the first to fourth magnets 2130a1 to 2130a4 disposed on the housing 2140.

In order to generate electromagnetic force resulting from electromagnetic interaction with the first to fourth magnets 2130a1 to 2130a4, a drive signal may be applied to the coil 2120. Here, the applied drive signal may be a DC signal, and may be of a current or voltage type; however, the disclosure is not limited thereto. In another embodiment, the drive signal may be an AC signal (for example, a PWM signal), or may include an AC signal (for example, a PWM signal) and a DC signal.

By virtue of electromagnetic force resulting from electromagnetic interaction between the coil 2120 and the first to fourth magnets 2130a1 to 2130a4, the AF operation unit, which is elastically supported by the upper elastic member 2150 and the lower elastic member 2160, may be moved in the first direction. It is possible to control the movement of the bobbin 2110 in the first direction by controlling the electromagnetic force, and it is thus possible to perform an auto focusing function.

The AF operation unit may include the bobbin 2110, which is elastically supported by the upper elastic member 2150 and the lower elastic member 2160, and the components, which are mounted on the bobbin 2110 and are moved therewith. For example, the AF operation unit may include the bobbin 2110 and the coil 2120. For example, the AF operation unit may further include a lens (not shown) mounted on the bobbin 2110.

Referring to FIG. 29, the coil 2120 may include a first coil portion 2120-1, which is disposed so as to surround the outer surface of the bobbin 2110, and a second coil portion 2120-2, which is wound in the direction opposite the direction in which the first coil portion 2120-1 is wound. Here, each of the coil portions 2120-1 and 2120-2 may also referred to a "coil unit".

For example, the first coil portion 2120-1 may be wound around the outer peripheral surface of the bobbin 2110 clockwise (or counterclockwise) about the optical axes OA, and the second coil portion 2120-2 may be wound around the outer peripheral surface of the bobbin 2110 counterclockwise (or clockwise) about the optical axis OA.

One end of the first coil portion 2120-1 and one end of the second coil portion 2120-2 may be connected to each other. When a drive signal is applied to the other end of the first coil portion 2120-1 and the other end of the second coil portion 2120-2, the direction in which current flows along the first coil portion 2120-1 and the direction in which current flows along the second coil portion 2120-2 may be opposite each other.

In FIG. 29, the first coil portion 2120-1 may be positioned above the second coil portion 2120-2, and the first coil portion 2120-1 and the second coil portion 2120-2 may be in contact with each other.

Each of the first coil portion 2120-1 and the second coil portion 2120-2 may have the form of a coil ring. Although the first ring-shaped coil portion 2120-1 and the second ring-shaped coil portion 2120-2 may be in contact with each other in FIG. 29, the disclosure is not limited thereto.

In another embodiment, the first ring-shaped coil portion 2120-1 and the second ring-shaped coil portion 2120-2 may be spaced apart from each other, and the coil 2120 may include one connecting line connecting the first coil portion 2120-1 to the second coil portion 2120-2.

For example, the coil 2120 may be disposed or wound along the groove 2105 formed in the outer surface of the bobbin 2110.

The coil 2120 may be conductively connected to at least one of the upper elastic member 2150 and the lower elastic member 2160. For example, the coil 2120 may be conductively connected to the lower springs 2160a and 2160b, and a drive signal may thus be applied to the coil 2120 via the lower springs 2160a and 2160b.

Next, the housing 2140 will be described.

The housing may support the first to fourth magnets 2130a to 2130d and the first and second yokes 2192a and 2192b, and may accommodate therein the bobbin 2110 such that the AF operation unit, for example, the bobbin 2110 is moved, in the first direction.

Figure 30A:
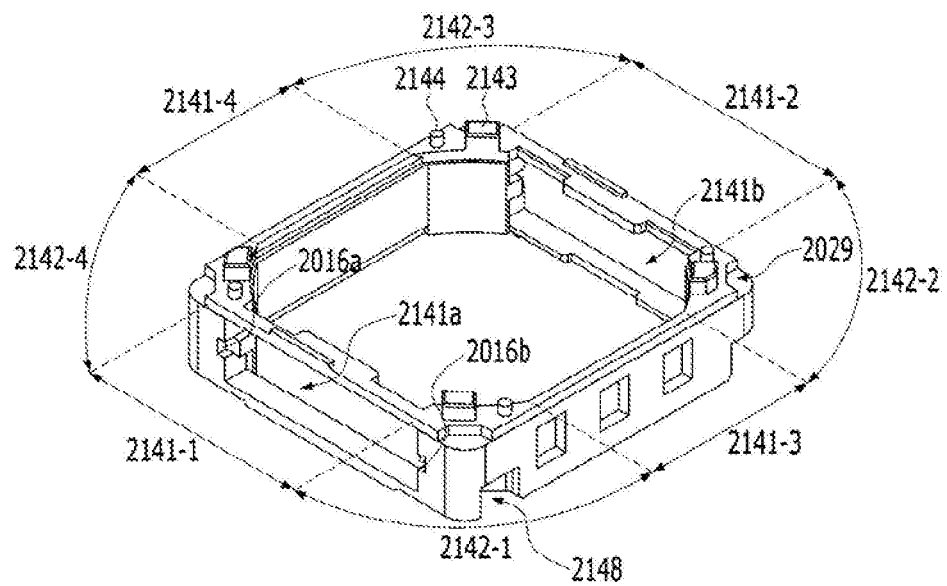
FIG. 30A is a first perspective view of the housing shown in FIG. 26.
Figure 30B:
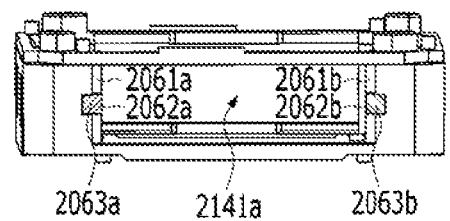
FIG. 30B is a second perspective view of the housing shown in FIG. 26.
Figure 31A:
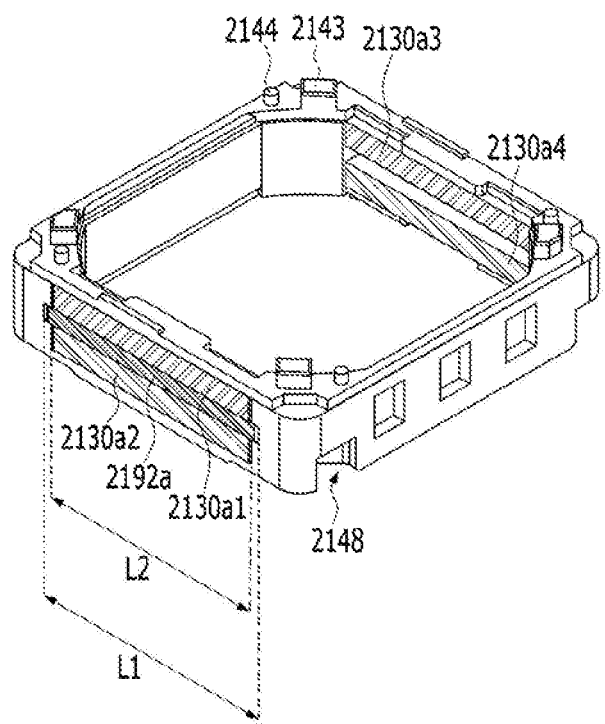
FIG. 31A is an assembled perspective view of the housing, first to fourth magnets and first and second yokes, which are shown in FIG. 26.
Figure 31B:
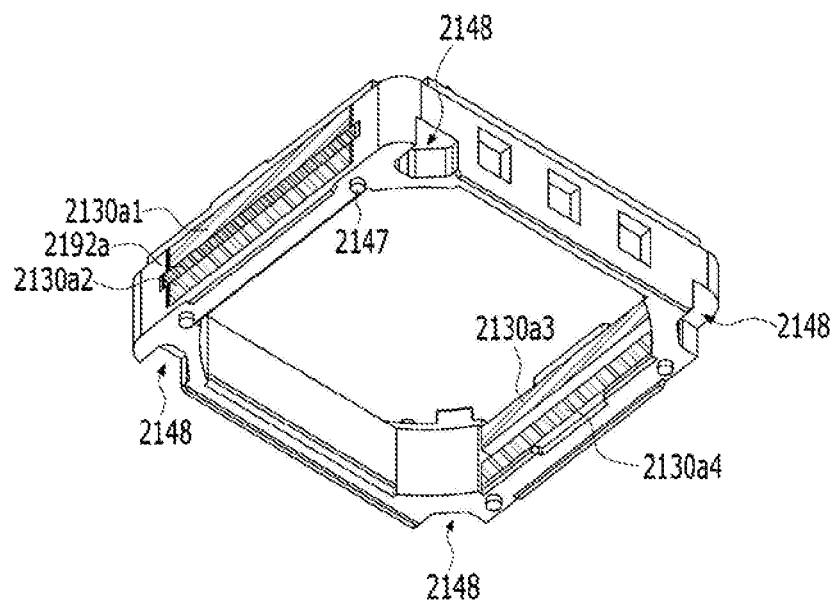
FIG. 31B is a perspective view of FIG. 31A, which is viewed in another direction.
Figure 32:
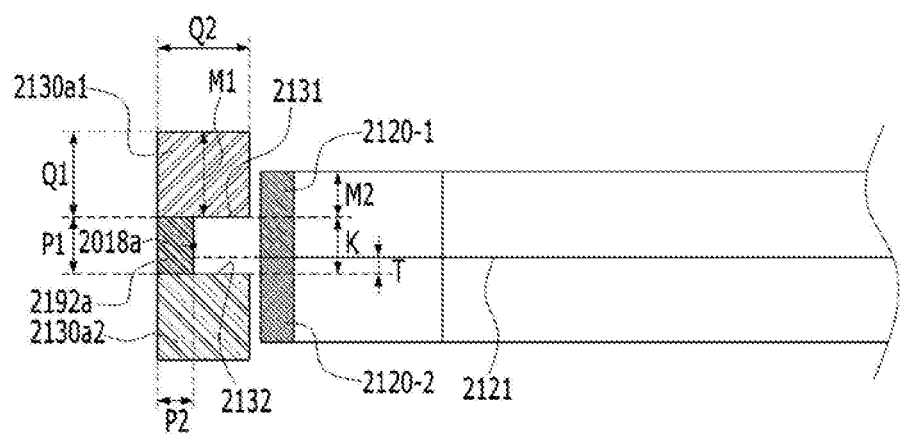
FIG. 32 illustrates the positional relationships between the first and second magnets and a coil at the initial position of the AF operation unit.
Figure 36:
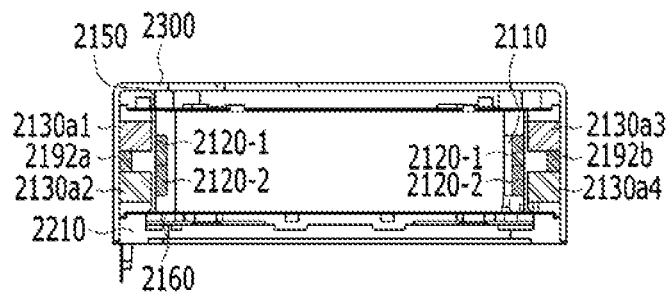
FIG. 36 is a cross-sectional view of the lens moving apparatus shown in FIG. 25, which is taken along line A-B.

FIG. 30A is a first perspective view of the housing 2140 shown in FIG. 26. FIG. 30B is a second perspective view of the housing 2140 shown in FIG. 26. FIG. 26C is a fragmentary enlarged view of the housing 2140 shown in FIG. 26. FIG. 31A is an assembled perspective view of the housing 2140, the first to fourth magnets 2130a1 to 2130a4 and the first and second yokes 2192a and 2192b, which are coupled to one another. FIG. 31B is a perspective view of FIG. 31A, which is viewed in another direction. FIG. 32 illustrates the positional relationships between the first and second magnets 2130a and 2130b and the coil 2120 when the AF operation unit is in the initial position thereof. FIG. 36 is a cross-sectional view of the lens moving apparatus 2100 shown in FIG. 25, taken along line A-B.

Referring to FIGS. 30A to 31B, the housing 2140 may have the form of a column having an opening, and may include a plurality of side portions 2141-1 to 2141-4 and corner portions 2142-1 to 2142-4, which define the opening together.

For example, the housing 2140 may include the plurality of side portions 2141-1 to 2141-4 and the corner portions 2142-1 to 2142-4, which together define a polygonal shape (for example, a square shape or an octagonal shape) or a circular shape. The upper surfaces of the plurality of side portions 2141-1 to 2141-4 and the corner portions 2142-1 to 2142-4 may define the upper surface of the housing 2140, and the outer surfaces of the plurality of side portions 2141-1 to 2141-4 and the corner portions 2142-1 to 2142-4 may define the outer surface of the housing 2140.

For example, the housing 2140 may include the side portions 2141-1 to 2141-4, which are spaced apart from one another, and the corner portions 2142-1 to 2142-4, which are spaced apart from one another. Each of the corner portions 2142-1 to 2142-4 may be disposed between two adjacent side portions.

For example, the horizontal length of each of the side portions 2141-1 to 2141-4 of the housing 2140 may be larger than the horizontal length of each of the corner portions 2142-1 to 2142-4 of the housing 2140.

The first to fourth magnets 2130a to 2130a4 may be disposed or mounted at the first and second side portions 2141-1 and 2141-2 of the housing 2140, which face each other.

For example, the first side portion 2141-1 of the housing 2140 may be provided therein with a first mounting groove 2141a, in which the first and second magnets 2130a1 and 2130a2 are mounted, disposed or secured.

The second side portion 2141-2 of the housing 2140 may be provided therein with a second mounting groove 2141b, in which the third and fourth magnets 2130a3 and 2130a4 are mounted, disposed or secured. The first side portion 2141-1 and the second side portion 2141-2 of the housing 2140 may face each other.

Although each of the first and second mounting grooves 2141a and 2141b may have the form of a hole formed through a corresponding one of the first and second side portions 2141-1 and 2141-4 of the housing 2140 in FIG. 30A, the disclosure is not limited thereto. In another embodiment, the mounting groove may have the form of a recess.

Figure 30C:
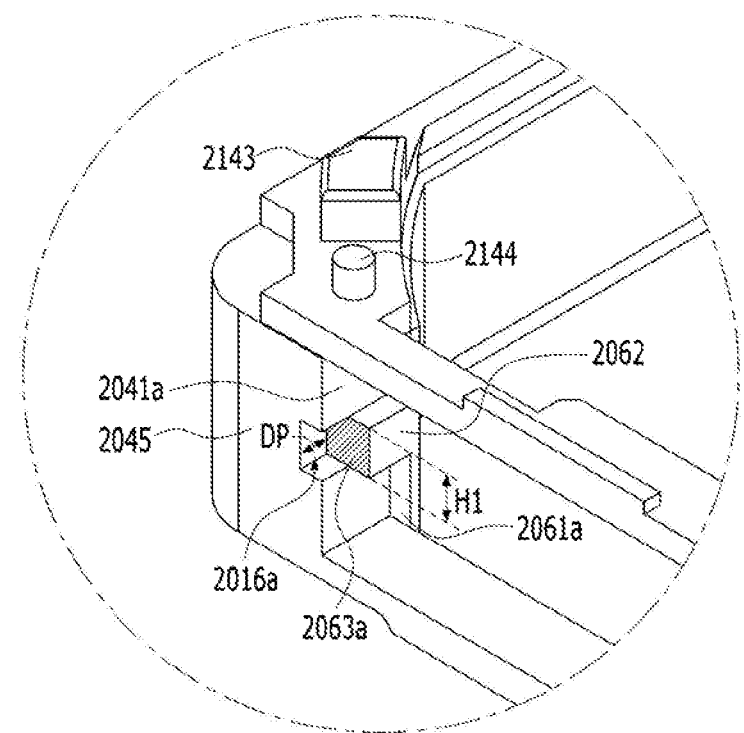
FIG. 30C is a fragmentary enlarged view of the housing shown in FIG. 26.

Referring to FIGS. 30B and 30C, a first surface 2041a of the first mounting groove 2141a may be provided with a first support 2061a for supporting regions of first side surfaces of the first and second magnets 2130a and 2130b.

The first support 2061a may project from the first side surface 2041a of the first mounting groove 2141a in a direction toward the first corner portion 2142-1 from the fourth corner portion 2142-4. The first support 2061a may be in contact with the inner surface of the housing adjacent to the first side surface of the first mounting groove 2141a.

For example, the first side surface of each of the first and second magnets 2130a and 2130b may be a side surface that faces the outer surface of the bobbin 2110, or a side surface that faces the outer surface of the bobbin 2110.

A second side surface of the first mounting groove 2141a may be provided with a second support 2061b for supporting other regions of the first side surfaces of the first and second magnets 2130a and 2130b.

The second support 2061b may project from the second side surface of the first mounting groove 2141a in a direction toward the fourth corner portion 2142-4 from the first corner portion 2142-1. The second support 2061b may be in contact with the inner surface of the housing 2140 adjacent to the second side surface of the first mounting groove 2141a.

For example, the second side surface of the first mounting groove 2141 may be a side surface that faces the first side surface 2041a of the first mounting groove 2141a.

The first side surface 2041a of the first mounting groove 2141a may be provided with a first stopper 2062a, and the second side surface of the first mounting groove 2141a may be provided with a second stopper 2062b.

The first stopper 2062a may be positioned between the upper and lower ends of the first side surface 2041a of the first mounting groove 2141a, and the second stopper 2062b may be positioned between the upper and lower ends of the second side surface of the first mounting groove 2141a.

The first stopper 2062a may project from the first side surface 2041a, and one end of the first stopper 62b may be in contact with the first support 2061a. The second stopper 2062b may project from the second side surface, and one end of the second stopper 2062b may be in contact with the second support 2061b.

The first stopper 2062a may be positioned between one end of the first magnet 2130a1 and one end of the second magnet 2130a2, which are disposed in the first mounting groove 2141a, and the second stopper 2062b may be positioned between the other end of the first magnet 2130a1 and the other end of the second magnet 2130a2.

By virtue of the first and second stoppers 2062a and 2062b, a space may be defined between the first magnet 2130a1 and the second magnet 2130a2 so as to allow the first yoke 2192a to be fitted, disposed or mounted thereinto.

The one side surface 2063a or 2063b of each of the first and second stoppers 2062a and 2062b may be positioned at a depth DP from the outer surface 2140 of the housing 2045, for example, the outer surface of the side portion (or the corner portion).

Each of the first and second stoppers 2062a and 2062b may support the first yoke 2192a, and may prevent the first yoke 2192a from escaping or entering the inside of the housing 2140.

For example, the first stopper 2062a may support one end of the first yoke 2192a, and the second stopper 2062b may support the other end of the first yoke 2192a.

The height or the length H1 in the direction of the optical axis OA may be equal to or larger than the height or the length of the first yoke 2192a in the optical-axis direction.

The first depth DP may be equal to or larger than the thickness of the first yoke 2192a. The reason for this is to prevent the first yoke 2192a from projecting outwards from the outer surface 2045 of the housing 2140 so as to eliminate spatial interference between the first yoke 2192a and the cover member 2300.

The first side surface 2041a of the first mounting groove 2141a may be provided therein with a first groove 2016a, which corresponds to and/or is in contact with the first stopper 2062a, and the second side surface of the first mounting groove 2141a may be provided therein with a second groove 2016b, which corresponds to and/or is in contact with the second stopper 2062b.

In order to allow the first yoke 2192a to be easily mounted, each of the first groove 2016a and the second groove 2016b may have an opening formed in the outer surface 45 of the housing 2140.

One end of the first yoke 2192a may be mounted, fitted or disposed in the first groove 2016a, and the other end of the first yoke 2192a may be mounted, fitted or disposed in the second groove 2016b.

When the length of the first yoke 2192a in a direction toward the first corner portion 2142-1 from the fourth corner portion 2142-4 of the housing 2140 is larger than the length of the first and second magnets 2130*a*1 and 2130*a*2 in a direction toward the first corner portion 2142-1 from the fourth corner portion 2142-4, the first yoke 2192*a* may be mounted in the housing 2140 through the first and second grooves 2016*a* and 2016*b*.

Referring to FIGS. 30B and 30C, the first surface of the second mounting groove 2141*b* may be provided with a third support for supporting regions of the first surfaces of the third and fourth magnets 2130*a* and 2130*b*.

The third support may project from the first side surface of the second mounting groove 2141*b* in a direction toward the second corner portion 2142-2 from the third corner portion 2142-3. The third support may be in contact with the inner surface of the housing 2140 adjacent to the first side surface of the second mounting groove 2141*b*.

For example, the first side surface of each of the third and fourth magnets 2130*a*3 and 2130*a*4 may be a side surface that faces the outer surface of the bobbin 2110 or a side surface that is opposed to the outer surface of the bobbin 2110.

The second side surface of the second mounting groove 2141*b* may be provided with a fourth support for supporting other regions of the first surfaces of the third and fourth magnets 2130*a*3 and 2130*a*4.

The fourth support may project from the second side surface of the second mounting groove 2141*b* in a direction toward the third corner portion 2142-3 from the second corner portion 2142-2. The fourth support may be in contact with the inner surface of the housing 2140 adjacent to the second side surface of the second mounting groove 2141*b*.

For example, the second side surface of the second mounting groove 2141*b* may be a side surface that faces the first side surface of the second mounting groove 2141*b*.

The first surface of the second mounting groove 2141*b* may be provided with the third stopper, and the second side surface of the second mounting groove 2141*b* may be provided with the fourth stopper. The descriptions of the first and second stoppers may be identically or similarly applied to the third and fourth stoppers.

In other words, the third stopper may be positioned between the upper and lower ends of the first side surface of the second mounting groove 2141*b*, and the fourth stopper may be positioned between the upper and lower ends of the second side surface of the second mounting groove 2141*b*.

The third stopper may project from the first surface of the second mounting groove 2141*b*, and one end of the third stopper may be in contact with the second support 2061*b*. The fourth stopper may project from the second side surface of the second mounting groove 2141*b*, and one end of the fourth stopper may be in contact with the second support 2061*b*.

The third stopper may be positioned between one end of the third magnet 2130*a*3 and one end of the fourth magnet 2130*a*4, which are disposed in the second mounting groove 2141*b*, and the fourth stopper may be positioned between the other end of the third magnet 2130*a*3 and the other end of the fourth magnet 2130*a*4.

By virtue of the third and fourth stoppers, a space may be defined between the third magnet 2130*a*3 and the fourth magnet 2130*a*4 so as to allow the second yoke 2192*b* to be fitted, disposed or mounted thereinto.

One end or one side surface of each of the third and fourth stoppers may be positioned at a predetermined depth from the outer surface of the housing 2140, for example, the outer surface of the side portion (or the corner portion).

Each of the first and fourth stoppers may support the second yoke 2192*b*, and may prevent the second yoke 2192*b* from escaping or infiltrating to the inside of the housing 2140.

For example, the third stopper may support one end of the second yoke 2192*b*, and the fourth stopper may support the other end of the second yoke 2192*b*.

The height or the length of each of the third and fourth stoppers in the direction of the optical axis OA may be equal to or larger than the height or the length of the second yoke 2192*b* in the optical-axis direction.

The second depth may be equal to or larger than the thickness of the second yoke 2192*b*. The reason for this is to prevent the second yoke 2192*b* from projecting outwards from the outer surface 2045 of the housing 2140 so as to eliminate spatial interference between the second yoke 2192*b* and the cover member 2300.

The first side surface of the second mounting groove 2141*b* may be provided therein with a third groove, which corresponds to and/or abuts the third stopper, and the second side surface of the second mounting groove 2141*b* may be provided therein with a fourth groove, which corresponds to and/or abuts the fourth stopper.

In order to allow the second yoke 2192*b* to be mounted, each of the third and fourth grooves may have an opening in the outer surface of the housing 2140.

One of the second yoke 2192*b* may be mounted, fitted or disposed in the third groove, and the other end of the second yoke 2192*b* may be mounted, fitted or disposed in the fourth groove.

When the length of the second yoke 2192*b* in a direction toward the first corner portion 2142-1 from the fourth corner portion 2142-4 of the housing 2140 is larger than the length of the third and fourth magnets 2130*a*3 and 2130*a*4 in a direction toward the first corner portion 2142-1 from the fourth corner portion 2142-4, the second yoke 2192*b* may be mounted on the housing 2140 through the first and fourth grooves.

In the first to fourth stoppers, the term "stopper" may be used interchangeably with the term "step", "projection" or "partition".

Although one mounting groove is formed in each of the first side portion 2141-1 and the second side portion 2141-2 of the housing 2140 in FIG. 30A, the disclosure is not limited thereto. In another embodiment, two mounting grooves may be formed in each of the first side portion 2141-1 and the second side portion 2141-2 of the housing 2140, each of the first and second magnets 2130*a*1 and 2130*a*2 may be disposed in a corresponding one of two mounting grooves formed in the first side portion 2141-1, and each of the third and fourth magnets 2130*a*3 and 2130*a*4 may be disposed in a corresponding one of two mounting grooves formed in the second side portion 2141-2.

Each of the corner portions 2142-1 to 2142-4 of the housing 2140 may be provided with a stepped portion 2029, which is formed so as to have a predetermined depth from the upper surface of the housing 2140 in the optical-axis direction. The stepped portion 2029 is a portion that corresponds to an injection gate for injection molding of the housing and which is intended to eliminate spatial interference with burs generated as a result of injection molding.

The housing 2140 may include a first stopper 2143 projecting from the upper portion or the upper surface thereof.

The first stopper 2143 of the housing 2140 is provided so as to prevent the housing 2140 from colliding with the cover member 2300. Specifically, the first stopper 2143 is able to prevent the upper surface of the housing 2140 from directly colliding with the inner surface of the top plate of the cover member 2300 when an external impact occurs.

Furthermore, the upper portion or the upper surface of the housing 2140 may be provided with a second upper protrusion 2144, to which the outer frame 2152 of the upper elastic member 2150 is coupled. For example, although the second upper protrusion 2144 may be disposed on the upper surface of at least one of the corner portions 2142-1 to 2142-4 of the housing 2140, the disclosure is not limited thereto. In another embodiment, the second upper protrusion may be disposed on the upper surface of at least one of the side portions 2141-1 to 2141-4 of the housing 2140.

The lower portion or the lower surface of the housing 2140 may be provided with a second lower protrusion 2147, to which the outer frame 2162 of the lower elastic member 2160 is coupled. For example, the lower protrusion 2147 may be disposed at the lower portion or the lower surface of at least one of the side portions 2141-1 to 2141-4 and/or the corner portions 2142-1 to 2142-4 of the housing 2140.

The lower portion or the lower surface of the corners 2142-1 to 2142-4 of the housing 2140 may have formed therein guide grooves 148, in which guide members 2216 of the base 2210 are fitted, fastened or coupled. By means of an adhesive member (not shown), the guide grooves 148 in the housing 2140 and the guide members 2216 of the base 2210 may be coupled to each other, and the housing 2140 may be coupled to the base 2210.

Next, the first to fourth magnets 2130a1 to 2130a4 will be described.

Referring to FIGS. 30A and 31A, the first and second magnets 2130a1 and 2130a2 may be disposed in the first side portion 2141-1 of the housing 2140 so as to be spaced apart from each other.

The first magnet 2130a1 may face the first coil portion 2120-1, and the second magnet 2130a2 may face the second coil portion 2120-2. The first magnet 2130a1 may be positioned above the second magnet 2130a2.

For example, the first and second magnets 2130a1 and 2130a2 may be disposed in the first mounting groove 2141a in the first side portion 2141-1 of the housing 2140.

The third and fourth magnets 2130a3 and 2130a4 may be positioned opposite the first side portion 2141-1 of the housing 2140, or may be disposed in the second side portion 2141-2, which faces the first side portion 2141-1, so as to be spaced apart from each other.

The third magnet 2130a3 may face the first coil portion 2120-1, and the fourth magnet 2130a4 may face the second coil portion 2120-3. The third magnet 2130a may be positioned above the fourth magnet 2130a4.

For example, the third and fourth magnets 2130a3 and 2130a4 may be disposed in the second mounting groove 2141b in the second side portion 2141-2 of the housing 2140.

In another embodiment, obviating the mounting grooves in the first and second side portions 2141-1 and 2141-2 of the housing 2140, the first and second magnets 21301 and 2130a2 may be disposed on the outer surface or the inner surface of the first side portion 2141-1 of the housing 2140, and the third and fourth magnets 2130a3 and 2130a4 may be disposed on the outer surface or the inner surface of the second side portion 2141-2 of the housing 2140.

Although each of the first to fourth magnets 2130a1 to 2130a4 may have a polygonal shape, for example, a rectangular parallelepiped shape, the disclosure is not limited thereto.

Each of the first to fourth magnets 2130a1 to 2130a4 may be a monopolar magnetized magnet, which has one N pole and one S pole corresponding to the N pole.

For example, the polarity of the first surface of the first magnet 2130a1, which faces the coils 2120, and the polarity of the first magnet of the second magnet 2130a2, which faces the coil 2120, may be opposite each other.

The reason for this is to combine the electromagnetic force resulting from the interaction between the first coil portion 2120-1 and the first magnet 2130a1 with the electromagnetic force resulting from the interaction between the second coil portion 2120-2 and the second magnet 2130a2.

For example, the first surface of the first magnet 2130a1 may be an S pole (or an N pole), and the first surface of the second magnet 2130a1 may be an N pole (or an S pole).

Furthermore, the polarity of the first surface of the third magnet 2130a3, which faces the coil 2120, and the polarity of the first surface of the fourth magnet 2130a4, which faces the coil 2120, may be opposite each other.

The reason for this is to combine the electromagnetic force resulting from the interaction between the first coil portion 2120-1 and the third magnet 2130a3 with the electromagnetic force resulting from the interaction between the second coil portion 2120-2 and the fourth magnet 2130a3.

For example, the first surface of the third magnet 2130a3 may be an S pole (or an N pole), and the first surface of the fourth magnet 2130a4 may be an N pole (or an S pole).

The first magnet 2130a1 and the second magnet 2130a2 may overlap each other in the optical-axis direction, and the third magnet 2130a3 and the fourth magnet 2130a4 may overlap each other in the optical-axis direction.

For example, the N pole of the first magnet 2130a1 and the S pole of the second magnet 2130a2 may overlap each other in the optical-axis direction, and the S pole of the first magnet 2130a1 and the N pole of the second magnet 2130a2 may overlap each other in the optical-axis direction. Furthermore, the N pole of the third magnet 2130a3 and the S pole of the fourth magnet 2130a4 may overlap each other in the optical-axis direction, and the S pole of the third magnet 2130a3 and the N pole of the fourth magnet 2130a4 may overlap each other in the optical-axis direction.

In this embodiment, in order to reduce magnetic-field interference with an adjacent camera module or a lens moving apparatus, the first to fourth magnets 2130a1 to 2130a4 may be disposed at the first and second side portions 2141-1 and 2141-2 of the housing 2140 and a magnet may not be disposed at the third and fourth side portions 2141-3 and 2141-4; however, the disclosure is not limited thereto.

In another embodiment, in order to increase electromagnetic force, magnets may be disposed in the same fashion at the third and fourth side portions 2141-3 and 2141-4 as well as at the first and second side portions 2141-1 and 2141-2 of the housing 2140.

Although the first surface of each of the first to fourth magnets 2130a1 to 2130a4, which faces the coil 2120, may be planar, the disclosure is not limited thereto, and the first surface may be curved.

At least one of corners of each of the first to fourth magnets 2130a1 to 2130a4 may be rounded or curved.

Referring to FIG. 32, each of a first length Q1 and a second length Q2 of each of the first to fourth magnets 2130a1 to 2130a4 may be 0.4 [mm]~0.8 [mm]. For example, each of the first length Q1 and the second length Q2 of each of the first to fourth magnets 2130a1 to 2130a4 may be 0.64 [mm].

The first length Q1 may be a length in the optical-axis direction, and the second length Q2 may be a length in a direction toward the second surface from the first surface of each of the first to fourth magnets 2130a1 to 2130a4. The first surface of each of the first to fourth magnets 2130a1 to 2130a4 may be the surface that faces the coil 2120, and the second surface of each of the first to fourth magnets 2130a1 to 2130a4 may be a surface opposite the first surface.

Next, the first yoke 2192a and the second yoke 2192b will be described.

The first yoke 2192a may be disposed at the first side portion 2141-1 of the housing 2140, and may be positioned between the first magnet 2130a1 and the second magnet 2130a2.

Although each of the first and second yokes 192a and 192b may have a polyhedral shape, for example, a rectangular parallelepiped shape, the disclosure is not limited thereto.

For example, the upper surface of the first yoke 2192a may be in contact with the lower surface of the first magnet 2130a1, and the lower surface of the first yoke 2192a may be in contact with the upper surface of the second magnet 2130a2; however, the disclosure is not limited thereto.

For example, the first yoke 2192a may be disposed in the first mounting groove 2141a, and may be supported by the first stopper 2062a and the second stopper 2062b.

The second yoke 2192b may be disposed at the second side portion 2141-2 of the housing 2140, and may be positioned between the third magnet 2130a3 and the second magnet 2130a4.

For example, the upper surface of the second yoke 2192b may be in contact with the lower surface of the third magnet 2130a3, and the lower surface of the second yoke 2192b may be in contact with the upper surface of the fourth magnet 2130a4; however, the disclosure is not limited thereto.

For example, the second yoke 2192b may be disposed in the second mounting groove 2141b in the housing 2140, and may be supported by the third stopper and the fourth stopper.

Referring to FIG. 31A, in order to increase electromagnetic force resulting from the interaction with the coil 2120, the length L1 of the first yoke 2192a may be larger than the length L2 of each of the first magnet 2130a1 and the second magnet 2130a2 (L1>L2); however, the disclosure is not limited thereto. In another embodiment, both the lengths may be the same. In a further embodiment, the length of the first yoke 2192a may also be smaller than the length of the first and second magnets 2130a1 and 2130a2.

For example, each of the lengths L1 and L2 may be a length in a direction toward one corner portion of the housing 2140 adjacent to one side of the first side portion 2141-1 of the housing 2140 from another corner portion of the housing 2140 adjacent to the other side of the first side portion 2141-1 of the housing 2140.

For example, L1 may be a length of the first yoke 2192a in a direction toward the fourth corner portion 2142-4 from the first corner portion 2142-1 of the housing 2140, and L2 may be a length of each of the first magnet 2130a1 and the second magnet 2130a3 in a direction toward the fourth corner portion 2142-4 from the first corner portion 2142-1 of the housing 2140.

For example, L1 may be a length in a longitudinal direction of the first yoke 2192a, and L2 may be a length in a longitudinal direction of each the first magnet 2130a1 and a second magnet 2130a2.

In order to increase electromagnetic force resulting from the interaction with the coil 2120, the length of the second yoke 2192b in a direction toward the third corner portion 2142-3 from the second corner portion 2142-2 may be larger than the length of each of the third magnet 2130a3 and the fourth magnet 2130a4 in a direction toward the third corner portion 2142-3 from the second corner portion 2142-2; however, the disclosure is not limited thereto. In another embodiment, the two lengths may be the same. In a further embodiment, the length of the second yoke 2192b may be smaller than the length of the third and fourth magnets 2130a3 and 2130a4. Descriptions regarding the lengths L1 and L2 may be equally or similarly applied to the second yoke 2192b and the third and fourth magnets 2130a3 and 2130a4.

The first yoke 2192a may serve to suppress magnetic-field interference with the second coil portion 2120-2 caused by magnetic fields of the first and third magnets 2130a1 and 2130a3 and magnetic-field interference with the first coil portion 120-1 caused by magnetic fields of the second and fourth magnets 2130a2 and 2130a4.

By suppressing such magnetic-field interference, it is possible to increase the electromagnetic force between the first to fourth magnets 2130a1 to 2130a4 and the coil 2120.

Each of the first yoke 2192a and the second yoke 2192b may be made of nonmagnetic metal. For example, the first and second yokes 192a and 192b may be made of SUS (Steel Use Stainless) material, for example, SUS420 or SUS430 or the like.

Alternatively, the first yoke 2192a and the second yoke 2192b may be made of magnetic material.

Referring to FIG. 32, although the length P1 of the first yoke 2192a in the optical-axis direction may be smaller than the length Q1 of each of the first and second magnets 2130a1 and 2130a2 in the optical-axis direction, the disclosure is not limited thereto. In another embodiment, the length P1 of the first yoke 2192a in the optical-axis direction may be equal to the length Q1 of each of the first and second magnets 2130a1 and 2130a2 in the optical-axis direction.

The first length P1 of the first yoke 2192a may be equal to or larger than the second length P2 of the first yoke 2192a (P1≥P2). Furthermore, the first length of the second yoke 2192b may be equal to or larger than the second length of the second yoke 2192b.

The first length P1 of each of the first and second yokes 2192a and 2192b may be a length in the optical-axis direction, and the second length P2 of each of the first and second yokes 2192a and 2192b may be a length in a direction toward the second surface from the first surface of each of the first and second yokes 2192a and 2192b.

The first surface of each of the first and second yokes 2192a and 2192b may be the surface that faces the coil 2120, and the second surface of each of the first and second yokes 2192a and 2192b may be the opposite surface of the first surface.

The second length P2 of each of the first and second yokes 2192a and 2192b may be smaller than the second length Q2 of each of the first and second magnets 2130a1 and 2130a2 (P2<Q2); however, the disclosure is not limited thereto. In another embodiment, the second length P2 of each of the first and second yokes 2192a and 2192b may be equal to the second length Q2 of each of the first and second magnets 2130a1 and 2130a2.

The first length P1 of each of the first and second yokes 2192a and 2192b may be 0.25 [mm]~0.6 [mm]. For example, P1 may be 0.4 [mm]. When the first length P1 is smaller than 0.25 [mm], the first and second yokes 2192a and 2192b may be lowered in durability and may be apt to buckle. Meanwhile, when the first length P1 is larger than 0.6 [mm], the range in which the coil 2120 overlaps the first to fourth magnets 2130a to 2130d in a horizontal direction may decrease, thereby decreasing electromagnetic force and reliability of AF operation.

The second length P2 of each of the first and second yokes 2192a and 2192b may be 0.25 [mm]~0.6 [mm]. For example, P2 may be 0.25 [mm]. When the second length P2 is smaller than 0.25 [mm], the first and second yokes 2192a and 2192b may be lowered in durability and may be apt to buckle. Meanwhile, when the second length P2 is larger than 0.6 [mm], spatial interference between the first and second yokes 2192a and 2192b and the coil 2120 and/or spatial interference between the first and second yokes 2192a and 2192b and the cover member 2300 may occur.

Next, the positional relationships between the first and second magnets 2130a1 and 2130a2 and the coil 2120 will be described with reference to FIGS. 32 and 36. The description regarding the positional relationships between the first and second magnets 2130a1 and 2130a2 and the coil 2120 may be equally applied to the positional relationships between the third and second magnets 2130a3 and 2130a4 and the coil 2120.

Referring to FIGS. 32 and 36, at the initial position of the AF operation unit, for example, at the initial position of the bobbin 2110, the first to fourth magnets 2130a1 to 2130a2 disposed at the housing 2140 may overlap at least a portion of the coil 2120 in a horizontal direction. For example, the horizontal direction may be a direction that is perpendicular to the optical axis and is parallel to a straight line extending through the optical axis.

Here, the initial position of the bobbin 2110 may be the initial position of the AF operation unit in the state in which power is not applied to the coil 2120, and may be the position of the AF operation unit when the upper elastic member 1150 and the lower elastic member 1160 are elastically deformed only by the weight of the AF operation unit.

Furthermore, the initial position of the bobbin 2110 may be the position of the AF operation unit when gravity is applied toward the base 2210 from the bobbin 2110 or toward the bobbin 2110 from the base 2210.

At the initial position of the bobbin 2110, each of the first and third magnets 2130a1 and 2130a3 disposed at the housing 2140 may overlap at least a portion of the first coil portion 2120-1 in a horizontal direction.

At the initial position of the bobbin 2110, each of the second and fourth magnets 2130a2 and 2130a4 disposed at the housing 2140 may overlap at least a portion of the second coil portion 2120-2 in a horizontal direction.

In order to ensure linearity of displacement of the AF operation unit according to a drive signal (drive current) as well as to improve drive operation resulting from the interaction between the first to fourth magnets 2130a1 to 2130a4 and the coil 2120, the positional relationships between the first and second magnets 2130a1 and 2130a2 and the coil 2120 may be as follows.

At the initial position of the bobbin 2110, the boundary region 2121 between the first coil portion 2120-1 and the second coil portion 2120-2 may be positioned so as to be lower than the lower surfaces 131 of the first and third magnets 2130a1 and 2130a3 but to be higher than the upper surfaces 2132 of the second and fourth magnets 2130a2 and 2130a4.

For example, the boundary region 2121 may be a boundary line, a boundary plane or a boundary portion for distinguishing the first coil portion 2120-1 from the second coil portion 2120-2.

At the initial position of the bobbin 2110, the boundary region 2121 between the first coil portion 2120-1 and the second coil portion 2120-2 may overlap the first and second yokes 192a and 192b in a horizontal direction.

Consequently, the effect on the second coil portion 2120-2 caused by the magnetic field of the first magnet 2130a1 and the effect on the first coil portion 2120-1 caused by the magnetic field of the second magnet 2130a2 are reduced, and thus the effect on electromagnetic force required for AF operation caused by magnetic-field interference is reduced. As a result, it is possible to ensure linearity in displacement of the AF operation unit according to a drive signal (a drive current) and reliability in autofocusing.

The first yoke 2192a may overlap at least a portion of each of the first and second magnets 2130a1 and 2130a2 in the optical-axis direction. The second yoke 2192b may overlap at least a portion of each of the third and fourth magnets 2130a3 and 2130a4 in the optical-axis direction.

For example, the first yoke 2192a and the second yoke 2192b may be positioned or disposed at the same height.

The boundary region 2121 between the first coil portion 2120-1 and the second coil portion 2120-2 may be positioned lower than the center 2018a of the first yoke 2192a and the center of the second yoke 2192b. Accordingly, it is possible to ensure linearity in displacement of the AF operation unit according to a drive signal (a drive current) and reliability of autofocusing. For example, the center of the first yoke 2192a may be a point positioned at the center between the upper and lower surfaces of the first yoke 2192a, and the center of the second yoke 2192b may be a point positioned at the center between the upper and lower surfaces of the second yoke 2192b.

At the initial position of the bobbin 2110, the length M2 in the optical-axis direction in which the first coil portion 2120-1 and the first magnet 2130a overlap each other may be equal to or smaller than the length M1 of the first magnet 2130a1 in the optical-axis direction.

At the initial position of the bobbin 2110, the length in the optical-axis direction in which the first coil portion 2120-1 and the third magnet 2130a3 overlap each other may be equal to or smaller than the length of the third magnet 2130a1 in the optical-axis direction.

In the lens moving apparatus 110 according to the embodiment, the maximum moving distance (or the maximum movable distance) of the bobbin 2110 in a forward direction (or in an upward direction) may be larger than the maximum moving distance (or a maximum movable distance) of the bobbin 2110 in a rearward direction (or in a downward direction).

For example, the bobbin 2110, in which a lens having a first focal distance (infinity) is mounted, may be positioned at −30 [μm] from the initial position of the bobbin 2110, and the bobbin 2110, in which a lens having a second focal length (macro) is mounted, may be at +250 [μm]~+280 [F] from the initial position of the bobbin 2110. Here, a negative number may indicate the rearward direction, and a positive number may indicate the forward direction.

In the case in which the bobbin 2110 has such a displacement, the embodiment is able to suppress loss in electromagnetic force caused by movement of the bobbin 2110 by positioning the boundary region 2121 between the first coil portion 2120-1 and the second coil portion 2120-2 lower than the center 2018a of the first yoke 2192a, and is able to ensure linearity in displacement of the AF operation unit.

At the initial position of the bobbin 2110, the length in the optical-axis direction in which the first coil portion 2120-1 and the third magnet 2130a3 overlap each other may be equal to or smaller than 50% of the length of the third magnet 2130a3 in the optical-axis direction. Accordingly, it is possible to ensure linearity in displacement of the AF operation unit according to a drive signal (a drive current) and reliability in autofocusing.

For example, the distance K between the lower surface 131 of the first magnet 2130a1 and the upper surface 2132 of the second magnet 2130a2 may be 0.25 [mm]~0.6 [mm]. For example, K may be 0.4 [mm].

In order to ensure reliability in displacement of the AF operation unit according to a drive signal (drive current) and to ensure reliability in autofocusing, at the initial position of the bobbin 2110, the distance T between the boundary region between the first coil portion 2120-1 and the second coil portion 2120-2 and the extended line of the upper surface 2132 of the second magnet 2130a2 may be equal to or larger than 12.5% but smaller than 50% of the distance K between the first magnet 2130a1 and the second magnet 2130a2 in the optical-axis direction.

When the distance T is smaller than 12.5%, the effect on the first coil portion 2120-1 caused by magnetic-field interference of the second and fourth magnets 2130a2 and 2130a4 may be increased, thereby deteriorating linearity. When the distance T is larger than 50%, the effect on the second coil portion 2120-2 caused by magnetic-field interference of the first and third magnets 2130a1 and 2130a3 may be increased, and the amount of electromagnetic force that is required for AF operation when the bobbin 2110 is moved forwards may be decreased.

For example, in order to ensure linearity in consideration of the weight of a lens mounted in the bobbin 2110, the first distance T may be equal to or larger than 12.5% of the distance K but equal to or smaller than 40% of the distance K. Specifically, the distance T may be equal to or larger than 25% of the distance K but equal to or smaller than 35% of the distance K.

As described above, the first yoke 2192a may be disposed between the first and second magnets 2130a1 and 2130a2, and the second yoke 2192b may be disposed between the third and fourth magnets 2130a3 and 2130a4. Consequently, it is possible to prevent reduction of the magnetic flux that is generated horizontally from the first to fourth magnets 2130a1 to 2130a2 and thus to prevent reduction of electromagnetic force caused by leakage of magnetic flux.

In the case of a dual camera, reliability in AF operation or OIS operation may generally be deteriorated due to magnetic-field interference between magnets included in two adjacent lens moving apparatuses. In order to suppress the magnetic-field interference, a structure in which a portion of one end or two ends of a magnet is chamfered may be adopted. However, adoption of the structure may increase manufacturing costs, reduce magnetic force, degrade sensitivity and decrease assembly efficiency due to addition of chamfering process.

In the case of a dual camera, the embodiment is able to reduce magnetic-field interference with the magnets of adjacent lens moving apparatuses by virtue of the first and second yokes 2192a and 2192b, to dispose the magnets, the yokes and the like symmetrically with respect to the center of the housing and the optical axis without imbalance, and to ensure reliability in AF operation or OIS (Optical Image Stabilizer) without being affected by magnetic-field interference.

Generally, as the ambient temperature increases, demagnetization attributable to heat may occur at the first to fourth magnets 2130a1 to 2130a4, and the sensitivity of an AF operation unit may decrease.

In the case of providing the first and second yokes 2192a and 2192b, it is possible to suppress a decrease in the sensitivity of the AF operation unit attributable to demagnetization of the first to fourth magnets 2130a1 to 2130a4 due to heat. The reason for this is because demagnetization of the first to fourth magnets 2130a1 to 2130a4 may be suppressed by means of the first and second yokes 2192a and 2129b.

Accordingly, the embodiment is able to suppress demagnetization of the first to fourth magnets 2130a1 to 2130a4 due to heat, to suppress reduction of electromagnetic force resulting from the interaction between the coil 2120 and the first to fourth magnets 2130a1 to 2130a4, and to perform accurate AF operation.

Furthermore, since the embodiment includes four monopolar magnetized magnets 2130a1 to 2130a4, it is possible to increase electromagnetic force compared to the case in which one magnet is provided at each of the first and second side portions 2141-1 and 2141-2 of the housing 2140 (for example, Case 1). For example, the embodiment is able to obtain an effect of increasing electromagnetic force by about 6% compared to Case 1.

In a lens moving apparatus according to another embodiment, the maximum moving distance (or the maximum movable distance of the bobbin 2110 in a rearward direction (or in a downward direction) may be larger than the maximum moving distance (or the maximum movable distance) of the bobbin 2110 in a forward direction (or in an upward direction). In this case, the following description may be applied.

For example, at the initial position of the bobbin 2110, the length in the optical-axis direction in which the second coil portion 2120-2 and the second magnet 2130a2 overlap each other may be equal to or smaller than 50% of the length of the second magnet 2130a2 in the optical-axis direction. Furthermore, at the initial position of the bobbin 2110, the length in the optical-axis direction in which the second coil portion 2120-2 and the fourth magnet 2130a4 overlap each other may be equal to or smaller than the length of the fourth magnet 2130a4 in the optical-axis direction.

Next, the upper elastic member 2150 and the lower elastic member 2160 will be described.

The upper elastic member 2150 and the lower elastic member 2160 may be coupled to the bobbin 2110 and the housing 2140 so as to elastically support the bobbin 2110.

Figure 33:
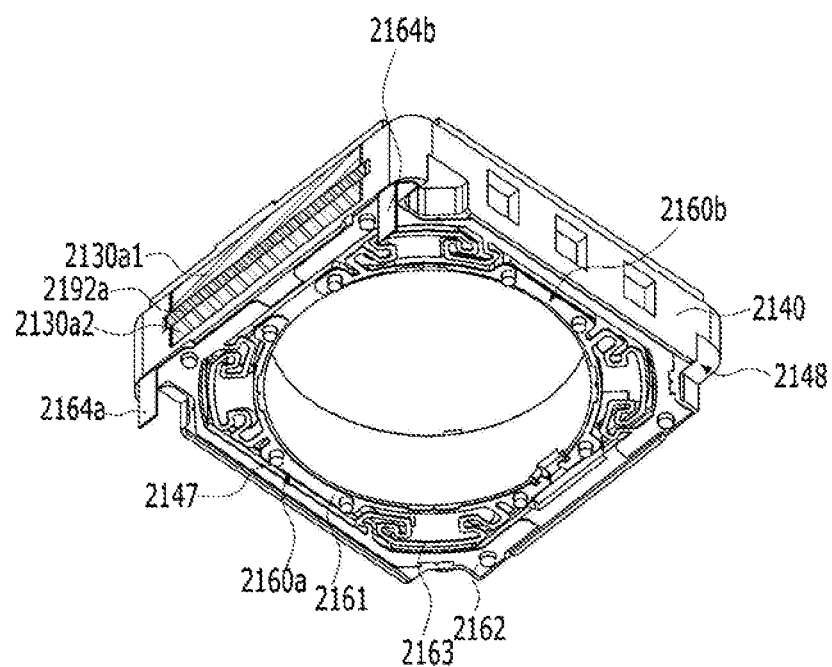
FIG. 33 is a perspective view of the housing, the first to fourth magnets, the first and second yokes and a lower elastic member.
Figure 34:
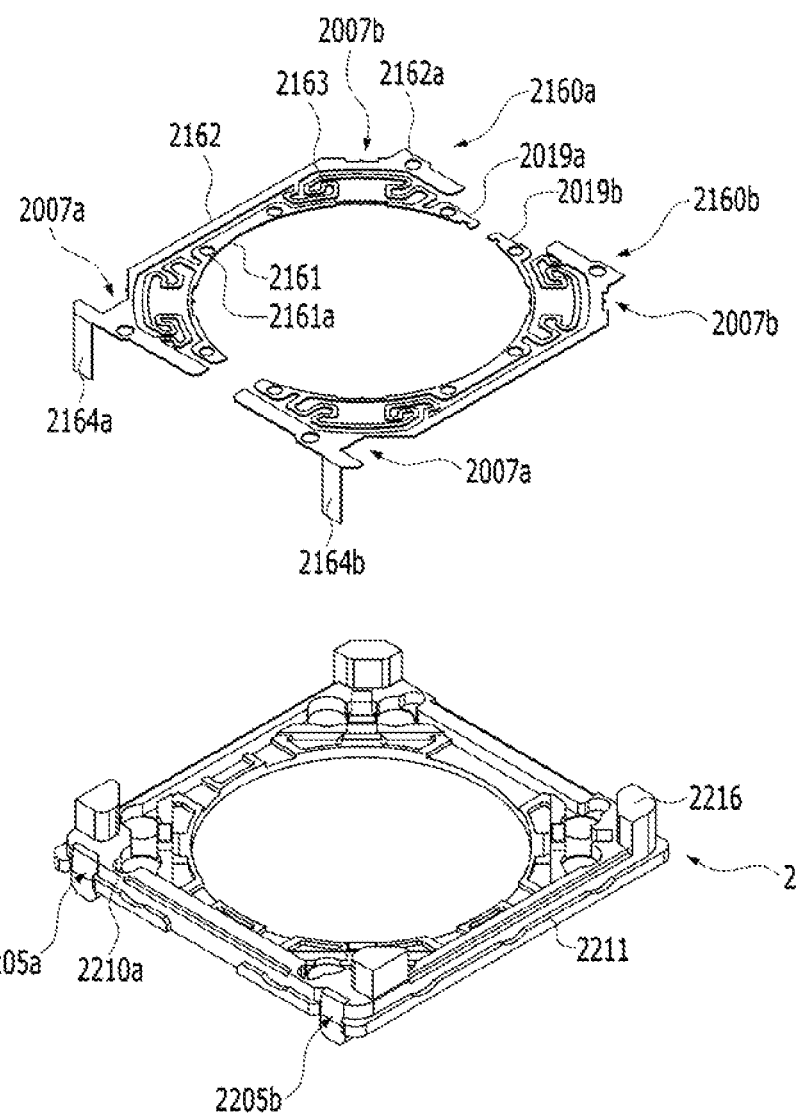
FIG. 34 is an exploded perspective view of the base and the lower elastic member.
Figure 35:
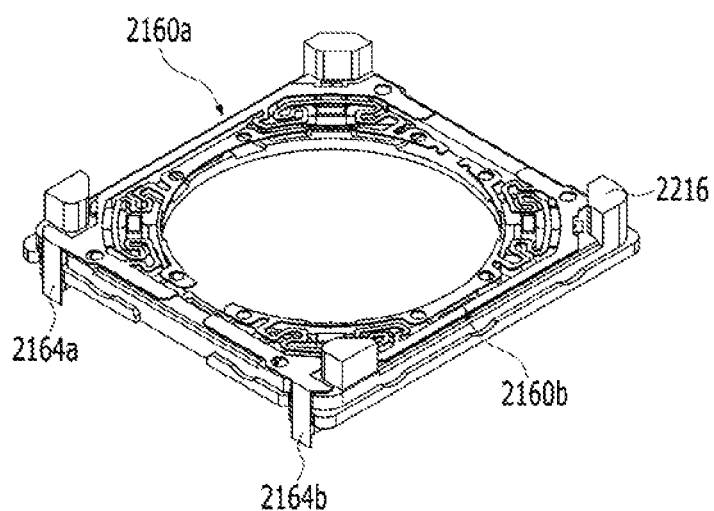
FIG. 35 is an assembled perspective view of the base and the lower elastic member, which are shown in FIG. 34.

FIG. 33 is a perspective view of the housing 2140, the first to fourth magnets 2130a1 to 2130a4, the first to fourth yokes 192a and 1292b and the lower elastic member 2160. FIG. 34 is an exploded perspective view of the base 2210 and the lower elastic member 2160. FIG. 35 is an assembled perspective view of the base 2210 and the lower elastic member 2160.

Referring to FIGS. 26, 27, 33 and 35, the upper elastic member 2150 may be coupled both to the upper portion, the upper surface or the upper end of the bobbin 2110 and to the upper portion, the upper surface or the upper end of the housing 2140, and the lower elastic member 2160 may be coupled both to the lower portion, the lower surface or the lower end of the bobbin 2110 and to the lower portion, the lower surface or the lower end of the housing 2140.

Although the upper elastic member 2150 shown in FIGS. 26 and 27 is composed of an upper spring having a single structure, the disclosure is not limited thereto. In another embodiment, the upper elastic member may include a plurality of upper springs, which are spaced apart from or separated from each other.

Although the upper elastic member 2150 and the lower elastic member 2160 may be embodied as leaf springs, the disclosure is not limited thereto. The upper and lower elastic members may be embodied as coil springs, suspension wires or the like.

The upper elastic member 2150 may include a first inner frame 2151 coupled to the first upper protrusion 2113 of the bobbin 2110, a first outer frame 2152 coupled to the second upper protrusion 2144 of the housing 2140, and a first frame connection portion 2153 connecting the first inner frame 2151 to the first outer frame 2152.

Although the upper elastic member 2150 shown in FIGS. 26 and 27 is embodied by a single upper spring, the disclosure is not limited thereto. In another embodiment, the upper elastic member may include two or more upper springs.

For example, the first inner frame 2151 of the upper elastic member 2150 may have formed therein a through hole or a groove, which is coupled to the first upper protrusion 2113 of the bobbin 2110, and the first outer frame 2152 may have formed therein a through hole or a groove, which is coupled to the upper protrusion 2144 of the housing 2140.

The lower elastic member 2160 may include the first and second lower springs 2160a and 2160b, which are spaced apart from each other. The first and second springs 2160a and 2160b may be conductively isolated from each other.

Each of the first and second lower springs 2160a and 2160b may include a second inner frame 2161 coupled to the first lower protrusion 2114 of the bobbin 2110, a second outer frame 2162 coupled to the second lower protrusion 2147 of the housing 2140, and a second frame connection portion 2163 connecting the second inner frame 2161 to the second outer frame 2162.

For example, the second inner frame 2161 of each of the first and second lower springs 2160a and 2160b may have formed therein a through hole or a groove 2161a coupled to the first lower protrusion 2114 of the bobbin 2110, and the second outer frame 2162 may have formed therein a through hole or a groove 2162a coupled to the second lower protrusion 2147 of the housing 2140.

By means of an adhesive member or heat fusion, it is possible to adhesively bond the first upper protrusion 2113 of the bobbin 2110 to the through hole in the first inner frame 2151, the first lower protrusion 2117 of the bobbin 2110 to the through hole 2161a in the second inner frame 2161, the second upper protrusion 2144 of the housing 2140 to the through hole in the first outer frame 2152, and the second lower protrusion 2147 of the housing 2140 to the through hole 2162a in the second outer frame 2162.

Each of the first and second frame connection portions 2153 and 2163 may be bent or curved at least once (or formed into a curved line) so as to define a predetermined pattern. The upward and/or downward movement of the bobbin 2110 in the first direction may be flexibly (or elastically) supported through changes in position and fine deformation of the first and second frame connection portions 153 and 163.

The coil 2120 may be coupled to the second inner frame 161 of the first and second lower springs 2160a and 2160b, and may be conductively connected to the first and second lower springs 2160a and 2160b.

For example, one end of the first coil portion 2101-1 may be coupled to one of the second inner frames 2161 of the first and second lower springs 2160a and 2160b, and one end of the second coil portion 2120-2 may be coupled to the other of the second inner frames 2161 of the first and second lower springs 2160a and 2160b.

Referring to FIG. 34, the upper surface of one end of the second inner frame 2161 of the first lower spring 2160a may be provided with a first bonding portion 2019a, to which one end of the first coil portion 2120-1 is coupled, and the upper surface of one end of the second inner frame 2161 of the second lower spring 160b may be provided with a second bonding portion 2019b, to which one end of the second coil portion 2120-2 is coupled.

By means of a conductive adhesive member such as solder, the coil 2120 may be bonded to the first and second bonding portions 2019a and 2019b. The term "bonding portion" in the first and second bonding portions 2019a and 2019b may be used interchangeably with the term "pad portion", "connection terminal", "solder portion" or "electrode portion".

In order to prevent an oscillation phenomenon during movement of the bobbin 2110, a damper may be disposed between the first frame connection portion 2153 of the upper elastic member 2150 and the upper surface of the bobbin 2110. A damper (not shown) may also be disposed between the second frame connection portion 2163 of the lower elastic member 2160 and the lower surface of the bobbin 2110.

Furthermore, a damper may also be applied between each of the bobbin 2110 and/or the housing 2140 and the upper elastic member 2150 or between each of the bobbin 2110 and/or the housing 2140 and the lower elastic member 2160. Although the damper may be, for example, gel-type silicone, the disclosure is not limited thereto.

In order to avoid spatial interference with the guide member 2216 of the base 2210, the corner portions of the second outer frame of each of the lower springs 2160a and 2160b may have formed therein escape recesses 7a and 7b.

Each of the first and second lower springs 2160a and 2160b may be disposed on the upper surface of the base 2210.

Each of the first and second lower springs 2160a and 2160b may include first and second connection terminals 2164a and 2164b, which are conductively connected to external components. The term "connection terminal", used to describe the first and second connection terminals 2164a and 2164b, may be used interchangeably with the term "pad portion", "bonding portion", "solder portion" or "electrode portion".

For example, each of the first and second connection terminals 2164a and 2164b may be connected to the outer surface of the second outer frame 163 of a corresponding one of the first and second lower springs 2160a and 2160a may be bent toward the base 2210 and may then extend therefrom.

The first and second connection terminals 2164a and 2164b of the first and second lower springs 2160a and 2160b may be disposed on the first outer surface 210a of the base 2210 so as to be spaced apart from each other, and may be in contact with the outer surface 210a of the base 2210.

For example, the first and second connection terminals 2164a and 2164b may be disposed on one outer surface 2210a among the outer surfaces of the base 2210. The reason for this is to facilitate a soldering operation for conductive connection to an external component. However, the embodiment is not limited thereto. In another embodiment, the first and second connection terminals of the first and second lower springs may be disposed on two different outer surfaces of the base 2210.

The base 2210 may be coupled to the housing 2140, and may define a space in conjunction with the cover member 2300 so as to accommodate the bobbin 2110 and the housing 2140. The base 2210 may have an opening corresponding to the opening in the bobbin 2110 and/or the opening in the housing 2140, and may have a shape that coincides with or corresponds to the cover member 2300, for example, a square shape.

The base 2210 may include the guide members 2216, which project upwards a predetermined height from four respective corner portions thereof.

Although each of the guide members 2216 may have a polygonal column, which projects from the upper surface of the base 2210 so as to be perpendicular to the upper surface of the base 2210, the disclosure is not limited thereto.

The guide member 2216 may be fitted into a guide groove 2148 in the housing 2140, and may be fastened or coupled to the guide groove 2148 by means of an adhesive member (not shown) such as epoxy, silicone or the like.

The first outer surface 210a of the base 2210 may have formed therein first and second depressed portions 2205a and 2205b corresponding to the first and second connection terminals 2164a and 2164b of the first and second lower springs 2160a and 2160b.

For example, the first and second depressed portions 2205a and 2205b may be disposed on one outer surface of the side portions of the base 2210 so as to be spaced apart from each other.

For example, each of the first and second depressed portions 2205a and 2205b may include an upper opening in the upper surface of the base 2210 and a lower opening in the lower surface of the base 2210.

For example, the inner surface of each of the first and second connection terminals 2164a and 2164b may be in contact with one surface of the first and second depressed portions 2205a and 2205b (for example, the bottom surface).

The outer surface of each of the first and second connection terminals 2164a and 2164b, which are disposed in the first and second depressed portions 2205a and 2205b, may be exposed from the outer surface of the base 2210.

Although the lower end of each of the first and second connection terminals 2164a and 2164b may be exposed from the lower surface of the base 2210, the disclosure is not limited thereto. In another embodiment, the lower end of each of the first and second connection terminals may not be exposed from the lower surface of the base 2210.

The first and second connection terminals 2164a and 2164b may be conductively connected to external wires or external elements by means of a conductive member, for example, solder, so as to allow power or a signal to be supplied thereto from the outside.

The lower end of the outer surface of the base 2210 may be provided with a step 2211. The step 2211 may be in contact with the lower ends of the side plates of the cover member 2300, and may guide the cover member 2300. Here, the step 2211 of the base 2210 and the lower ends of the side plates of the cover member 2300 may be adhesively secured and sealed to each other by means of adhesive or the like.

Although each of the first and second connection terminals 2164a and 2164b of the first and second lower springs 2160a and 2160b shown in FIGS. 34 and 35 may be integrally formed with the second inner frame 2161, the second outer frame 2162 and the second frame connection portion 2163, the disclosure is not limited thereto.

In another embodiment, each of the first and second lower springs may include only the second inner frame 2161, the second outer frame 2162 and the second frame connection portion 2163, and each of the first and second connection terminals may be separately disposed on the outer surface of the base 2210.

Here, one end of each of the first and second connection terminals disposed on the outer surface of the base 2210 may coupled or bonded to the second outer frame of a corresponding one of the first and second lower springs by means of a conductive adhesive member such as solder.

The embodiment may be an AF lens moving apparatus mounted on a dual camera. The dual camera module refers to a single camera module including two lens moving apparatuses therein. For example, the dual camera module may include a lens moving apparatus capable of performing only an autofocusing function (hereinafter, referred to as an "AF lens moving apparatus") and a lens moving apparatus capable of performing both an autofocusing function and an OIS (Optical Image Stabilizer) function (hereinafter, referred to as an "OIS lens moving apparatus").

The first to fourth magnets 2130a to 3130d, the first and second yokes 2192a and 2192b, and the coil 2120, which are shown in FIG. 26, may be applied to the lens moving apparatus according to the embodiment shown in FIG. 15. For example, the coil 1120 shown in FIG. 15 may include the first and second coil portions 2120-1 and 2120-2 of the coil 2120 shown in FIG. 26, and may be disposed at the housing 1140.

The first magnet 1130-1 shown in FIG. 15 may include the first and second magnets 2130a1 and 2130a2 shown in FIG. 26, and may be disposed on the first side surface 1110b-1 of the bobbin 1110. The first yoke 2192a may be disposed between the first and second magnets 2130a1 and 2130a2, and may be disposed at the bobbin 1110.

The second magnet 1130-2 shown in FIG. 15 may include the third and fourth magnets 2130a3 and 2130a4 shown in FIG. 26, and may be disposed on the second side surface 1110b-2 of the bobbin 1110. The second yoke 2192b may be disposed between the third and fourth magnets 2130a3 and 2130a4, and may be disposed at the bobbin 1110.

Meanwhile, the lens moving apparatuses according to the above-described embodiments may be used in various fields, such as, for example, those of a camera module or an optical device.

For example, the lens moving apparatus 100 according to the embodiment may be included in an optical instrument, which is designed to form the image of an object in a space using reflection, refraction, absorption, interference, diffraction or the like, which is the characteristic of light, to extend eyesight, to record an image obtained through a lens or to reproduce the image, to perform optical measurement, or to propagate or transmit an image. For example, the optical instrument according to the embodiment may include a smart phone and a portable terminal equipped with a camera.

Figure 37:
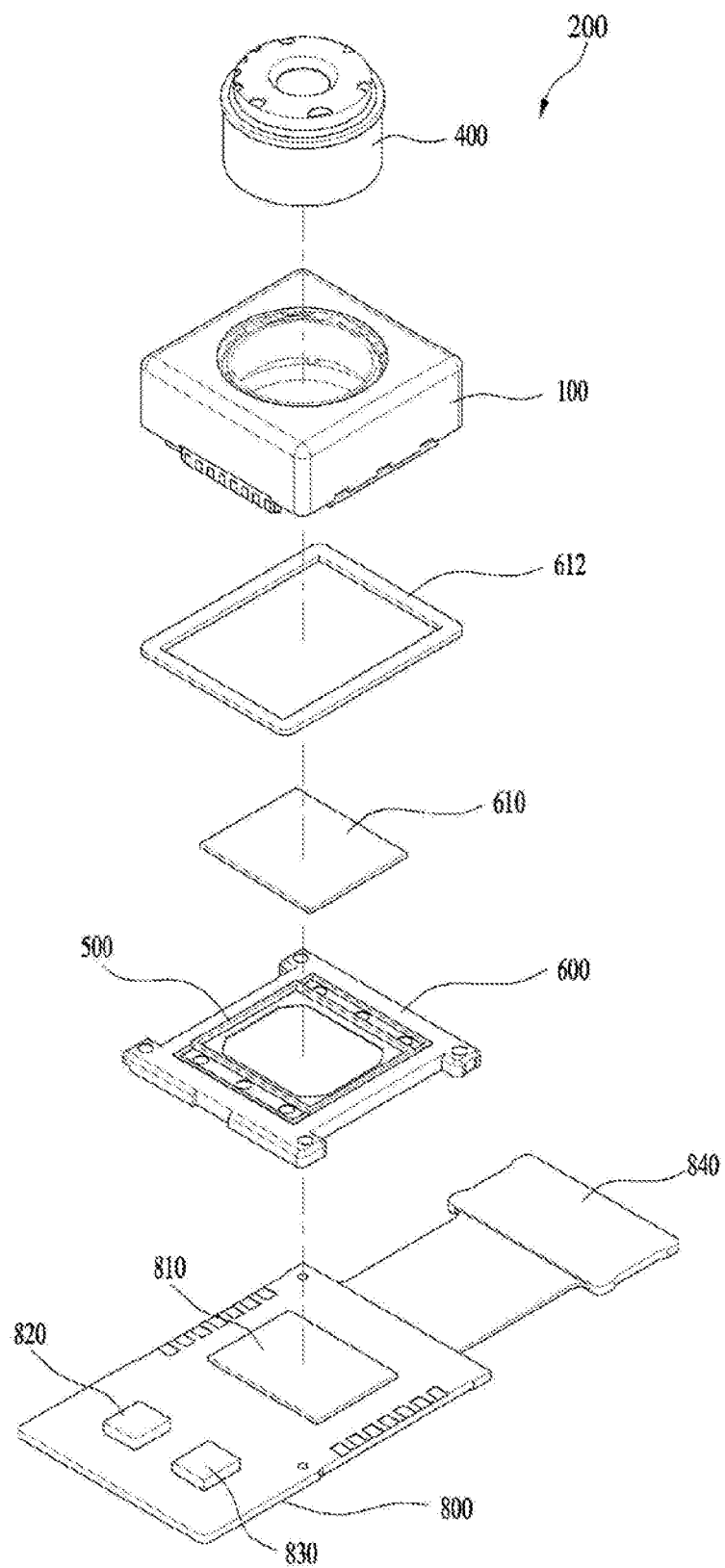
FIG. 37 is an exploded perspective view illustrating a camera module according to an embodiment.

FIG. 37 is an exploded perspective view illustrating a camera module 200 according to an embodiment.

Referring to FIG. 37, the camera module 200 may include a lens or a lens barrel 400, the lens moving apparatus 100, an adhesive member 612, a filter 610, a first holder 600, a second holder 800, an image sensor 810, a motion sensor 820, a controller 830, and a connector 840.

The lens or the lens barrel 400 may be mounted in the bobbin 110 of the lens moving apparatus 100. The lens moving apparatus shown in FIG. 37 may be an example, and the camera module 200 may include the lens moving apparatus 1100 shown in FIG. 15 or the lens moving apparatus 2100 shown in FIG. 25.

The first holder 600 may be located under the base 210 of the lens moving apparatus 100. The filter 610 may be mounted on the first holder 600, and the first holder 600 may have a raised portion 500 on which the filter 610 is seated.

The adhesive member 612 may couple or attach the base 210 of the lens moving apparatus 100 to the first holder 600. In addition to the attachment function described above, the adhesive member 612 may serve to prevent contaminants from entering the lens moving apparatus 100.

The adhesive member 612 may be, for example, epoxy, thermohardening adhesive, or ultraviolet hardening adhesive.

The filter 610 may serve to prevent light within a specific frequency band that passes through the lens barrel 400 from being introduced into the image sensor 810. The filter 610 may be, for example, an infrared-light-blocking filter, without being limited thereto. Here, the filter 610 may be oriented parallel to the X-Y plane.

The region of the first holder 600 in which the filter 610 is mounted may be provided with a opening in order to allow the light that passes through the filter 610 to be introduced into the image sensor 810.

The second holder 800 may be disposed under the first holder 600, and the image sensor 810 may be mounted on the second holder 600. The image sensor 810 may be the region, on which an image included in the light that passes through the filter 610 and that is introduced thereinto is formed.

The second holder 800 may include, for example, various circuits, devices, and a controller in order to convert the image, formed on the image sensor 810, into electrical signals and to transmit the electrical signals to an external component.

The second holder 800 may be embodied as a circuit board on which the image sensor 810 may be mounted, on which a circuit pattern may be formed, and to which various devices may be coupled.

The image sensor 810 may receive an image contained in the light introduced through the lens moving apparatus 100 and may convert the received image into electrical signals.

The filter 610 and the image sensor 810 may be spaced apart from each other so as to be opposite each other in the first direction.

The motion sensor 820 may be mounted on the second holder 800, and may be conductively connected to the controller 830 through the circuit pattern formed on the second holder 800.

The motion sensor 820 may output rotational angular speed caused by motion. The motion sensor 820 may be embodied as a dual-axis or triple-axis gyro sensor or an angular speed sensor.

The controller 830 may be mounted on the second holder 800. The second holder 800 may be conductively connected to the lens moving apparatus 100. For example, the second holder 800 may be conductively connected to the circuit board 190 of the lens moving apparatus 100.

For example, a drive signal may be supplied to the position sensor 170 through the second holder 800, and the signal output from the position sensor 170 may be transmitted to the second holder 800. For example, the signal output from the position sensor 170 may be received by the controller 830.

The connector 840 may be conductively connected to the second holder 800, and may have a port for the electrical connection of an external component.

Figure 38:
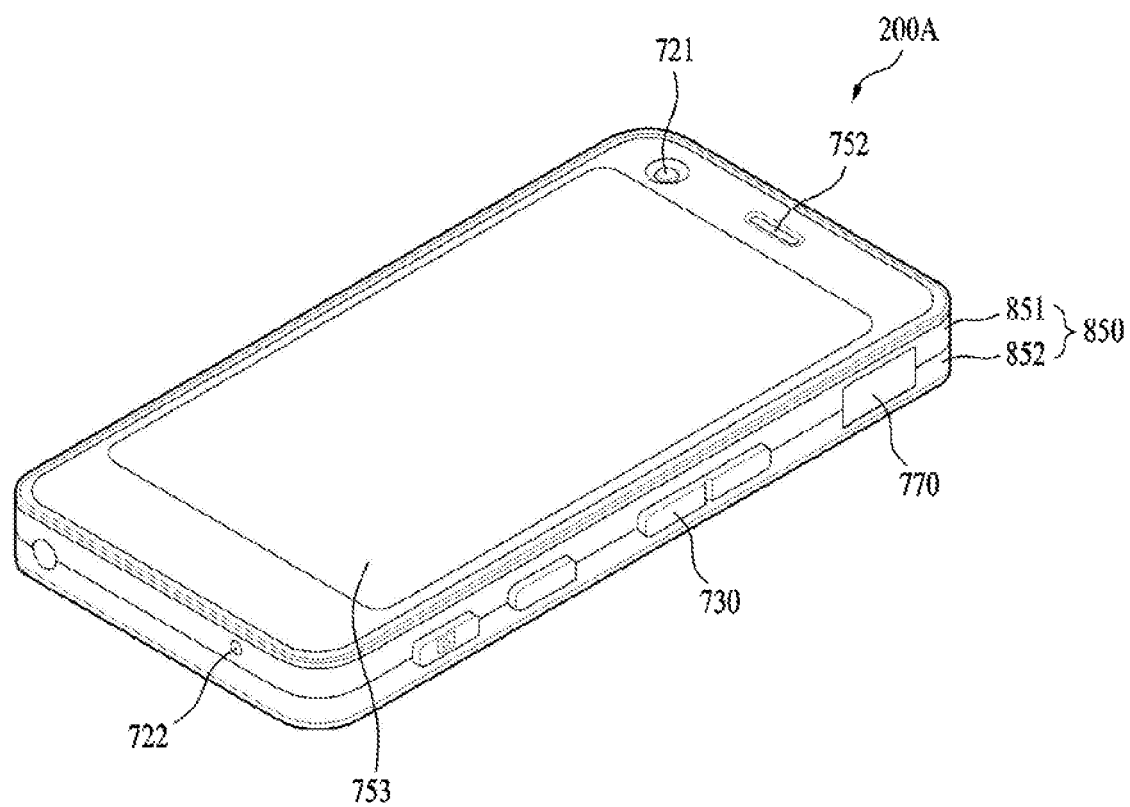
FIG. 38 is a perspective view of a portable terminal according to an embodiment.
Figure 39:
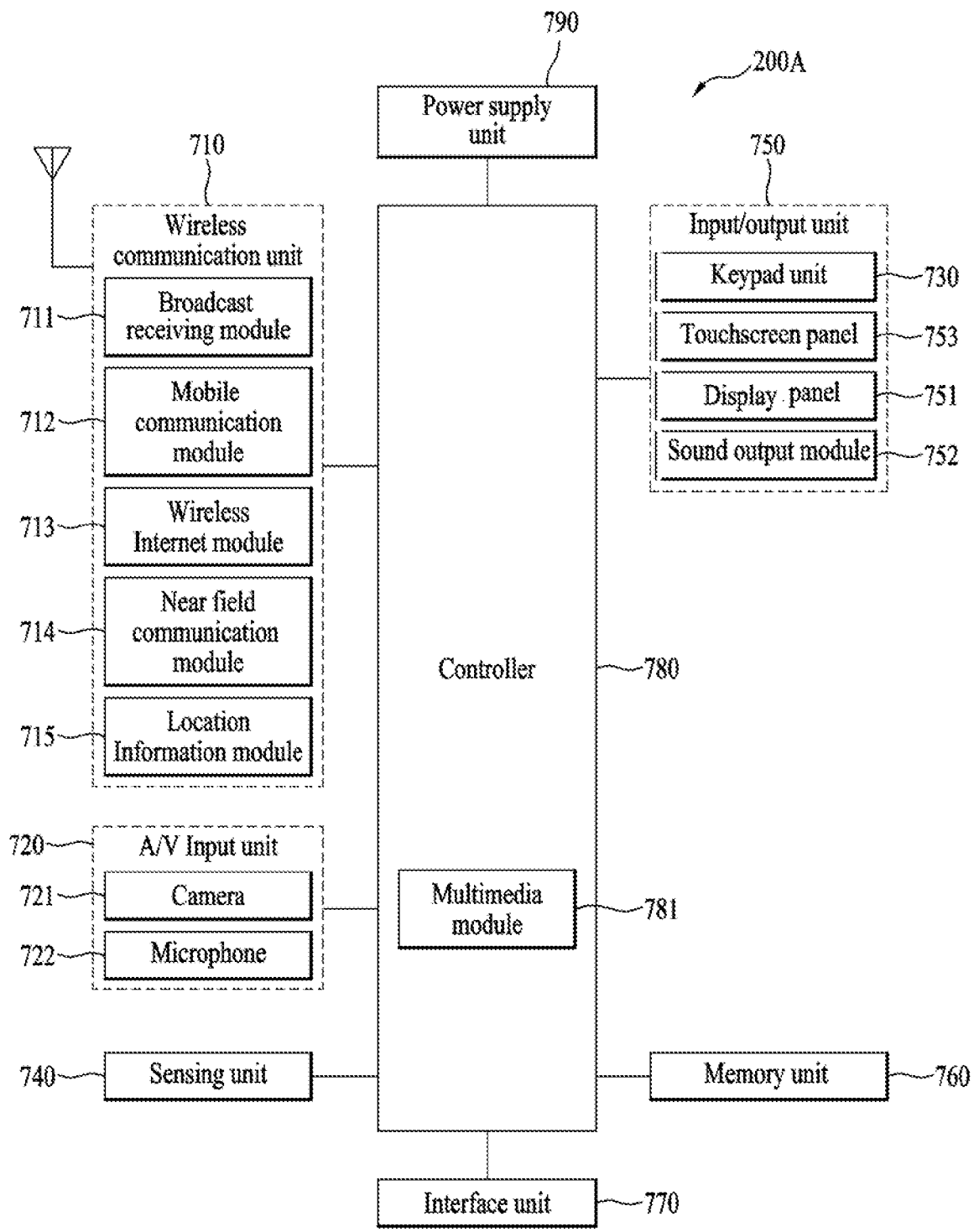
FIG. 39 is a view illustrating the configuration of the portable terminal illustrated in FIG. 38.

FIG. 38 is a perspective view illustrating a portable terminal 200A according to an embodiment. FIG. 39 is a view illustrating the configuration of the portable terminal 200A illustrated in FIG. 38.

Referring to FIGS. 39 and 39, the portable terminal 200A (hereinafter referred to as a "terminal") may include a body 850, a wireless communication unit 710, an audio/video (A/V) input unit 720, a sensing unit 740, an input/output unit 750, a memory unit 760, an interface unit 770, a controller 780, and a power supply unit 790.

The body 850 illustrated in FIG. 38 has a bar shape, without being limited thereto, and may be any of various types such as, for example, a slide type, a folder type, a swing type, or a swivel type, in which two or more sub-bodies are coupled so as to be movable relative to each other.

The body 850 may include a case (e.g. casing, housing, or cover) defining the external appearance of the terminal. For example, the body 850 may be divided into a front case 851 and a rear case 852. Various electronic components of the terminal may be accommodated in the space defined between the front case 851 and the rear case 852.

The wireless communication unit 710 may include one or more modules, which enable wireless communication between the terminal 200A and a wireless communication system or between the terminal 200A and a network in which the terminal 200A is located. For example, the wireless communication unit 710 may include a broadcast-receiving module 711, a mobile communication module 712, a wireless Internet module 713, a nearfield communication module 714, and a location information module 715.

The A/V input unit 720 serves to input audio signals or video signals, and may include, for example, a camera 721 and a microphone 722.

The camera 721 may be the camera 200 including the camera module 200 according to the embodiment shown in FIG. 37.

The sensing unit 740 may sense the current state of the terminal 200A, such as, for example, the opening or closing of the terminal 200A, the location of the terminal 200A, the presence of a user's touch, the orientation of the terminal 200A, or the acceleration/deceleration of the terminal 200A, and may generate a sensing signal to control the operation of the terminal 200A. When the terminal 200A is, for example, a slide-type cellular phone, the sensing unit 740 may sense whether the slide-type cellular phone is opened or closed. Furthermore, the sensing unit 740 may sense the supply of power from the power supply unit 790, coupling of the interface unit 770 to an external device and the like.

The input/output unit 750 serves to generate, for example, visual, audible, or tactile input or output. The input/output unit 750 may generate input data to control the operation of the terminal 200A, and may display information processed in the terminal 200A.

The input/output unit 750 may include a keypad unit 730, a display module 751, a sound output module 752, and a touchscreen panel 753. The keypad unit 730 may generate input data in response to input to a keypad.

The display module 751 may include a plurality of pixels, the color of which varies in response to electrical signals applied thereto. For example, the display module 751 may include at least one among a liquid crystal display, a thin-film-transistor-liquid crystal display, an organic light-emitting diode, a flexible display and a 3D display.

The sound output module 752 may output audio data received from the wireless communication unit 710 in, for example, a call signal reception mode, a call mode, a recording mode, a voice recognition mode, or a broadcast reception mode, or may output audio data stored in the memory unit 760.

The touchscreen panel 753 may convert variation in capacitance, caused by a user's touch on a specific region of a touchscreen, into electrical input signals.

The memory unit 760 may temporarily store programs for the processing and control of the controller 780, and input/output data (for example, telephone numbers, messages, audio data, stationary images, moving images and the like). For example, the memory unit 760 may store images captured by the camera 721, for example, pictures or moving images.

The interface unit 770 serves as a path through which the lens moving apparatus is connected to an external device connected to the terminal 200A. The interface unit 770 may receive power or data from the external component, and may transmit the same to respective constituent elements inside the terminal 200A, or may transmit data inside the terminal 200A to the external component. For example, the interface unit 770 may include a wired/wireless headset port, an external charger port, a wired/wireless data port, a memory card port, a port for connection to a device equipped with an identification module, an audio input/output (I/O) port, a video input/output (I/O) port, an earphone port and the like.

The controller 780 may control the general operation of the terminal 200A. For example, the controller 780 may perform control and processing related to, for example, voice calls, data communication, and video calls.

The controller 780 may include a multimedia module 781 for multimedia playback. The multimedia module 781 may be embodied in the controller 180 or may be embodied separately from the controller 780.

The controller 780 may perform a pattern recognition process capable of recognizing writing input or drawing input carried out on a touch screen as a character and an image, respectively.

The power supply unit 790 may supply power required to operate the respective constituent elements upon receiving external power or internal power under the control of the controller 780.

The features, configurations, effects and the like described above in the embodiments are included in at least one embodiment, but the invention is not limited only to the embodiments. In addition, the features, configuration, effects and the like exemplified in the respective embodiments may be combined with other embodiments or modified by those skilled in the art. Accordingly, content related to these combinations and modifications should be construed as falling within the scope of the embodiments.

INDUSTRIAL APPLICABILITY

The embodiments may be applied to a lens moving apparatus enabling simplification of the structure thereof, prevention of disconnection or separation of an AF drive coil, reduction of size, and increases in electromagnetic force and linearity of displacement of a bobbin, and to a camera module and an optical device each including the same.

The invention claimed is:

1. A lens moving apparatus comprising:
   a housing;
   a bobbin disposed in the housing;
   a first magnet disposed on a first side surface of the bobbin;
   a second magnet disposed on a second side surface of the bobbin;
   a first coil disposed at the housing so as to correspond to the first magnet;
   a second coil disposed at the housing so as to correspond to the second magnet;
   first to third springs coupled to the bobbin; and
   a circuit board disposed at the housing and having first and second terminals,
   wherein the first spring connects one end of the first coil to a first terminal of the circuit board, the second spring connects one end of the second coil to a second terminal of the circuit board, and the third spring connects a remaining end of the first coil to a remaining end of the second coil.

2. The lens moving apparatus according to claim 1, further comprising a base disposed below the bobbin,
   wherein the first and third springs are coupled to the housing and are disposed between the bobbin and the base.

3. The lens moving apparatus according to claim 1, wherein the housing includes a first opening positioned between the first coil and the first magnet and a second opening positioned between the second coil and the second magnet.

4. The lens moving apparatus according to claim 1, wherein the housing includes a first side surface corresponding to the first side surface of the bobbin and a second side surface corresponding to the second side surface of the bobbin, and
   wherein the first coil is disposed on the first side surface of the housing and the second coil is disposed on the second side surface of the housing.

5. The lens moving apparatus according to claim 4, wherein the bobbin includes third and fourth side surfaces disposed between the first and second side surfaces thereof,
   wherein the housing further includes third and fourth side surfaces disposed between the first side surface of the housing and the second side surface of the housing, and
   wherein the third and fourth side surfaces of the housing do not overlap the first and second magnets in a direction toward the fourth side surface of the housing from the third side surface of the housing.

6. The lens moving apparatus according to claim 1, wherein the bobbin includes third and fourth side surfaces disposed between the first and second side surfaces thereof, and
   wherein the third and fourth side surfaces of the bobbin do not overlap the first and second coils in a direction toward the fourth side surface of the bobbin from the third side surface of the bobbin.

7. The lens moving apparatus according to claim 5, further comprising:
   a sensing magnet disposed on the fourth side surface of the bobbin; and
   a location sensor disposed at the circuit board so as to correspond to the sensing magnet,
   wherein the circuit board is disposed on the fourth side surface of the housing.

8. The lens moving apparatus according to claim 7, further comprising a balancing magnet disposed on the third side surface of the bobbin.

9. The lens moving apparatus according to claim 2, wherein an upper surface of the base includes a first side corresponding to the first side surface of the bobbin, a second side corresponding to the second side surface of the bobbin, and third and fourth sides disposed between the first and second sides,
   wherein the first spring is positioned between the first side and the fourth side, wherein the second spring is positioned between the second side and the fourth side, and wherein the third spring is positioned between the first side, the second side and the third side.

10. The lens moving apparatus according to claim 1, wherein the housing includes:
a first side portion corresponding to the first side surface of the bobbin;
a second side portion corresponding to the second side surface of the bobbin;
third and fourth side portions disposed between the first side portion of the housing and the second side portion of the housing;
a first corner portion positioned between the first side portion and the third side portion;
a second corner portion positioned between the second side portion and the third side portion;
a third corner portion positioned between the third side portion and the fourth side portion; and
a fourth corner portion positioned between the fourth side portion and the first side portion, and
wherein the first coil is disposed at the first side portion, the second coil is disposed at the second side portion, and the circuit board is disposed at the fourth side portion.

11. The lens moving apparatus according to claim 1, wherein the first side surface of the bobbin is opposite to the second side surface of the bobbin.

12. The lens moving apparatus according to claim 1, wherein the first to third springs are coupled to a lower portion of the bobbin and a lower portion of the housing.

13. The lens moving apparatus according to claim 1, wherein each of the first to third springs comprises an inner frame coupled to the lower portion of the bobbin, an outer frame coupled to the lower portion of the housing, and a connection portion coupled to the inner frame and the outer frame,
wherein the one end of the first coil is coupled to one portion of the outer frame of the first spring and the other end of the first coil is coupled to one portion of the outer frame of the third spring, and
wherein the one end of the second coil is coupled to one portion of the outer frame of the second spring and the other end of the second coil is coupled to another portion of the outer frame of the third spring.

14. The lens moving apparatus according to claim 13, wherein another portion of the outer frame of the first spring is coupled to the circuit board, and another portion of the outer frame of the second spring is coupled to the circuit board.

15. The lens moving apparatus according to claim 10, wherein the first spring connects the first side portion to the fourth side portion, the second spring connects the second side portion to the fourth side portion, and the third spring connects the first side portion, the second side portion, and the third side portion to each other.

16. The lens moving apparatus according to claim 10, wherein each of the first and third springs comprises an outer frame coupled to the housing,
wherein the outer frame of the first spring is disposed on a lower portion of the first side portion, a lower portion of the fourth corner portion, and a lower portion of the fourth side portion,
wherein the outer frame of the second spring is disposed on a lower portion of the second side portion, a lower portion of the third corner portion, and a lower portion of the fourth side portion, and wherein the outer frame of the third spring is disposed on lower portions of the first to third side portions, and lower portions of the first and second corner portions.

17. The lens moving apparatus according to claim 10, wherein the first spring comprises:
a first bonding portion disposed on a lower portion of the first side portion and coupled to the one end of the first coil; and
a second bonding portion disposed on a lower portion of the fourth side portion and coupled to the first terminal of the circuit board,
wherein the second spring comprises:
a third bonding portion disposed on a lower portion of the second side portion and coupled to the one end of the second coil; and
a fourth bonding portion disposed on a lower portion of the fourth side portion and coupled to the second terminal of the circuit board, and
wherein the third spring comprises:
a fifth bonding portion disposed on a lower portion of the first side portion and coupled to the other end of the first coil; and
a sixth bonding portion disposed on a lower portion of the second side portion and coupled to the other end of the second coil.

18. The lens moving apparatus according to claim 10, wherein the housing comprises:
a first protrusion provided on an outer surface of the first corner portion abutting one end of an outer surface of the first side portion;
a second protrusion provided on an outer surface of the fourth corner portion abutting the other end of the outer surface of the first side portion;
a third protrusion provided on an outer surface of the second corner portion abutting one end of an outer surface of the second side portion; and
a fourth protrusion provided on an outer surface of the third corner portion abutting the other end of the outer surface of the second side portion,
wherein the first coil has a form of a ring wound around the first and second protrusions, and
wherein the second coil has a form of a ring wound around the third and fourth protrusions.

19. A lens moving apparatus comprising:
a housing;
a bobbin disposed in the housing and comprising first and second side surfaces opposite to each other and third and fourth side surface disposed between the first and second side surface and opposite to each other;
a first magnet disposed on the first side surface of the bobbin;
a second magnet disposed on the second side surface of the bobbin;
a first coil disposed at the housing so as to correspond to the first magnet;
a second coil disposed at the housing so as to correspond to the second magnet;
first to third springs coupled to the bobbin; and
a circuit board disposed at a side surface of the housing corresponding to the fourth side surface of the bobbin,
wherein the first spring electrically connects the first coil to the circuit board, the second spring electrically connects the second coil to the circuit board, and the third spring electrically connects the first coil to the second coil.

20. A camera module comprising:
a lens;
a lens moving apparatus for mounting the lens according to claim 1; and
an image sensor.

* * * * *